(12) United States Patent
Hashimoto et al.

(10) Patent No.: US 11,833,620 B2
(45) Date of Patent: Dec. 5, 2023

(54) FLUX AND SOLDER PASTE

(71) Applicant: SENJU METAL INDUSTRY CO., LTD., Tokyo (JP)

(72) Inventors: Yutaka Hashimoto, Soka (JP); Kazuyori Takagi, Inzai (JP); Tomoko Nagai, Yashio (JP); Nanako Miyagi, Nagareyama (JP); Kazuya Kitazawa, Kuki (JP); Akiko Takaki, Koshigaya (JP); Kazuhiro Minegishi, Koshigaya (JP); Teppei Otsuki, Soka (JP); Rina Horikoshi, Tokyo (JP); Ryuichi Tsuda, Tokyo (JP); Hiroyoshi Kawasaki, Tokyo (JP); Masato Shiratori, Shimotsuke (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/957,537

(22) PCT Filed: Jan. 16, 2019

(86) PCT No.: PCT/JP2019/001105
§ 371 (c)(1),
(2) Date: Jun. 24, 2020

(87) PCT Pub. No.: WO2019/142826
PCT Pub. Date: Jul. 25, 2019

(65) Prior Publication Data
US 2021/0060715 A1 Mar. 4, 2021

(30) Foreign Application Priority Data
Jan. 16, 2018 (JP) .................. 2018-005033
Jan. 15, 2019 (JP) .................. 2019-004692
Jan. 15, 2019 (JP) .................. 2019-004696

(51) Int. Cl.
*B23K 35/36* (2006.01)
*B23K 35/02* (2006.01)
(Continued)

(52) U.S. Cl.
CPC ........ *B23K 35/3613* (2013.01); *B23K 35/025* (2013.01); *B23K 35/262* (2013.01);
(Continued)

(58) Field of Classification Search
CPC .................... B23K 35/3612; B23K 35/3613
See application file for complete search history.

(56) References Cited

U.S. PATENT DOCUMENTS 4,342,607 A * 8/1982 Zado .................. B23K 35/3612
148/23
2002/0128353 A1 9/2002 Konarski et al.
(Continued)

FOREIGN PATENT DOCUMENTS

CN 1427753 7/2003
CN 1478009 2/2004
(Continued)

OTHER PUBLICATIONS

Chinese Office Action for 201980008429.6, dated Jun. 28, 2021.
(Continued)

*Primary Examiner* — Jenny R Wu
(74) *Attorney, Agent, or Firm* — NIXON PEABODY LLP; Jeffrey L. Costellia

(57) ABSTRACT

Provided are flux in which solder wettability is improved, and a solder paste in which the flux is used. The flux contains 0.5-20.0 wt % of a (carboxyalkyl)isocyanurate adduct, and 5.0-45.0 wt % of a rosin, and furthermore contains a solvent. The (carboxyalkyl)isocyanurate adduct is a mono(carboxyalkyl)isocyanurate adduct, a bis(carboxyalkyl)isocyanurate
(Continued)

adduct, a tris(carboxyalkyl)isocyanurate adduct, or a combination of two or more of these.

6 Claims, 3 Drawing Sheets

(51) Int. Cl.
*B23K 35/26* (2006.01)
*C08K 5/3492* (2006.01)
*C08L 93/04* (2006.01)
*C22C 13/00* (2006.01)

(52) U.S. Cl.
CPC .......... *C08K 5/34924* (2013.01); *C08L 93/04* (2013.01); *C22C 13/00* (2013.01)

(56) References Cited

U.S. PATENT DOCUMENTS

| | | | |
|---|---|---|---|
| 2003/0221748 A1* | 12/2003 | Arzadon | B23K 35/025 148/23 |
| 2015/0102090 A1 | 4/2015 | Arai et al. | |
| 2020/0269362 A1* | 8/2020 | Uchida | C08K 3/36 |

FOREIGN PATENT DOCUMENTS

| | | |
|---|---|---|
| CN | 1247360 | 3/2006 |
| CN | 102770232 | 11/2012 |
| CN | 104159701 | 11/2014 |
| CN | 105397343 | 3/2016 |
| CN | 107109071 | 8/2017 |
| EP | 1348513 | 10/2003 |
| JP | 05-000392 | 1/1993 |
| JP | 06-312291 | 11/1994 |
| JP | 11-254184 | 9/1999 |
| JP | 2002-146159 | 5/2002 |
| JP | 2004-018452 | 1/2004 |
| JP | 2005-528224 | 9/2005 |
| JP | 2007-246687 | 9/2007 |
| JP | 2012-200785 | 10/2012 |
| JP | 2013-188761 | 9/2013 |
| JP | 5433438 | 3/2014 |
| JP | 2014-117737 | 6/2014 |
| JP | 2014-144473 | 8/2014 |
| JP | 2014-162877 | 9/2014 |
| JP | 2015-147250 | 8/2015 |
| JP | 2015-160233 | 9/2015 |
| JP | 2017-030039 | 2/2017 |
| JP | 2017-064761 | 4/2017 |
| JP | 2017-100181 | 6/2017 |
| JP | 2019-013926 | 1/2019 |
| TW | 201643109 | 12/2016 |
| TW | 201718814 | 6/2017 |
| WO | WO-2012/118074 | 9/2012 |
| WO | WO-2017/033930 | 3/2017 |
| WO | WO-2019/009097 | 1/2019 |
| WO | WO-2019009097 A1 * | 1/2019 ......... B23K 35/3618 |

OTHER PUBLICATIONS

International Search Report for App. No. PCT-JP2019-001105, dated Apr. 9, 2019.
Notice of Reasons for Rejection for JP App. No. 2018-005033, dated Oct. 23, 2019.
Notice of reasons for Rejection for JP App. No. 2019-004692, dated Apr. 23, 2019.
European Search Report in App. No. 19741583.9, dated Sep. 10, 2021 (9 pages).
Japanese Office Action in JP App. No. 2019-004696, dated Apr. 23, 2019 (10 pages).
Japanese Office Action in JP App. No. 2019-004696, dated Oct. 1, 2019 (6 pages).
Japanese Office Action in JP App. No. 2019-004696, dated Feb. 4, 2020 (6 pages).
Japanese Office Action in JP App. No. 2018-005033, dated May 26, 2020 (7 pages).
Taiwanese Office Action in App. No. 108101704, dated Feb. 24, 2023 (6 pages).
Taiwanese Office Action in App. No. 108101704, dated Feb. 24, 2023 (12 pages).

* cited by examiner

FLUX AND SOLDER PASTE

TECHNICAL FIELD

The present invention relates to a flux used for soldering and a solder paste in which this flux is used.

BACKGROUND ART

In general, a flux used for soldering has an effect of chemically removing metal oxides present on surfaces of solder and metal, which is a joining object to be soldered, and enabling movement of metallic elements at the boundary between the two surfaces. For this reason, intermetallic compounds may be formed between the surfaces of the solder and the metal which is a joining object by performing soldering using the flux, whereby firm joining is obtained.

Solder paste is a composite material obtained by mixing a solder alloy powder and a flux. Soldering using solder paste is performed such that the solder paste is printed on a soldering portion such as an electrode of a substrate, a component is mounted on the soldering portion on which the solder paste is printed, and the substrate is heated in a heating furnace called a reflow furnace to melt the solder.

A flux and solder paste which are suitable for a component such as a heat sink component having a relatively large joining area, in which a hydroiodide of an organic amine, a 6-membered aromatic or alicyclic monocarboxylic acid, a 6-membered aromatic or alicyclic dicarboxylic acid, and an imidazole compound or its carboxylic acid salt are combined are disclosed in Patent Literature 1. In Patent Literature 1, reduction in void area rate of the heat sink component and wettability of solder on a side surface of the heat sink component are evaluated.

CITATION LIST

Patent Literature

[Patent Literature 1]
Japanese Unexamined Patent Application, First Publication No. 2014-117737

SUMMARY OF INVENTION

Technical Problem

In some cases, finishing after mounting, for example, wet spreadability varies significantly depending on differences in heating history during soldering. For this reason, a flux enabling stable soldering with a good finish regardless of any heating history is required. In addition, there is a great need for a reduction in the number of voids, but the generation of voids may not be sufficiently reduced in view of the improvement in activity through addition of an organic acid, an amine, and halogen in the related art.

The present invention has been made to solve such problems, and an object of the present invention is to provide a flux having excellent wet spreadability of solder, a flux that may reduce the generation of voids, and solder paste in which these fluxes are used.

Solution to Problem

It has been found that the wettability of solder with respect to a joining component may be improved using a flux containing a (carboxyalkyl) isocyanurate adduct.

The present invention is a flux containing a (carboxyalkyl) isocyanurate adduct.

The flux of the present invention preferably further contains a resin, and the resin is preferably rosin. In addition, in the flux of the present invention, it is preferable that a content of the (carboxyalkyl) isocyanurate adduct be 0.5 wt % to 20.0 wt %.

In the flux of the present invention, it is preferable that the (carboxyalkyl) isocyanurate adduct be any one of a mono (carboxyalkyl) isocyanurate adduct, a bis(carboxyalkyl) isocyanurate adduct, and a tris(carboxyalkyl) isocyanurate adduct, or a combination of two or more thereof, and it is preferable that the tris(carboxyalkyl) isocyanurate adduct be tris(2-carboxyethyl) isocyanurate, tris(1-carboxymethyl) isocyanurate, or tris(3-carboxypropyl) isocyanurate, and the bis(carboxyalkyl) isocyanurate adduct be bis(2-carboxyethyl) isocyanurate.

In addition, the present invention is a flux, including: 0.5 wt % to 20.0 wt % of a (carboxyalkyl) isocyanurate adduct; 5.0 wt % to 50.0 wt % of rosin; and a solvent.

It is preferable that the flux of the present invention further contain 0 wt % to 30.0 wt % of a resin other than rosin, in which the resin other than rosin is an acrylic resin. It is preferable that, when a content of acrylic resin is higher than 0 wt %, a ratio of the acrylic resin to the rosin be 0.1 to 9.0. It is preferable that the flux further include: 0 wt % to 10.0 wt % of an organic acid other than the (carboxyalkyl) isocyanurate adduct; 0 wt % to 5.0 wt % of an amine; 0 wt % to 5.0 wt % of an organic halogen compound; 0 wt % to 5.0 wt % of an amine hydrohalide; and 0 wt % to 10.0 wt % of a thixotropic agent.

In addition, in solder paste containing a flux and metal powder, it has been found that, if predetermined amounts of an acrylic resin, tris(2-carboxyethyl) isocyanurate, and dimer acids are added to the flux, wettability of solder to a joining component may be improved, generation of voids may be reduced, and temperature cycle reliability is improved.

The present invention is a flux, including: 5.0 wt % to 25.0 wt % of an acrylic resin; 2.0 wt % to 15.0 wt % of tris(2-carboxyethyl) isocyanurate; 5.0 wt % to 25.0 wt % of any one of a dimer acid, a trimer acid, a hydrogenated dimer acid obtained by adding hydrogen to a dimer acid, and a hydrogenated trimer acid obtained by adding hydrogen to a trimer acid or two or more kinds of a dimer acid, a trimer acid, a hydrogenated dimer acid obtained by adding hydrogen to a dimer acid, and a hydrogenated trimer acid obtained by adding hydrogen to a trimer acid; and a solvent.

In the flux of the present invention, it is preferable that a ratio of tris(2-carboxyethyl) isocyanurate to any one of a dimer acid, a trimer acid, and a hydrogenated dimer acid or two or more kinds of a dimer acid, a trimer acid, and a hydrogenated dimer acid be 0.1 to 1.5.

In addition, it is preferable that the flux of the present invention further contain 0 wt % to 30.0 wt % of rosin. It is preferable that, when a content of rosin is higher than 0 wt %, a ratio of the acrylic resin to the rosin be 0.5 to 9.0.

Furthermore, it is preferable that the flux of the present invention further include: 0 wt % to 10.0 wt % of another organic acid; 0 wt % to 10.0 wt % of a thixotropic agent; 0 wt % to 10.0 wt % of a hindered phenolic metal deactivator; 0 wt % to 5.0 wt % of a nitrogen compound-based metal deactivator; 0 wt % to 5.0 wt % of an amine; 0 wt % to 5.0 wt % of an organic halogen compound; 0 wt % to 5.0 wt % of an amine hydrohalide; and 0 wt % to 10 wt % of another resin.

Furthermore, in solder paste containing a flux and metal powder, it has been found that, if a predetermined amount of tris(2-carboxyethyl) isocyanurate is added to the flux, generation of voids may be reduced, and wettability of solder to a joining component may be improved.

The present invention is a flux, including: rosin; tris(2-carboxyethyl) isocyanurate; and a solvent, in which a content of tris(2-carboxyethyl) isocyanurate is 0.1 wt % to 15 wt %.

In the flux of the present invention, it is preferable that a content of rosin be 10 wt % to 60 wt %, and a content of solvent be 30 wt % to 50 wt %. In addition, the flux may include 0 wt % to 15 wt % of another activator.

It is preferable that the flux of the present invention further include: 0 wt % to 10 wt % of a thixotropic agent; 0 wt % to 5 wt % of an imidazole compound; and 0 wt % to 8 wt % of an antioxidant.

In addition, the present invention is solder paste, including: the above-described fluxes; and metal powder.

Advantageous Effects of Invention

Since the flux of the present invention contains a (carboxyalkyl) isocyanurate adduct, in this flux and solder paste in which this flux is used, oxides which cause non-wetting of solder are removed by performing soldering in a reflow furnace, whereby wet spreadability of the solder is improved.

In addition, since the flux of the present invention contains predetermined amounts of an acrylic resin, tris(2-carboxyethyl) isocyanurate, and any one of a dimer acid, a trimer acid, a hydrogenated dimer acid obtained by adding hydrogen to a dimer acid, and a hydrogenated trimer acid obtained by adding hydrogen to a trimer acid or two or more kinds of a dimer acid, a trimer acid, a hydrogenated dimer acid, and a hydrogenated trimer acid, in a case where soldering is performed in a reflow furnace using solder paste containing this flux and metal powder, an oxide which causes non-wetting of solder is removed, whereby wettability of the solder is improved. In addition, the oxide which also causes voids is removed, whereby generation of voids may be reduced. Furthermore, flux residues become soft residues, and therefore, temperature cycle reliability is improved.

Furthermore, since the flux of the present invention contains 0.1 wt % to 15 wt % of tris(2-carboxyethyl) isocyanurate, in a case where soldering is performed in a reflow furnace using solder paste containing this flux and metal powder, generation of voids may be reduced. In addition, wettability of solder may be improved and the generation of voids may be reduced.

DESCRIPTION OF EMBODIMENTS

Figure 1A:
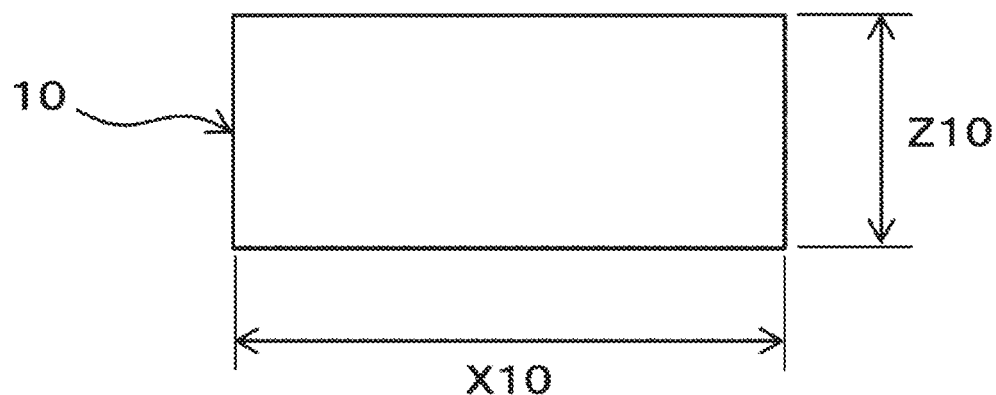
FIG. 1A is a front view of a terminal of a component for verifying solder wettability to an end surface of the terminal.

One Example of Flux of Present Embodiment

A flux of a first embodiment contains a (carboxyalkyl) isocyanurate adduct. The flux of the first embodiment further contains a resin and a solvent.

The (carboxyalkyl) isocyanurate adduct is a 6-membered heterocyclic compound, has heat resistance in a temperature range expected for soldering in contrast to organic acids such as a carboxylic acid with a linear structure and a carboxylic acid with a branched structure, and functions as an activator during soldering.

In a case where soldering is performed in a reflow furnace using, for example, the flux of the first embodiment, a solder ball, or a core ball obtained by coating a metal core or the like with solder, oxides which cause non-wetting of solder are removed, whereby wet spreadability of the solder is improved. In addition, wet spreadability of solder is also improved by performing soldering in a reflow furnace using solder paste containing the flux of the first embodiment and metal powder.

Examples of (carboxyalkyl) isocyanurate adducts include a mono(carboxyalkyl) isocyanurate adduct, a bis(carboxyalkyl) isocyanurate adduct, and a tris(carboxyalkyl) isocyanurate adduct.

Examples of tris(carboxyalkyl) isocyanurate adducts include tris(2-carboxyethyl) isocyanurate, tris(1-carboxymethyl) isocyanurate, and tris(3-carboxypropyl) isocyanurate. In addition, examples of bis(carboxyalkyl) isocyanurate adducts include bis(2-carboxyethyl) isocyanurate.

The structural formula of tris(2-carboxyethyl) isocyanurate is shown in the following Formula (1). The CAS Registry Number for tris(2-carboxyethyl) isocyanurate is 2904-41-8. The structural formula of tris(1-carboxymethyl) isocyanurate is shown in the following Formula (2). The CAS Registry Number for tris(1-carboxymethyl) isocyanurate is 1968-52-1. The structural formula of tris(3-carboxypropyl) isocyanurate is shown in the following Formula (3). The CAS Registry Number for tris(3-carboxypropyl) isocyanurate is 319017-31-7. The structural formula of bis(2-carboxyethyl) isocyanurate is shown in the following Formula (4). The CAS Registry Number for bis(2-carboxyethyl) isocyanurate is 2904-40-7.

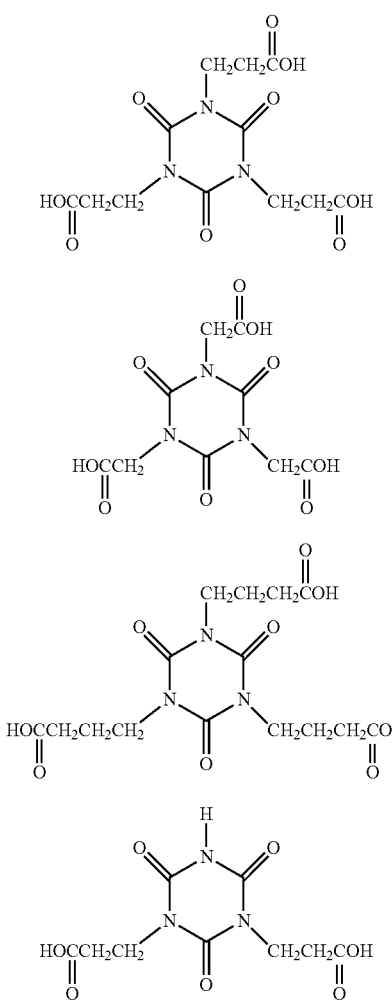

The (carboxyalkyl) isocyanurate adduct is an essential component in the flux of the first embodiment for improving wet spreadability of solder, and one kind or two or more kinds thereof may be used. It is preferable that the content of (carboxyalkyl) isocyanurate adduct be 0.5 wt % to 20.0 wt %.

The flux of the first embodiment contains rosin as the resin. Examples of rosin include raw rosin such as gum rosin, wood rosin, and tall oil rosin, and derivatives obtained from raw rosin. Examples of the derivatives include purified rosin, hydrogenated rosin, disproportionated rosin, polymerized rosin, acid-modified rosin, phenol-modified rosin, α,β-unsaturated carboxylic acid-modified products (such as acrylated rosin, maleated rosin, or fumarated rosin), purified products, hydrides, and disproportionated products of polymerized rosin, and purified products, hydrides, and disproportionated products of α,β-unsaturated carboxylic acid-modified products.

The rosin is an essential component in the flux of the first embodiment for improving wet spreadability of solder, and one kind or two or more kinds thereof may be used. The content of rosin is preferably 5.0 wt % to 50.0 wt %.

In addition, the flux contains an acrylic resin as a resin other than rosin. Examples of acrylic resins include monomers such as acrylic acid, an acrylate which is a reaction product from acrylic acid and an alcohol, methacrylic acid, and a methacrylate which is a reaction product from methacrylic acid and an alcohol, a polymer of acrylic acid, a polymer of an acrylate, and a polymer of acrylic acid and an acrylate. In addition, other examples thereof include a polymer of methacrylic acid, a polymer of a methacrylate, and a polymer of methacrylic acid and a methacrylate. Furthermore, still other examples thereof include a polymer of acrylic acid and methacrylic acid, a polymer of acrylic acid and a methacrylate, a polymer of methacrylic acid and an acrylate, a polymer of an acrylate and a methacrylate, a polymer of acrylic acid, methacrylic acid, and an acrylate, a polymer of acrylic acid, methacrylic acid, and a methacrylate, a polymer of acrylic acid, methacrylic acid, an acrylate, and a methacrylate, a polymer of acrylic acid, an acrylate, and a methacrylate, and a polymer of methacrylic acid, an acrylate, and a methacrylate. Examples of acrylates include butyl acrylate, and examples of acrylic resins using butyl acrylate as a monomer include a polymer of butyl acrylate, a polymer of butyl acrylate and an acrylate other than butyl acrylate, a polymer of acrylic acid and butyl acrylate, and a polymer of acrylic acid, butyl acrylate, and an acrylate other than butyl acrylate. In addition, examples of methacrylates include butyl methacrylate, and examples of acrylic resins using butyl methacrylate as a monomer includes a polymer of butyl methacrylate, a polymer of butyl methacrylate and a methacrylate other than butyl methacrylate, a polymer of methacrylic acid and butyl methacrylate, and a polymer of methacrylic acid, butyl methacrylate, and a methacrylate other than butyl methacrylate. Furthermore, still other examples thereof include a polymer of acrylic acid and butyl methacrylate, a polymer of acrylic acid, butyl methacrylate, and a methacrylate other than butyl methacrylate, a polymer of methacrylic acid and butyl acrylate, a polymer of methacrylic acid, butyl acrylate, and an acrylate other than butyl acrylate, a polymer of butyl acrylate and butyl methacrylate, a polymer of butyl methacrylate and an acrylate other than butyl acrylate, and a polymer of butyl acrylate and a methacrylate other than butyl methacrylate. A polymerization reaction may be random copolymerization or block copolymerization. In addition, the above-described alcohol is a 1-24C alcohol having a linear carbon chain or a 3-24C alcohol having a branched carbon chain, and examples of the above-described alcohol include methanol having 1 carbon atom, ethanol having 2 carbon atoms, 1-propanol having 3 carbon atoms, 2-propanol having 3 carbon atoms, ethylene glycol monomethyl ether having 3 carbon atoms, 1-butanol having 4 carbon atoms, 2-butanol having 4 carbon atoms, isobutanol having 4 carbon atoms, 1-hexanol having 6 carbon atoms, diethylene glycol monoethyl ether having 6 carbon atoms, benzyl alcohol having 7 carbon atoms, 1-octanol having 8 carbon atoms, 2-ethylhexanol having 8 carbon atoms, phenyl glycol having 8 carbon atoms, 1-decanol having 9 carbon atoms, lauryl alcohol having 12 carbon atoms, cetyl alcohol having 16 carbon atoms, stearyl alcohol having 18 carbon atoms, oleyl alcohol having 18 carbon atoms, and behenyl alcohol having 22 carbon atoms.

As the molecular weight of an acrylic resin, the weight-average molecular weight (MW) in terms of polystyrene which is measured through gel permeation chromatography (GPC) is preferably 5,000 to 30,000 and more preferably 6,000 to 15,000.

Examples of such acrylic resins include poly-2-ethylhexyl acrylate (Mw=8,300) and polylauryl methacrylate (Mw=10,080).

The flux of the first embodiment may further contain a resin other than rosin and an acrylic resin. At least one resin selected from a terpene resin, a modified terpene resin, a terpene phenol resin, a modified terpene phenol resin, a styrene resin, a modified styrene resin, a xylene resin, a modified xylene resin, polyethylene, polypropylene, polyvinyl acetate, polyvinyl alcohol, a polyethylene-polypropylene copolymer, and a polyethylene-polyvinyl acetate copolymer may be included in the resin other than rosin and an acrylic resin. An aromatic modified terpene resin, a hydrogenated terpene resin, a hydrogenated aromatic modified terpene resin, or the like may be used as a modified terpene resin. A hydrogenated terpene phenol resin or the like may be used as a modified terpene phenol resin. A styrene-acrylic resin, a styrene-maleic acid resin, or the like may be used as a modified styrene resin. A phenol-modified xylene resin, an alkylphenol-modified xylene resin, a phenol-modified resol-type xylene resin, a polyol-modified xylene resin, a polyoxyethylene-added xylene resin, or the like may be used as a modified xylene resin. In addition, a copolymer of an acrylic resin described above and another resin may be used. For example, a polymer of each acrylic resin described above and polyethylene may be used. Examples of such an acryl-polyethylene copolymer resin include poly-2-ethylhexyl acrylate-polyethylene (Mw=12,300).

The other resin is an optional component added to the flux of the first embodiment for improving wet spreadability of solder, and one kind or two or more kinds thereof may be used. The content of the other resin is preferably 0 wt % to 30.0 wt % and more preferably 5.0 wt % to 30.0 wt %. In addition, in a case where the flux contains the other resin, the (other resin/rosin) ratio of the other resin to the rosin is preferably 0.1 to 9.0. In a case where the flux contains an acrylic resin as the other resin, the content of the acrylic resin is preferably 0 wt % to 30.0 wt % and more preferably 5.0 wt % to 30.0 wt %. In addition, in the case where the flux contains an acrylic resin as the other resin, the (acrylic resin/rosin) ratio of the acrylic resin to the rosin is preferably 0.1 to 9.0 and more preferably 0.1 to 6.0.

The flux of the first embodiment may contain another activator in addition to the (carboxyalkyl) isocyanurate adduct. In the case where the flux contains the other activator, the effect of removing an oxide may be enhanced.

Examples of the other activator include organic acids other than the (carboxyalkyl) isocyanurate adduct, amines, organic halogen compounds, and amine hydrohalides.

Examples of organic acids other than the (carboxyalkyl) isocyanurate adduct include glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, phthalic acid, isophthalic acid, terephthalic acid, dodecanedioic acid, parahydroxyphenylacetic acid, picolinic acid, phenylsuccinic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 4-tert-butyl benzoic acid, 2,3-dihydroxybenzoic acid, 2,4-diethylglutaric acid, 2-quinolinecarboxylic acid, 3-hydroxybenzoic acid, malic acid, p-anisic acid, palmitic acid, stearic acid, 12-hydroxystearic acid, oleic acid, linoleic acid, and linolenic acid.

In addition, other examples of the organic acids other than the (carboxyalkyl) isocyanurate adduct include a dimer acid which is a dimer and a reaction product from a monocarboxylic acid, a hydrogenated dimer acid obtained by adding hydrogen to a dimer acid, a trimer acid which is a trimer and a reaction product from a monocarboxylic acid, and a hydrogenated trimer acid obtained by adding hydrogen to a trimer acid.

The dimer acid is a dimer in which oleic acid and linoleic acid are used as monomers, for example. The dimer acid in which oleic acid and linoleic acid are used as monomers has 36 carbon atoms. The trimer acid is a trimer in which oleic acid and linoleic acid are used as monomers, for example. The trimer acid in which oleic acid and linoleic acid are used as monomers has 54 carbon atoms.

Examples of dimer acids, trimer acids, hydrogenated dimer acids, and hydrogenated trimer acids include a dimer acid which is a reaction product from the above-described oleic acid and linoleic acid, a trimer acid which is a reaction product from oleic acid and linoleic acid, a hydrogenated dimer acid obtained by adding hydrogen to a dimer acid which is a reaction product from oleic acid and linoleic acid, and a hydrogenated trimer acid obtained by adding hydrogen to a trimer acid which is a reaction product from oleic acid and linoleic acid.

In addition, other examples of dimer acids, trimer acids, hydrogenated dimer acids, and hydrogenated trimer acids include a dimer acid other than a reaction product from oleic acid and linoleic acid, a trimer acid other than a reaction product from oleic acid and linoleic acid, a hydrogenated dimer acid obtained by adding hydrogen to a dimer acid other than a reaction product from oleic acid and linoleic acid, and a hydrogenated trimer acid obtained by adding hydrogen to a trimer acid other than a reaction product from oleic acid and linoleic acid. Examples thereof include a dimer acid which is a reaction product from acrylic acid, a trimer acid which is a reaction product from acrylic acid, a dimer acid which is a reaction product from methacrylic acid, a trimer acid which is a reaction product from methacrylic acid, a dimer acid which is a reaction product from acrylic acid and methacrylic acid, a trimer acid which is a reaction product from acrylic acid and methacrylic acid, a dimer acid which is a reaction product from oleic acid, a trimer acid which is a reaction product from oleic acid, a dimer acid which is a reaction product from linoleic acid, a trimer acid which is a reaction product from linoleic acid, a dimer acid which is a reaction product from linolenic acid, a trimer acid which is a reaction product from linolenic acid, a dimer acid which is a reaction product from acrylic acid and oleic acid, a trimer acid which is a reaction product from acrylic acid and oleic acid, a dimer acid which is a reaction product from acrylic acid and linoleic acid, a trimer acid which is a reaction product from acrylic acid and linoleic acid, a dimer acid which is a reaction product from acrylic acid and linolenic acid, a trimer acid which is a reaction product from acrylic acid and linolenic acid, a dimer acid which is a reaction product from methacrylic acid and oleic acid, a trimer acid which is a reaction product from methacrylic acid and oleic acid, a dimer acid which is a reaction product from methacrylic acid and linoleic acid, a trimer acid which is a reaction product from methacrylic acid and linoleic acid, a dimer acid which is a reaction product from methacrylic acid and linolenic acid, a trimer acid which is a reaction product from methacrylic acid and linolenic acid, a dimer acid which is a reaction product from oleic acid and linolenic acid, a trimer acid which is a reaction product from oleic acid and linolenic acid, a dimer acid which is a reaction product from linoleic acid and linolenic acid, a trimer acid which is a reaction product from linoleic acid and linolenic acid, a hydrogenated dimer acid obtained by adding hydrogen to a dimer acid other than the above-described reaction product from oleic acid and linoleic acid, and a hydrogenated trimer acid obtained by adding hydrogen to a trimer acid other than the reaction product from oleic acid and linoleic acid.

The organic acids other than the (carboxyalkyl) isocyanurate adduct are optional components added to the flux of the first embodiment for improving wet spreadability of solder, and one kind or two or more kinds thereof may be used. It is preferable that the content of an organic acid other than the (carboxyalkyl) isocyanurate adduct be 0 wt % to 10.0 wt %.

Examples of amines include monoethanolamine, diphenylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazine-isocyanuric acid adduct, a 2-phenylimidazole-isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, a 2,4-diamino-6-vinyl-s-triazine-isocyanuric acid adduct, 2,4-diamino-6-methacryloyloxyethyl-s-triazine, an epoxy-imidazole adduct, 2-methylbenzimidazole, 2-octylbenzimidazole, 2-pentylbenzimidazole, 2-(1-ethylpentyl)-benzimidazole, 2-nonylbenzimidazole, 2-(4-thiazolyl) benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazole-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazole-1-yl)methyl]imino]bisethanol, 1-(1',2'-dicarboxyethyl) benzotriazole, 1-(2,3-dicarboxypropyl)benzotriazole, 1-[(2-ethylhexyl) amino)methyl]benzotriazole, 2,6-bis[(1H-benzimidazole-1-yl)methyl]-4-methylphenol, 5-methylbenzotriazole, 5-phenyltetrazole, a polyethylene glycol-polypropylene glycol copolymer (terminal diamine PEG-PPG copolymer) having amino groups at both terminal groups, dimethylamine, 1-aminopropane, isopropylamine, trimethylamine, allylamine, n-butylamine, diethylamine, sec-butylamine, tert-butylamine, N,N-dimethylethylamine, isobutylamine, cyclohexylamine, aniline, N-methylaniline, diphenylamine, N-isopropylaniline, p-isopropylaniline, 2-aminoethanol, 2-(ethylamino)ethanol, diethanolamine, diisopropanolamine, triethanolamine, N-butyldiethanolamine, triisopropanolamine, N,N-bis(2-hydroxyethyl)-N-cyclohexylamine, N,N,N',N'-tetrakis(2-hydroxypropyl) ethylenediamine, N,N,N',N''N''-pentakis(2-hydroxypropyl) diethylenetriamine, alanine, arginine, asparagine, aspartic acid, cysteine hydrochloride, glutamine, glutamic acid, glycine, histidine, isoleucine, leucine, lysine monohydrochloride, methionine, phenylalanine, proline, serine, threonine, tryptophan, tyrosine, valine, β-alanine, γ-aminobutyric acid, δ-aminovaleric acid, ε-aminohexanoic acid, ε-caprolactam, 7-aminoheptanoic acid, dicyandiamide, 1,3-diphenylguanidine, 1,3-di-o-tolylguanidine, and tetrakis(2-hydroxydipropyl)ethylenediamine.

The amine is an optional component added to the flux of the first embodiment for improving wet spreadability of solder, and one kind or two or more kinds thereof may be used. The content of amine is preferably 0 wt % to 10.0 wt %.

Examples of organic halogen compounds include trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, 2,3-dichloro-1-propanol, 1,1,2,2-tetrabromoethane, 2,2,2-tribromoethanol, pentabromoethane, carbon tetrabromide, 2,2-bis(bromomethyl)-1,3-propanediol, meso-2,3-dibromosuccinic acid, chloroalkanes, chlorinated fatty acid esters, n-hexadecyltrimethylammonium bromide, 2,2-bis[3,5-dibromo-4-(2,3-dibromopropoxy)phenyl]propane, bis[3,5-dibromo-4-(2,3-dibromopropoxy)phenyl] sulfone, ethylenebispentabromobenzene, 2-chloromethyloxirane, brominated bisphenol A type epoxy resin, tetrabromophthalic acid, and bromosuccinic acid which are organic bromo compounds. In addition, other examples thereof include chloroalkanes, chlorinated fatty acid esters, HET acid, and HET anhydride which are organic chloro compounds. Furthermore, still other examples thereof include a fluorine-based surfactant, a surfactant having a perfluoroalkyl group, and polytetrafluoroethylene which are organic fluoro compounds.

The organic halogen compound is an optional component added to the flux of the first embodiment for improving wet spreadability of solder, and one kind or two or more kinds thereof may be used. The content of organic halogen compound is preferably 0 wt % to 5.0 wt %.

An amine hydrohalide is a compound obtained by reacting an amine and a hydrogen halide, and examples thereof include aniline hydrogen chloride and aniline hydrogen bromide. The above-described amines may be used as amines of amine hydrohalides, and examples thereof include ethylamine, ethylenediamine, triethylamine, methylimidazole, and 2-ethyl-4-methylimidazole, and examples of hydrogen halides include hydrides of chlorine, bromine, iodine, and fluorine (hydrogen chloride, hydrogen bromide, hydrogen iodide, and hydrogen fluoride). Examples of such amine hydrohalides include stearylamine hydrochloride, diethylaniline hydrochloride, diethanolamine hydrochloride, 2-ethylhexylamine hydrobromide, pyridine hydrobromide, isopropylamine hydrobromide, cyclohexylamine hydrobromide, diethylamine hydrobromide, monoethylamine hydrobromide, 1,3-diphenylguanidine hydrobromide, dimethylamine hydrobromide, dimethylamine hydrochloride, rosin amine hydrobromide, 2-ethylhexylamine hydrochloride, isopropylamine hydrochloride, cyclohexylamine hydrochloride, 2-pipecoline hydrobromide, 1,3-diphenylguanidine hydrochloride, dimethylbenzylamine hydrochloride, hydrazine hydrate hydrobromide, dimethylcyclohexylamine hydrochloride, trinonylamine hydrobromide, diethylaniline hydrobromide, 2-diethylaminoethanol hydrobromide, 2-diethylaminoethanol hydrochloride, ammonium chloride, diallylamine hydrochloride, diallylamine hydrobromide, monoethylamine hydrochloride, diethylamine hydrochloride, triethylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylamine hydrochloride, dodecylamine hydrochloride, dimethylcyclohexylamine hydrobromide, ethylenediamine dihydrobromide, 2-phenylimidazole hydrobromide, 4-benzylpyridine hydrobromide, L-glutamate hydrochloride, N-methylmorpholine hydrochloride, betaine hydrochloride, 2-pipecoline hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosin amine hydrofluoride, cyclohexylamine tetrafluoroborate, and dicyclohexylamine tetrafluoroborate. In addition, the flux may contain a borofluoride instead of or in combination with an amine hydrohalide, and examples of borofluorides include fluoroboric acid.

The amine hydrohalide is an optional component added to the flux of the first embodiment for improving wet spreadability of solder, and one kind or two or more kinds thereof may be used. The content of amine hydrohalide is preferably 0 wt % to 5.0 wt %.

The flux of the first embodiment may further contain a thixotropic agent and a metal deactivator.

Examples of thixotropic agents include an ester-based thixotropic agent and an amide-based thixotropic agent. Examples of ester-based thixotropic agents include hydrogenated castor oil. Examples of amide-based thixotropic agents include lauric acid amide, palmitic acid amide, stearic acid amide, behenic acid amide, hydroxystearic acid amide, saturated fatty acid amides, oleic acid amide, erucic acid amide, unsaturated fatty acid amides, p-toluene methane amide, aromatic amides, methylenebisstearic acid amide, ethylenebislauric acid amide, ethylenebishydroxystearic acid amide, saturated fatty acid bisamide, methylenebisoleic acid amide, unsaturated fatty acid bisamide, m-xylylenebisstearic acid amide, aromatic bisamides, saturated fatty acid polyamides, unsaturated fatty acid polyamides, aromatic polyamides, substituted amides, methylol stearic acid amide, methylol amide, and fatty acid ester amides.

The thixotropic agent is an optional component added to the flux of the first embodiment for improving wet spreadability of solder, and one kind or two or more kinds thereof may be used. The content of thixotropic agent is preferably 0 wt % to 10.0 wt %.

Examples of metal deactivators include a hindered phenolic metal deactivator and a nitrogen compound-based metal deactivator. Examples of hindered phenolic metal deactivators include bis(3-(3-tert-butyl-4-hydroxy-5-methylphenyl)propionic acid), and N,N'-hexamethylenebis(3-(3,5-di-tert-butyl-4-hydroxyphenyl)propanamide). Examples of nitrogen compound-based metal deactivators include N-(2H-1,2,4-triazol-5-yl)salicylamide.

The metal deactivator is an optional component added to the flux of the first embodiment for improving wet spreadability of solder, and one kind or two or more kinds thereof may be used.

Examples of solvents include water, ester-based solvents, alcohol solvents, glycol ether-based solvents, and terpineols. Examples of ester-based solvents include alkyl fatty acids, butyl stearate, 2-ethylhexyl stearate, isotridecyl stearate, methyl oleate, isobutyl oleate, methyl coconut fatty acids, methyl laurate, isopropyl myristate, isopropyl palmitate, 2-ethylhexyl palmitate, and octyldodecyl myristate. Examples of alcoholic solvents include ethanol, industrial ethanol (mixed solvent obtained by adding methanol and/or isopropyl alcohol to ethanol), isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl]ether, 1-ethynyl-1-cyclohexanol, 1,4-cyclohexanediol, 1,4-cyclohexane dimethanol, erythritol, threitol, guaiacol glycerol ether, 3,6-dimethyl-4-octyne-3,6-diol, and 2,4,7,9-tetramethyl-5-decyne-4,7-diol. Examples of glycol ether-based solvents include hexyl diglycol, diethylene glycol mono-2-ethylhexyl ether, ethylene glycol monophenyl ether, 2-methylpentane-2,4-diol, diethylene glycol monohexyl ether, diethylene glycol dibutyl ether, triethylene glycol monobutyl ether, 1,3-butylene glycol, phenyl glycol, and hexylene glycol.

The solvent is an essential component in the flux of the first embodiment for improving wet spreadability of solder, and one kind or two or more kinds thereof may be used. In a case where the flux contains only a (carboxyalkyl) isocyanurate adduct, a resin, and a solvent as essential components with predetermined contents thereof as described above, the content of solvent is the remainder of the content of the essential components.

Furthermore, in a case where the flux contains any one or a combination of an organic acid, an amine, an organic halogen compound, an amine hydrohalide, and a thixotropic agent with predetermined contents thereof as described above, the content of solvent is the remainder of the content of these optionally added components and the essential components.

A flux of a second embodiment includes: an acrylic resin; tris(2-carboxyethyl) isocyanurate; any one of a dimer acid, a trimer acid, a hydrogenated dimer acid obtained by adding hydrogen to a dimer acid, and a hydrogenated trimer acid obtained by adding hydrogen to a trimer acid or two or more kinds of a dimer acid, a trimer acid, a hydrogenated dimer acid obtained by adding hydrogen to a dimer acid, and a hydrogenated trimer acid obtained by adding hydrogen to a trimer acid; and a solvent.

In a case where soldering is performed in a reflow furnace using solder paste containing the flux of the second embodiment and metal powder, an oxide which causes non-wetting of solder is removed, whereby wettability of the solder is improved. In addition, the oxide which also causes voids is removed, whereby generation of voids may be reduced. Furthermore, flux residues become soft residues due to the addition of an acrylic resin, and therefore, temperature cycle reliability is improved.

In the flux of the second embodiment in which wettability of solder is improved, generation of voids is reduced, and temperature cycle reliability is improved, the above-described acrylic resins are essential components, and one kind or two or more kinds thereof may be used. The content of acrylic resin in the flux of the second embodiment is preferably 5.0 wt % to 25.0 wt % and more preferably 10.0 wt % to 20.0 wt %.

In addition, in the flux of the second embodiment in which wettability of solder is improved, generation of voids is reduced, and temperature cycle reliability is improved, the above-described tris(2-carboxyethyl) isocyanurate is an essential component, and the content of tris(2-carboxyethyl) isocyanurate in the flux of the second embodiment is preferably 2.0 wt % to 15.0 wt %.

Furthermore, in the flux of the second embodiment in which wettability of solder is improved, generation of voids is reduced, and temperature cycle reliability is improved, the above-described dimer acid, trimer acid, hydrogenated dimer acid, and hydrogenated trimer acid are essential components, and one kind or two or more kinds thereof may be used. The contents of dimer acid, trimer acid, hydrogenated dimer acid, and hydrogenated trimer acid in the flux of the second embodiment are preferably 5.0 wt % to 25.0 wt %. The dimer acid, the trimer acid, the hydrogenated dimer acid, and the hydrogenated trimer acid are also collectively called dimer acids. In the flux of the second embodiment, the (tris(2-carboxyethyl) isocyanurate/dimer acid) ratios of tris (2-carboxyethyl) isocyanurate to dimer acids are preferably 0.1 to 1.5.

In addition, in the flux of the second embodiment in which wettability of solder is improved, generation of voids is reduced, and temperature cycle reliability is improved, the above-described solvents are essential components, and one kind or two or more kinds thereof may be used. In a case where the flux of the second embodiment contains: only an acrylic resin; tris(2-carboxyethyl) isocyanurate; and any one of a dimer acid, a trimer acid, a hydrogenated dimer acid obtained by adding hydrogen to a dimer acid, and a hydrogenated trimer acid obtained by adding hydrogen to a trimer acid or two kinds of a dimer acid, a trimer acid, a hydrogenated dimer acid obtained by adding hydrogen to a dimer acid, and a hydrogenated trimer acid obtained by adding hydrogen to a trimer acid as essential components with predetermined contents thereof as described above, the content of solvent in the flux is the remainder of the content of the essential components.

In the flux of the second embodiment in which wettability of solder is improved, generation of voids is reduced, and temperature cycle reliability is improved, the above-described rosin is an optionally added component, and one kind or two or more kinds thereof may be used. The content of rosin in the flux of the second embodiment is preferably 0 wt % to 30.0 wt % and more preferably 2.0 wt % to 15.0 wt %. In addition, in a case where the flux contains rosin, the (acrylic resin/rosin) ratio of the acrylic resin to the rosin is preferably 0.5 to 9.0.

In addition, in the flux of the second embodiment in which wettability of solder is improved, generation of voids is reduced, and temperature cycle reliability is improved, the above-described other resins are optionally added components, and one kind or two or more kinds thereof may be used. The content of the other resin in the flux of the second embodiment is preferably 0 wt % to 10.0 wt %.

Furthermore, in the flux of the second embodiment in which wettability of solder is improved, generation of voids is reduced, and temperature cycle reliability is improved, the above-described other organic acids are optionally added components, and one kind or two or more kinds thereof may be used. The content of the other organic acid in the flux of the second embodiment is preferably 0 wt % to 10.0 wt %.

In addition, in the flux of the second embodiment in which wettability of solder is improved, generation of voids is reduced, and temperature cycle reliability is improved, the above-described amines are optionally added components, and one kind or two or more kinds thereof may be used. The content of amine in the flux of the second embodiment is preferably 0 wt % to 5.0 wt %.

Furthermore, in the flux of the second embodiment in which wettability of solder is improved, generation of voids is reduced, and temperature cycle reliability is improved, the above-described organic halogen compounds are optionally added components, and one kind or two or more kinds thereof may be used. The content of organic halogen compound in the flux of the second embodiment is preferably 0 wt % to 5.0 wt % and more preferably 0 wt % to 2.5 wt %.

In addition, in the flux of the second embodiment in which wettability of solder is improved, generation of voids is reduced, and temperature cycle reliability is improved, the above-described amine hydrohalides are optionally added components, and one kind or two or more kinds thereof may be used. The content of amine hydrohalide in the flux of the second embodiment is preferably 0 wt % to 5.0 wt % and more preferably 0 wt % to 1.2 wt %.

Furthermore, in the flux of the second embodiment in which wettability of solder is improved, generation of voids is reduced, and temperature cycle reliability is improved, the above-described thixotropic agents are optionally added components, and one kind or two or more kinds thereof may be used. The content of thixotropic agent in the flux of the second embodiment is preferably 0 wt % to 10.0 wt %.

In addition, in the flux of the second embodiment in which wettability of solder is improved, generation of voids is reduced, and temperature cycle reliability is improved, the above-described metal deactivators are optionally added components, and one kind or two or more kinds thereof may be used. It is preferable that the content of metal deactivator in the flux of the second embodiment be 0 wt % to 10.0 wt % for a hindered phenolic metal deactivator and be 0 wt % to 5.0 wt % for a nitrogen compound-based metal deactivator.

A flux of a third embodiment contains rosin, tris(2-carboxyethyl) isocyanurate, and a solvent. In the flux of the third embodiment, the content of tris(2-carboxyethyl) isocyanurate is 0.1 wt % to 15.0 wt %.

Accordingly, in a case where soldering is performed in a reflow furnace using solder paste containing the flux of the third embodiment and metal powder, an oxide which causes voids is removed, whereby generation of voids may be reduced. In addition, wettability of solder may be improved due to the removal of an oxide.

In the flux of the third embodiment in which generation of voids is reduced and the wettability of the solder is able to be improved, tris(2-carboxyethyl) isocyanurate is an essential component, and the content of tris(2-carboxyethyl) isocyanurate is preferably 0.1 wt % to 15.0 wt %.

In addition, the flux of the third embodiment may contain another activator in addition to tris(2-carboxyethyl) isocyanurate. In the case where the flux contains the other activator, the effect of removing an oxide may be enhanced.

Examples of the other activator include organic acids, organic halogen compounds, amines, and amine hydrohalides.

Examples of organic acids include glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, terephthalic acid, dodecanedioic acid, parahydroxyphenylacetic acid, picolinic acid, phenylsuccinic acid, phthalic acid, fumaric acid, maleic acid, malonic acid, lauric acid, benzoic acid, tartaric acid, glycine, 1,3-cyclohexanedicarboxylic acid, 2,2-bis(hydroxymethyl) propionic acid, 2,2-bis(hydroxymethyl)butanoic acid, 2,3-dihydroxybenzoic acid, 2,4-diethylglutaric acid, 2-quinolinecarboxylic acid, 3-hydroxybenzoic acid, malic acid, p-anisic acid, stearic acid, 12-hydroxystearic acid, oleic acid, linoleic acid, and linolenic acid.

Examples of organic halogen compounds include 1-bromo-2-propanol, 3-bromo-1-propanol, 3-bromo-1,2- propanediol, 1-bromo-2-butanol, 1,3-dibromo-2-propanol, 2,3-dibromo-1-propanol, 1,4-dibromo-2-butanol, 2,3-dibromo-1,4-butanediol, and trans-2,3-dibromo-2-butene-1,4-diol.

Examples of amines include ethylamine, diethylamine, triethylamine, ethylenediamine, cyclohexylamine, 1,3-diphenylguanidine, 1,3-di-o-tolylguanidine, and 1-o-tolylbiguanide.

An amine hydrohalide is a compound obtained by reacting an amine and a hydrogen halide, and examples of amines include ethylamine, diethylamine, triethylamine, ethylenediamine, 1,3-diphenylguanidine, 1,3-di-o-tolylguanidine, and 1-o-tolylbiguanide, and examples of hydrogen halides include hydrides of chlorine, bromine, and iodine.

In the flux of the third embodiment in which generation of voids is reduced and the wettability of the solder is able to be improved, the other activators are optionally added components, and the flux of the third embodiment contains a total amount of 0 wt % to 15.0 wt % of these other activators.

In addition, the flux of the third embodiment contains 10.0 wt % to 50.0 wt % of rosin and 30.0 wt % to 60.0 wt % of a solvent as essential components. The flux of the third embodiment further contains 0 wt % to 10.0 wt % of a thixotropic agent as an optionally added component. The flux of the third embodiment may further contain 0 wt % to 5.0 wt % of an imidazole compound and 0 wt % to 8.0 wt % of an antioxidant as optionally added components.

Examples of rosin include raw rosin such as gum rosin, wood rosin, and tall oil rosin, and derivatives obtained from the raw rosin. Examples of the derivatives include purified rosin, hydrogenated rosin, disproportionated rosin, polymerized rosin, acid-modified rosin, phenol-modified rosin, an α,β-unsaturated carboxylic acid-modified product (such as acrylated rosin, maleated rosin, or fumarated rosin), a purified product, a hydride, and a disproportionated product of the polymerized rosin, and a purified product, a hydride, and a disproportionated product of α,β-unsaturated carboxylic acid-modified products.

Examples of solvents include an alcoholic solvent, a glycol ether-based solvent, and terpineols. Examples of alcoholic solvents include isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 2-methylpentane-2,4-diol, 1,1,1-tris(hydroxymethyl)propane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, 1-ethynyl-1-cyclohexanol, 1,4-cyclohexanediol, 1,4-cyclohexane dimethanol, and 2,4,7,9-tetramethyl-5-decyne-4,7-diol. Examples of glycol ether-based solvents include diethylene glycol mono-2-ethylhexyl ether, ethylene glycol monophenyl ether, diethylene glycol monohexyl ether, diethylene glycol dibutyl ether, triethylene glycol monobutyl ether, methyl propylene triglycol, butyl propylene triglycol, triethylene glycol butyl methyl ether, and tetraethylene glycol dimethyl ether.

Examples of thixotropic agents include a wax-based thixotropic agent and an amide-based thixotropic agent. Examples of wax-based thixotropic agents include hydrogenated castor oil. Examples of amide-based thixotropic agents include lauric acid amide, palmitic acid amide, stearic acid amide, behenic acid amide, hydroxystearic acid amide, saturated fatty acid amides, oleic acid amide, erucic acid amide, unsaturated fatty acid amides, p-toluene methane amide, aromatic amides, methylenebisstearic acid amide, ethylenebislauric acid amide, ethylenebishydroxystearic acid amide, saturated fatty acid bisamide, methylenebisoleic acid amide, unsaturated fatty acid bisamide, m-xylylenebisstearic acid amide, aromatic bisamide, saturated fatty acid polyamide, unsaturated fatty acid polyamide, aromatic polyamides, substituted amides, methylol stearic acid amide, methylol amide, and fatty acid ester amides.

Examples of imidazole compounds include imidazole, 2-ethyl imidazole, 2-methylimidazole, 2-undecylimidazole, 2-heptadecylimidazole, 1,2-dimethylimidazole, 2-ethyl-4-methylimidazole, 2-phenylimidazole, 4-methyl-2-phenylimidazole, 1-benzyl-2-methylimidazole, and 1-benzyl-2-phenylimidazole.

Examples of antioxidants include a hindered phenol-based antioxidant.

The flux may contain a nonionic surfactant. The nonionic surfactant functions as a water-soluble resin. In a case where the flux contains a nonionic surfactant instead of the above-described resin, the flux has excellent water washability. Examples of nonionic surfactants include polyalkylene glycols, alcohol-polyalkylene glycol adducts and carboxylic acid-polyalkylene glycol adducts.

Examples of polyalkylene glycols include polyethylene glycol (PEG) and a polyethylene glycol-polypropylene glycol copolymer (PEG-PPG copolymer).

Examples of alcohol-polyalkylene glycol adducts include alcohol-polyalkylene glycol EO adducts obtained by adding ethylene oxide to an alcohol-polyalkylene glycol for polymerization and alcohol-polyalkylene glycol EO/PO adducts obtained by adding ethylene oxide and propylene oxide to an alcohol-polyalkylene glycol for polymerization. Examples of such alcohol-polyalkylene glycol adducts include a cetyl alcohol EO adduct and a cetyl alcohol EO/PO adduct which have 16 carbon atoms, a stearyl alcohol EO adduct and a stearyl alcohol EO/PO adduct which have 18 carbon atoms, a behenyl alcohol EO adduct and a behenyl alcohol EO/PO adduct which have 22 carbon atoms, and a resorcinol EO adduct and a resorcinol EO/PO adduct which have 6 carbon atoms.

Examples of carboxylic acid-polyalkylene glycol adducts include carboxylic acid-polyalkylene glycol EO adducts and carboxylic acid-polyalkylene glycol EO/PO adducts. Examples of such carboxylic acid-polyalkylene glycol adducts include a palmitic acid EO adduct and a palmitic acid EO/PO adduct which have 16 carbon atoms, a stearic acid EO adduct and a stearic acid EO/PO adduct which have 18 carbon atoms, and a behenic acid EO adduct and a behenic acid EO/PO adduct which have 22 carbon atoms.

In order to realize a water-soluble flux, the flux preferably contains 5.0 wt % to 20.0 wt % of the above-described nonionic surfactant instead of the above-described resin and more preferably contains 10.0 wt % to 20.0 wt % thereof. In addition, the flux may contain less than or equal to 5.0 wt % of rosin.

In addition, in order to realize a water-soluble flux, it is preferable that the flux contain 1.0 wt % to 10.0 wt % of an organic acid and contain any one or two or more of diglycolic acid, glutaric acid, and 2,2-bis(hydroxymethyl)propionic acid as organic acids. In addition, it is preferable that the flux contain 30.0 wt % to 55.0 wt % of an amine and contain any one or two or more of terminal diamine PEG-PPG copolymer, tetrakis(2-hydroxydipropyl)ethylenediamine, and 2-methylimidazole as amines. Furthermore, it is preferable that the flux contain 0 wt % to 5.0 wt % of an amine hydrohalide and contain ethylamine-HBr as an amine hydrohalide. In addition, it is preferable that, as the remainder, the flux contain any one or two or more of 1,3-butylene glycol, phenyl glycol, and hexylene glycol as a solvent.

One Example of Solder Paste of Present Embodiment

The solder paste of the present embodiment contains the flux of the above-described first embodiment, second embodiment, or third embodiment, and metal powder. The metal powder is preferably solder not containing Pb, and is composed of Sn alone, an Sn—Ag-based alloy, an Sn—Cu-based alloy, an Sn—Ag—Cu-based alloy, an Sn—Bi-based alloy, an Sn—In-based alloy, or the like, or solder powder obtained by adding Sb, Bi, In, Cu, Zn, As, Ag, Cd, Fe, Ni, Co, Au, Ge, P, or the like to these alloys.

Example of Effect of Flux and Solder Paste of Present Embodiment

In the flux of the first embodiment which contains 0.5 wt % to 20.0 wt % of a (carboxyalkyl) isocyanurate adduct, 5.0 wt % to 50.0 wt % of rosin, and a solvent and solder paste in which this flux of the first embodiment is used, an oxide which causes non-wetting of solder is removed by performing soldering in a reflow furnace, whereby wet spreadability of the solder is improved.

In the flux of the second embodiment which contains 5.0 wt % to 25.0 wt % of an acrylic resin, 2.0 wt % to 15.0 wt % of tris(2-carboxyethyl) isocyanurate, 5.0 wt % to 25.0 wt % of any one of a dimer acid, a trimer acid, a hydrogenated dimer acid obtained by adding hydrogen to a dimer acid, and a hydrogenated trimer acid obtained by adding hydrogen to a trimer acid or two or more kinds of a dimer acid, a trimer acid, a hydrogenated dimer acid obtained by adding hydrogen to a dimer acid, and a hydrogenated trimer acid obtained by adding hydrogen to a trimer acid, and a solvent as a remainder, and solder paste in which this flux of the second embodiment is used, an oxide which causes non-wetting of solder is removed by performing soldering in a reflow furnace, whereby wettability of the solder is improved. In addition, the oxide which also causes voids is removed, whereby generation of voids may be reduced. Furthermore, flux residues become soft residues, and therefore, temperature cycle reliability is improved.

In the flux of the third embodiment which contains at least rosin, tris(2-carboxyethyl) isocyanurate, and a solvent and in which the content of tris(2-carboxyethyl) isocyanurate is 0.1 wt % to 15 wt %, and solder paste in which this flux of the third embodiment is used, an effect of removing an oxide in a desired temperature range is enhanced. Accordingly, the oxide which causes voids is removed, whereby generation of voids may be reduced. In addition, wettability of solder to a joining component may be improved due to the removal of an oxide.

EXAMPLES

Fluxes of examples and comparative examples having compositions shown in Tables 1 to 9 as follows were prepared to verify wet spreadability of solder for the flux of the first embodiment according to the present invention. The composition ratios in Tables 1 to 9 are shown by wt % in a case where the total amount of flux is set to 100.

<Evaluation of Wet Spreadability of Solder>

(1) Verification Method

For an evaluation of solderability, a flux composition of each of the examples and comparative examples was applied on a Cu plate, a solder ball was mounted on the flux composition applied on the Cu plate, and reflowing was performed, followed by measuring a wet-spread diameter of solder. As the composition of the solder, an Sn—Ag—Cu-based solder alloy having a composition of 3.0 wt % of Ag, 0.5 wt % of Cu, and Sn as a remainder was used.

First, flux printing was performed on a Bare-Cu plate of 30 mm long×30 mm wide×0.3 mm depth with a squeegee using a mask having an opening diameter φ of 0.23 mm and a thickness of 0.1 mm for evaluating a φ0.3 mm ball. A φ0.3 mm solder ball was placed in a printing area of a mask opening in a flux printing portion of the Cu plate, and atmospheric reflowing was performed with a high temperature observation device in a state where 10 or more solder balls were placed on one sheet of the Cu plate. As the reflow conditions, preheating was performed at 190° C. for 120 seconds in an air atmosphere, and then, main heating was performed by increasing the temperature from 190° C. to 260° C. at a rate of temperature increase of 1° C./sec.

When measuring the wet-spread diameter of solder, diameters of one bump were measured in 4 directions which were a vertical direction, a horizontal direction, a right oblique direction, and a left oblique direction, and an arithmetic average value was taken as a wet-spread diameter of the solder of one bump. The arithmetic average value when N=10 was set as a wet-spread diameter of solder.

(2) Determination Criteria

○: Solder was wet-spread to a diameter of greater than or equal to 0.4 mm (=400 um).

x: Solder was wet-spread to a diameter of less than 0.4 mm.

TABLE 1

| Material category | | Material type | Example A1 | Example A2 | Example A3 | Example A4 | Example A5 | Example A6 | Example A7 |
|---|---|---|---|---|---|---|---|---|---|
| Resin | Rosin | Polymerized rosin | 45 | | | 25 | 45 | 45 | 45 |
| | | Hydrogenated rosin | | 45 | | | | | |
| | | Acid-modified rosin | | | 45 | 20 | | | |
| | Other resins | Acrylic resin | | | | | | | |
| | | Acryl-polyethylene copolymer resin | | | | | | | |
| Activator | Organic acid | Glutaric acid | | | | | | | |
| | | Adipic acid | | | | | | | |
| | | Hydrogenated dimer acid | | | | | | | |
| | (2-Carboxyalkyl) isocyanurate adduct | Tris (2-carboxyethyl) isocyanurate | 5 | 5 | 5 | 5 | 20 | 20 | 20 |

TABLE 1-continued

| Material category | | Material type | | | | | | | |
|---|---|---|---|---|---|---|---|---|---|
| | Amine | Monoethanolamine | 5 | 5 | 5 | 5 | 0 | 0.1 | 0.5 |
| | | Diphenylguanidine | | | | | | | |
| | | 2-Phenylimidazole | | | | | | | |
| | | 2-Phenyl-4-methylimidazole | | | | | | | |
| | Organic halogen compound | Trans-2,3-dibromo-1,4-butenediol | 1 | 1 | 1 | 1 | 1 | 1 | 1 |
| | | Triallyl isocyanurate hexabromide | | | | | | | |
| | Amine hydrohalides | Aniline HCl | | | | | | | |
| | | Aniline HBr | | | | | | | |
| Solvent | Solvent | Hexyl diglycol | 39 | 39 | 39 | 39 | 29 | 28.9 | 28.5 |
| Thixotropic agent | Ester-based thixotropic agent | Hydrogenated castor oil | 5 | 5 | 5 | 5 | 5 | 5 | 5 |
| | Amide-based thixotropic agent | Polyamide-based thixotropic agent | | | | | | | |
| | | Bisamide-based thixotropic agent | | | | | | | |
| | | Amide-based thixotropic agent | | | | | | | |
| | Total amount | | 100 | 100 | 100 | 100 | 100 | 100 | 100 |
| Evaluation | Wet spreadability | | ○ | ○ | ○ | ○ | ○ | ○ | ○ |

| Material category | | Material type | Example A8 | Example A9 | Example A10 | Example A11 | Example A12 | Example A13 | Example A14 |
|---|---|---|---|---|---|---|---|---|---|
| Resin | Rosin | Polymerized rosin | 45 | 45 | 45 | 45 | 45 | 45 | 45 |
| | | Hydrogenated rosin | | | | | | | |
| | | Acid-modified rosin | | | | | | | |
| | Other resins | Acrylic resin | | | | | | | |
| | | Acryl-polyethylene copolymer resin | | | | | | | |
| Activator | Organic acid | Glutaric acid | | 5 | 5 | 5 | 5 | 10 | |
| | | Adipic acid | | | | | | | 5 |
| | | Hydrogenated dimer acid | | | | | | | |
| | (2-Carboxyalkyl) isocyanurate adduct | Tris (2-carboxyethyl) isocyanurate | 5 | 0.5 | 5 | 5 | 5 | 5 | 5 |
| | Amine | Monoethanolamine | 10 | 10 | | | | | |
| | | Diphenylguanidine | | | 2 | | | | |
| | | 2-Phenylimidazole | | | | 2 | | | |
| | | 2-Phenyl-4-methylimidazole | | | | | 2 | | |
| | Organic halogen compound | Trans-2,3-dibromo-1,4-butenediol | 1 | 1 | 1 | 1 | 1 | 1 | 1 |
| | | Triallyl isocyanurate hexabromide | | | | | | | |
| | Amine hydrohalides | Aniline HCl | | | | | | | |
| | | Aniline HBr | | | | | | | |
| Solvent | Solvent | Hexyl diglycol | 34 | 33.5 | 37 | 37 | 37 | 34 | 39 |
| Thixotropic agent | Ester-based thixotropic agent | Hydrogenated castor oil | 5 | 5 | 5 | 5 | 5 | 5 | 5 |
| | Amide-based thixotropic agent | Polyamide-based thixotropic agent | | | | | | | |
| | | Bisamide-based thixotropic agent | | | | | | | |
| | | Amide-based thixotropic agent | | | | | | | |
| | Total amount | | 100 | 100 | 100 | 100 | 100 | 100 | 100 |
| Evaluation | Wet spreadability | | ○ | ○ | ○ | ○ | ○ | ○ | ○ |

TABLE 2

| Material category | | Material type | Example A15 | Example A16 | Example A17 | Example A18 | Example A19 | Example A20 | Example A21 | Example A22 | Example A23 | Example A24 | Example A25 | Example A26 | Comparative Example A1 | Comparative Example A2 |
|---|---|---|---|---|---|---|---|---|---|---|---|---|---|---|---|---|
| Resin | Rosin | Polymerized rosin | 45 | 45 | 45 | 45 | 45 | 45 | 45 | 45 | 45 | 25 | 40 | 5 | 45 | 45 |
| | | Hydrogenated rosin | | | | | | | | | | | | 20 | | |
| | | Acid-modified rosin | | | | | | | | | | | | 10 | | |
| | Other resins | Acrylic resin | | | | | | 5 | | | | | | | | |
| | | Acryl-polyethylene copolymer resin | | | | | | | | | | | | | | |
| Activator | Organic acid | Glutaric acid | 5 | 5 | 5 | 5 | 5 | 5 | 5 | 5 | 5 | 10 | 5 | 5 | 5 | |
| | | Adipic acid | | | | | | | | | | 10 | | 5 | | |
| | | Hydrogenated dimer acid | | | | | | | | | | | | | | 5 |
| | (2-Carboxyalkyl) isocyanurate adduct | Tris (2-carboxyethyl) isocyanurate | 5 | 5 | 5 | 5 | 5 | 5 | 5 | 5 | 5 | 5 | 5 | 5 | | |
| | Amine | Monoethanolamine | 5 | 5 | 5 | 5 | 5 | 5 | 5 | 5 | 5 | 5 | 5 | 5 | 5 | 5 |
| | | Diphenylguanidine | | | | | | | | | | | | | | |
| | | 2-Phenylimidazole | | | | | | | | | | | | | | |
| | | 2-Phenyl-4-methylimidazole | | | | | | | | | | | | | | |
| | Organic halogen compound | Trans-2,3-dibromo-1,4-butenediol | 0 | 5 | | | | 1 | 1 | 1 | 1 | 1 | 1 | 1 | 1 | 1 |
| | | Triallyl isocyanurate hexabromide | | | 1 | | | | | | | | | | | |
| | Amine hydrohalides | Aniline HCl | | | | 1 | 5 | | | | | | | | | |
| | | Aniline HBr | | | | | | | 5 | | | | | | | |
| Solvent | | Hexyl diglycol | 35 | 30 | 34 | 34 | 30 | 39 | 39 | 39 | 39 | 39 | 39 | 39 | 39 | 39 |
| Thixotropic agent | Ester-based thixotropic agent | Hydrogenated castor oil | 5 | 5 | 5 | 5 | 5 | 0 | | | | 5 | 5 | 5 | 5 | 5 |
| | Polyamide-based thixotropic agent | | | | | | | | | 5 | | | | | | |
| | Bisamide-based thixotropic agent | | | | | | | | | | 5 | | | | | |
| | Amide-based thixotropic agent | | | | | | | | | | | | | | | |
| Evaluation | Total amount | | 100 | 100 | 100 | 100 | 100 | 100 | 100 | 100 | 100 | 100 | 100 | 100 | 100 | 100 |
| | Wet spreadability | | ○ | ○ | ○ | ○ | ○ | ○ | ○ | ○ | ○ | ○ | ○ | ○ | × | × |

TABLE 3

| Material category | | Material type | Example B1 | Example B2 | Example B3 | Example B4 | Example B5 | Example B6 | Example B7 |
|---|---|---|---|---|---|---|---|---|---|
| Resin | Rosin | Polymerized rosin | 45 | | | 25 | 45 | 45 | 45 |
| | | Hydrogenated rosin | | 45 | | | | | |
| | | Acid-modified rosin | | | 45 | 20 | | | |
| | Other resins | Acrylic resin | | | | | | | |
| | | Acryl-polyethylene copolymer resin | | | | | | | |
| Activator | Organic acid | Glutaric acid | | | | | | | |
| | | Adipic acid | | | | | | | |
| | | Hydrogenated dimer acid | | | | | | | |
| | (2-Carboxyalkyl) isocyanurate adduct | Tris (2-carboxymethyl) isocyanurate | 5 | 5 | 5 | 5 | 20 | 20 | 20 |
| | Amine | Monoethanolamine | 5 | 5 | 5 | 5 | 0 | 0.1 | 0.5 |
| | | Diphenylguanidine | | | | | | | |
| | | 2-Phenylimidazole | | | | | | | |
| | | 2-Phenyl-4-methylimidazole | | | | | | | |
| | Organic halogen compound | Trans-2,3-dibromo-1,4-butenediol | 1 | 1 | 1 | 1 | 1 | 1 | 1 |
| | | Triallyl isocyanurate hexabromide | | | | | | | |
| | Amine hydrohalides | Aniline HCl | | | | | | | |
| | | Aniline HBr | | | | | | | |
| Solvent | Solvent | Hexyl diglycol | 39 | 39 | 39 | 39 | 29 | 28.9 | 28.5 |
| Thixotropic agent | Ester-based thixotropic agent | Hydrogenated castor oil | 5 | 5 | 5 | 5 | 5 | 5 | 5 |
| | Amide-based thixotropic agent | Polyamide-based thixotropic agent | | | | | | | |
| | | Bisamide-based thixotropic agent | | | | | | | |
| | | Amide-based thixotropic agent | | | | | | | |
| | Total amount | | 100 | 100 | 100 | 100 | 100 | 100 | 100 |
| Evaluation | Wet spreadability | | ○ | ○ | ○ | ○ | ○ | ○ | ○ |

| Material category | | Material type | Example B8 | Example B9 | Example B10 | Example B11 | Example B12 | Example B13 | Example B14 |
|---|---|---|---|---|---|---|---|---|---|
| Resin | Rosin | Polymerized rosin | 45 | 45 | 45 | 45 | 45 | 45 | 45 |
| | | Hydrogenated rosin | | | | | | | |
| | | Acid-modified rosin | | | | | | | |
| | Other resins | Acrylic resin | | | | | | | |
| | | Acryl-polyethylene copolymer resin | | | | | | | |
| Activator | Organic acid | Glutaric acid | | 5 | 5 | 5 | 5 | 10 | |
| | | Adipic acid | | | | | | | 5 |
| | | Hydrogenated dimer acid | | | | | | | |
| | (2-Carboxyalkyl) isocyanurate adduct | Tris (2-carboxymethyl) isocyanurate | 5 | 0.5 | 5 | 5 | 5 | 5 | 5 |
| | Amine | Monoethanolamine | 10 | 10 | | | | | |
| | | Diphenylguanidine | | | 2 | | | | |
| | | 2-Phenylimidazole | | | | 2 | | | |
| | | 2-Phenyl-4-methylimidazole | | | | | 2 | | |
| | Organic halogen compound | Trans-2,3-dibromo-1,4-butenediol | 1 | 1 | 1 | 1 | 1 | 1 | 1 |
| | | Triallyl isocyanurate hexabromide | | | | | | | |
| | Amine hydrohalides | Aniline HCl | | | | | | | |
| | | Aniline HBr | | | | | | | |
| Solvent | Solvent | Hexyl diglycol | 34 | 33.5 | 37 | 37 | 37 | 34 | 39 |
| Thixotropic agent | Ester-based thixotropic agent | Hydrogenated castor oil | 5 | 5 | 5 | 5 | 5 | 5 | 5 |
| | Amide-based thixotropic agent | Polyamide-based thixotropic agent | | | | | | | |
| | | Bisamide-based thixotropic agent | | | | | | | |
| | | Amide-based thixotropic agent | | | | | | | |
| | Total amount | | 100 | 100 | 100 | 100 | 100 | 100 | 100 |
| Evaluation | Wet spreadability | | ○ | ○ | ○ | ○ | ○ | ○ | ○ |

TABLE 4

| Material category | Material type | Example B15 | Example B16 | Example B17 | Example B18 | Example B19 | Example B20 | Example B21 | Example B22 | Example B23 | Example B24 | Example B25 | Example B26 | Comparative Example B1 | Comparative Example B2 |
|---|---|---|---|---|---|---|---|---|---|---|---|---|---|---|---|
| Resin | Polymerized rosin | 45 | 45 | 45 | 45 | 45 | 45 | 45 | 45 | 45 | 25 | 40 | 5 | 45 | 45 |
| | Hydrogenated rosin | | | | | | | | | | 10 | 5 | 20 | | |
| | Acid-modified rosin | | | | | | | | | | 10 | | 10 | | |
| Other resins | Acrylic resin | | | | | | 5 | | | | | | | | |
| | Acryl-polyethylene copolymer resin | | | | | | | | | | | | 5 | | |
| Activator — Organic acid | Glutaric acid | 5 | 5 | 5 | 5 | 5 | | | | | | | | | |
| | Adipic acid | | | | | | | | | | | | 5 | | |
| | Hydrogenated dimer acid | | | | | | | | | | | | | 5 | 5 |
| (2-Carboxyalkyl) isocyanurate adduct | Tris(2-carboxymethyl) isocyanurate | 5 | 5 | 5 | 5 | 5 | 5 | 5 | 5 | 5 | 5 | 5 | 5 | 5 | |
| Amine | Monoethanolamine | 5 | 5 | 5 | 5 | 5 | 5 | 5 | 5 | 5 | 5 | 5 | 5 | 5 | 5 |
| | Diphenylguanidine | | | | | | | 5 | | | | | | | |
| | 2-Phenylimidazole | | | | | | | | 5 | | | | | | |
| | 2-Phenyl-4-methylimidazole | | | | | | | | | 5 | | | | | |
| Organic halogen compound | Trans-2,3-dibromo-1,4-butenediol | 0 | 5 | | 1 | | 1 | 1 | 1 | 1 | 1 | 1 | 1 | 1 | 1 |
| | Triallyl isocyanurate hexabromide | | | 1 | | | | | | | | | | | |
| Amine hydrohalides | Aniline HCl | | | | 1 | | | | | | | | | | |
| | Aniline HBr | | | | | 5 | | | | | | | | | |
| Solvent | Hexyl diglycol | 35 | 30 | 34 | 34 | 30 | 39 | 39 | 39 | 39 | 39 | 39 | 39 | 39 | 39 |
| Thixotropic agent | Hydrogenated castor oil | 5 | 5 | 5 | 5 | 5 | 0 | 5 | 5 | 5 | 5 | 5 | 5 | 5 | 5 |
| | Polyamide-based thixotropic agent | | | | | | | | | | | | | | |
| | Bisamide-based thixotropic agent | | | | | | | | | | | | | | |
| | Amide-based thixotropic agent | | | | | | | | | | | | | | |
| Evaluation | Total amount | 100 | 100 | 100 | 100 | 100 | 100 | 100 | 100 | 100 | 100 | 100 | 100 | 100 | 100 |
| | Wet spreadability | ○ | ○ | ○ | ○ | ○ | ○ | ○ | ○ | ○ | ○ | ○ | ○ | × | × |

TABLE 5

| Material category | | Material type | Example C1 | Example C2 | Example C3 | Example C4 | Example C5 | Example C6 | Example C7 |
|---|---|---|---|---|---|---|---|---|---|
| Resin | Rosin | Polymerized rosin | 45 | | | 25 | 45 | 45 | 45 |
| | | Hydrogenated rosin | | 45 | | | | | |
| | | Acid-modified rosin | | | 45 | 20 | | | |
| | Other resins | Acrylic resin | | | | | | | |
| | | Acryl-polyethylene copolymer resin | | | | | | | |
| Activator | Organic acid | Glutaric acid | | | | | | | |
| | | Adipic acid | | | | | | | |
| | | Hydrogenated dimer acid | | | | | | | |
| | (2-Carboxyalkyl) isocyanurate adduct | Tris (2-carboxypropyl) isocyanurate | 5 | 5 | 5 | 5 | 20 | 20 | 20 |
| | Amine | Monoethanolamine | 5 | 5 | 5 | 5 | 0 | 0.1 | 0.5 |
| | | Diphenylguanidine | | | | | | | |
| | | 2-Phenylimidazole | | | | | | | |
| | | 2-Phenyl-4-methylimidazole | | | | | | | |
| | Organic halogen compound | Trans-2,3-dibromo-1,4-butenediol | 1 | 1 | 1 | 1 | 1 | 1 | 1 |
| | | Triallyl isocyanurate hexabromide | | | | | | | |
| | Amine hydrohalides | Aniline HCl | | | | | | | |
| | | Aniline HBr | | | | | | | |
| Solvent | Solvent | Hexyl diglycol | 39 | 39 | 39 | 39 | 29 | 28.9 | 28.5 |
| Thixotropic agent | Ester-based thixotropic agent | Hydrogenated castor oil | 5 | 5 | 5 | 5 | 5 | 5 | 5 |
| | Amide-based thixotropic agent | Polyamide-based thixotropic agent | | | | | | | |
| | | Bisamide-based thixotropic agent | | | | | | | |
| | | Amide-based thixotropic agent | | | | | | | |
| | Total amount | | 100 | 100 | 100 | 100 | 100 | 100 | 100 |
| Evaluation | Wet spreadability | | ○ | ○ | ○ | ○ | ○ | ○ | ○ |

| Material category | | Material type | Example C8 | Example C9 | Example C10 | Example C11 | Example C12 | Example C13 | Example C14 |
|---|---|---|---|---|---|---|---|---|---|
| Resin | Rosin | Polymerized rosin | 45 | 45 | 45 | 45 | 45 | 45 | 45 |
| | | Hydrogenated rosin | | | | | | | |
| | | Acid-modified rosin | | | | | | | |
| | Other resins | Acrylic resin | | | | | | | |
| | | Acryl-polyethylene copolymer resin | | | | | | | |
| Activator | Organic acid | Glutaric acid | | 5 | 5 | 5 | 5 | 10 | |
| | | Adipic acid | | | | | | | 5 |
| | | Hydrogenated dimer acid | | | | | | | |
| | (2-Carboxyalkyl) isocyanurate adduct | Tris (2-carboxypropyl) isocyanurate | 5 | 0.5 | 5 | 5 | 5 | 5 | 5 |
| | Amine | Monoethanolamine | 10 | 10 | | | | | |
| | | Diphenylguanidine | | | 2 | | | | |
| | | 2-Phenylimidazole | | | | 2 | | | |
| | | 2-Phenyl-4-methylimidazole | | | | | 2 | | |
| | Organic halogen compound | Trans-2,3-dibromo-1,4-butenediol | 1 | 1 | 1 | 1 | 1 | 1 | 1 |
| | | Triallyl isocyanurate hexabromide | | | | | | | |
| | Amine hydrohalides | Aniline HCl | | | | | | | |
| | | Aniline HBr | | | | | | | |
| Solvent | Solvent | Hexyl diglycol | 34 | 33.5 | 37 | 37 | 37 | 34 | 39 |
| Thixotropic agent | Ester-based thixotropic agent | Hydrogenated castor oil | 5 | 5 | 5 | 5 | 5 | 5 | 5 |
| | Amide-based thixotropic agent | Polyamide-based thixotropic agent | | | | | | | |
| | | Bisamide-based thixotropic agent | | | | | | | |
| | | Amide-based thixotropic agent | | | | | | | |
| | Total amount | | 100 | 100 | 100 | 100 | 100 | 100 | 100 |
| Evaluation | Wet spreadability | | ○ | ○ | ○ | ○ | ○ | ○ | ○ |

TABLE 6

| Material category | | Material type | Example C15 | Example C16 | Example C17 | Example C18 | Example C19 | Example C20 | Example C21 | Example C22 | Example C23 | Example C24 | Example C25 | Example C26 | Comparative Example C1 | Comparative Example C2 |
|---|---|---|---|---|---|---|---|---|---|---|---|---|---|---|---|---|
| Resin | Rosin | Polymerized rosin | 45 | 45 | 45 | 45 | 45 | 45 | 45 | 45 | 45 | 25 | 40 | 5 | 45 | 45 |
| | | Hydrogenated rosin | | | | | | | | | | 10 | 5 | 20 | | |
| | | Acid-modified rosin | | | | | | | | | | 10 | | 10 | | |
| | Other resins | Acrylic resin | | | | | | 5 | | | | | | | | |
| | | Acryl-polyethylene copolymer resin | | | | | | | | | | | | | | |
| Activator | Organic acid | Glutaric acid | 5 | 5 | 5 | 5 | 5 | 5 | 5 | 5 | 5 | 5 | 5 | 5 | 5 | |
| | | Adipic acid | | | | | | | | | | | | 5 | | 5 |
| | | Hydrogenated dimer acid | | | | | | | | | | | | | | |
| | (2-Carboxyalkyl) isocyanurate adduct | Tris (2-carboxypropyl) isocyanurate | 5 | 5 | 5 | 5 | 5 | 5 | 5 | 5 | 5 | 5 | 5 | 5 | | |
| | Amine | Monoethanolamine | 5 | 5 | 5 | 5 | 5 | 5 | 5 | 5 | 5 | 5 | 5 | 5 | 5 | 5 |
| | | Diphenylguanidine | | | | | | | | | | | | | | |
| | | 2-Phenylimidazole | | | | | | | | | | | | | | |
| | | 2-Phenyl-4-methylimidazole | | | | | | | | | | | | | | |
| | Organic halogen compound | Trans-2,3-dibromo-1,4-butenediol | 0 | 5 | | | | | | | | | | | | |
| | | Triallyl isocyanurate hexabromide | | | 1 | | | | | | | | | | | |
| | Amine hydrohalides | Aniline HCl | | | | 1 | | | 1 | 1 | 1 | 1 | 1 | 1 | 1 | 1 |
| | | Aniline HBr | | | | | 5 | | | | | | | | | |
| Solvent | Solvent | Hexyl diglycol | 35 | 30 | 34 | 34 | 30 | 39 | 39 | 39 | 39 | 39 | 39 | 39 | 39 | 39 |
| Thixotropic agent | Ester-based thixotropic agent | Hydrogenated castor oil | 5 | 5 | 5 | 5 | 5 | 0 | | | | 5 | 5 | 5 | 5 | 5 |
| | Amide-based thixotropic agent | Polyamide-based thixotropic agent | | | | | | | 5 | | | | | | | |
| | | Bisamide-based thixotropic agent | | | | | | | | 5 | | | | | | |
| | Amide-based thixotropic agent | Amide-based thixotropic agent | | | | | | | | | 5 | | | | | |
| Evaluation | Total amount | | 100 | 100 | 100 | 100 | 100 | 100 | 100 | 100 | 100 | 100 | 100 | 100 | 100 | 100 |
| | Wet spreadability | | ○ | ○ | ○ | ○ | ○ | ○ | ○ | ○ | ○ | ○ | ○ | ○ | × | × |

TABLE 7

| Material category | | Material type | Example D1 | Example D2 | Example D3 | Example D4 | Example D5 | Example D6 | Example D7 |
|---|---|---|---|---|---|---|---|---|---|
| Resin | Rosin | Polymerized rosin | 45 | | | 25 | 45 | 45 | 45 |
| | | Hydrogenated rosin | | 45 | | | | | |
| | | Acid-modified rosin | | | 45 | 20 | | | |
| | Other resins | Acrylic resin | | | | | | | |
| | | Acryl-polyethylene copolymer resin | | | | | | | |
| Activator | Organic acid | Glutaric acid | | | | | | | |
| | | Adipic acid | | | | | | | |
| | | Hydrogenated dimer acid | | | | | | | |
| | (2-Carboxyalkyl) isocyanurate adduct | Bis (2-carboxyethyl) isocyanurate | 5 | 5 | 5 | 5 | 20 | 20 | 20 |
| | Amine | Monoethanolamine | 5 | 5 | 5 | 5 | 0 | 0.1 | 0.5 |
| | | Diphenylguanidine | | | | | | | |
| | | 2-Phenylimidazole | | | | | | | |
| | | 2-Phenyl-4-methylimidazole | | | | | | | |
| | Organic halogen compound | Trans-2,3-dibromo-1,4-butenediol | 1 | 1 | 1 | 1 | 1 | 1 | 1 |
| | | Triallyl isocyanurate hexabromide | | | | | | | |
| | Amine hydrohalides | Aniline HCl | | | | | | | |
| | | Aniline HBr | | | | | | | |
| Solvent | Solvent | Hexyl diglycol | 39 | 39 | 39 | 39 | 29 | 28.9 | 28.5 |
| Thixotropic agent | Ester-based thixotropic agent | Hydrogenated castor oil | 5 | 5 | 5 | 5 | 5 | 5 | 5 |
| | Amide-based thixotropic agent | Polyamide-based thixotropic agent | | | | | | | |
| | | Bisamide-based thixotropic agent | | | | | | | |
| | | Amide-based thixotropic agent | | | | | | | |
| | Total amount | | 100 | 100 | 100 | 100 | 100 | 100 | 100 |
| Evaluation | Wet spreadability | | ○ | ○ | ○ | ○ | ○ | ○ | ○ |

| Material category | | Material type | Example D8 | Example D9 | Example D10 | Example D11 | Example D12 | Example D13 | Example D14 |
|---|---|---|---|---|---|---|---|---|---|
| Resin | Rosin | Polymerized rosin | 45 | 45 | 45 | 45 | 45 | 45 | 45 |
| | | Hydrogenated rosin | | | | | | | |
| | | Acid-modified rosin | | | | | | | |
| | Other resins | Acrylic resin | | | | | | | |
| | | Acryl-polyethylene copolymer resin | | | | | | | |
| Activator | Organic acid | Glutaric acid | | 5 | 5 | 5 | 5 | 10 | |
| | | Adipic acid | | | | | | | 5 |
| | | Hydrogenated dimer acid | | | | | | | |
| | (2-Carboxyalkyl) isocyanurate adduct | Bis (2-carboxyethyl) isocyanurate | 5 | 0.5 | 5 | 5 | 5 | 5 | 5 |
| | Amine | Monoethanolamine | 10 | 10 | | | | | |
| | | Diphenylguanidine | | | 2 | | | | |
| | | 2-Phenylimidazole | | | | 2 | | | |
| | | 2-Phenyl-4-methylimidazole | | | | | 2 | | |
| | Organic halogen compound | Trans-2,3-dibromo-1,4-butenediol | 1 | 1 | 1 | 1 | 1 | 1 | 1 |
| | | Triallyl isocyanurate hexabromide | | | | | | | |
| | Amine hydrohalides | Aniline HCl | | | | | | | |
| | | Aniline HBr | | | | | | | |
| Solvent | Solvent | Hexyl diglycol | 34 | 33.5 | 37 | 37 | 37 | 34 | 39 |
| Thixotropic agent | Ester-based thixotropic agent | Hydrogenated castor oil | 5 | 5 | 5 | 5 | 5 | 5 | 5 |
| | Amide-based thixotropic agent | Polyamide-based thixotropic agent | | | | | | | |
| | | Bisamide-based thixotropic agent | | | | | | | |
| | | Amide-based thixotropic agent | | | | | | | |
| | Total amount | | 100 | 100 | 100 | 100 | 100 | 100 | 100 |
| Evaluation | Wet spreadability | | ○ | ○ | ○ | ○ | ○ | ○ | ○ |

TABLE 8

| Material category | | Material type | Example D15 | Example D16 | Example D17 | Example D18 | Example D19 | Example D20 | Example D21 | Example D22 | Example D23 | Example D24 | Example D25 | Example D26 | Comparative Example D1 | Comparative Example D2 |
|---|---|---|---|---|---|---|---|---|---|---|---|---|---|---|---|---|
| Resin | Rosin | Polymerized rosin | 45 | 45 | 45 | 45 | 45 | 45 | 45 | 45 | 45 | 25 | 40 | 5 | 45 | 45 |
| | | Hydrogenated rosin | | | | | | | | | | 10 | 5 | 20 | | |
| | | Acid-modified rosin | | | | | | | | | | 10 | | 10 | | |
| | Other resins | Acrylic resin | | | | | | 5 | | | | | | | | |
| | | Acryl-polyethylene copolymer resin | | | | | | | | | | | | | | |
| Activator | Organic acid | Glutaric acid | 5 | 5 | 5 | 5 | 5 | 5 | 5 | 5 | 5 | 5 | 5 | 5 | 5 | |
| | | Adipic acid | | | | | | | | | | | | 5 | | 5 |
| | | Hydrogenated dimer acid | | | | | | | | | | | | | | |
| | (2-Carboxyalkyl)isocyanurate adduct | Bis(2-carboxyethyl)isocyanurate | 5 | 5 | 5 | 5 | 5 | 5 | 5 | 5 | 5 | 5 | 5 | 5 | | |
| | Amine | Monoethanolamine | 5 | 5 | 5 | 5 | 5 | 5 | 5 | 5 | 5 | 5 | 5 | 5 | 5 | 5 |
| | | Diphenylguanidine | | | | | | | | | | | | | | |
| | | 2-Phenylimidazole | | | | | | | | | | | | | | |
| | | 2-Phenyl-4-methylimidazole | | | | | | | | | | | | | | |
| | Organic halogen compound | Trans-2,3-dibromo-1,4-butenediol | 0 | 5 | 1 | | | 1 | 1 | 1 | 1 | 1 | 1 | 1 | 1 | 1 |
| | | Triallyl isocyanurate hexabromide | | | | 1 | 5 | | | | | | | | | |
| | Amine hydrohalides | Aniline HCl | | | | | | | | | | | | | | |
| | | Aniline HBr | | | | | | | | | | | | | | |
| Solvent | | Hexyl diglycol | 35 | 30 | 34 | 34 | 30 | 39 | 39 | 39 | 39 | 39 | 39 | 39 | 39 | 39 |
| Thixotropic agent | | Ester-based thixotropic agent | 5 | 5 | 5 | 5 | 5 | 0 | | | | 5 | 5 | 5 | 5 | 5 |
| | | Hydrogenated castor oil | | | | | | | 5 | | | | | | | |
| | | Polyamide-based thixotropic agent | | | | | | | | 5 | | | | | | |
| | | Bisamide-based thixotropic agent | | | | | | | | | 5 | | | | | |
| | | Amide-based thixotropic agent | | | | | | | | | | | | | | |
| | | Total amount | 100 | 100 | 100 | 100 | 100 | 100 | 100 | 100 | 100 | 100 | 100 | 100 | 100 | 100 |
| Evaluation | | Wet spreadability | ○ | ○ | ○ | ○ | ○ | ○ | ○ | ○ | ○ | ○ | ○ | ○ | × | × |

TABLE 9

| Material category | | Material type | Example E1 | Example E2 | Example E3 | Example E4 | Example E5 | Example E6 | Example E7 |
|---|---|---|---|---|---|---|---|---|---|
| Resin | Rosin | Polymerized rosin | 45 | 45 | 45 | 45 | 45 | 45 | 45 |
| | | Hydrogenated rosin | | | | | | | |
| | | Acid-modified rosin | | | | | | | |
| | Other resins | Acrylic resin | | | | | | | |
| | | Acryl-polyethylene copolymer resin | | | | | | | |
| Activator | Organic acid | Glutaric acid | | | | | | | |
| | | Adipic acid | | | | | | | |
| | | Hydrogenated dimer acid | | | | | | | |
| | (2-Carboxyalkyl) isocyanurate adduct | Tris(2-carboxyethyl) isocyanurate | 1.25 | 2.5 | 2.5 | 2.5 | | | |
| | | Tris(2-carboxymethyl) isocyanurate | 1.25 | 2.5 | | | 2.5 | 2.5 | |
| | | Tris(2-carboxypropyl) isocyanurate | 1.25 | | 2.5 | | 2.5 | | 2.5 |
| | | Bis(2-carboxyethyl) isocyanurate | 1.25 | | | 2.5 | | 2.5 | 2.5 |
| | Amine | Monoethanolamine | 5 | 5 | 5 | 5 | 5 | 5 | 5 |
| | | Diphenylguanidine | | | | | | | |
| | | 2-Phenylimidazole | | | | | | | |
| | | 2-Phenyl-4-methylimidazole | | | | | | | |
| | Organic halogen compound | Trans-2,3-dibromo-1,4-butenediol | 1 | 1 | 1 | 1 | 1 | 1 | 1 |
| | | Triallyl isocyanurate hexabromide | | | | | | | |
| | Amine hydrohalides | Aniline HCl | | | | | | | |
| | | Aniline HBr | | | | | | | |
| Solvent | Solvent | Hexyl diglycol | 39 | 39 | 39 | 39 | 39 | 39 | 39 |
| Thixotropic agent | Ester-based thixotropic agent | Hydrogenated castor oil | 5 | 5 | 5 | 5 | 5 | 5 | 5 |
| | Amide-based thixotropic agent | Polyamide-based thixotropic agent | | | | | | | |
| | | Bisamide-based thixotropic agent | | | | | | | |
| | | Amide-based thixotropic agent | | | | | | | |
| | Total amount | | 100 | 100 | 100 | 100 | 100 | 100 | 100 |
| Evaluation | Wet spreadability | | ○ | ○ | ○ | ○ | ○ | ○ | ○ |

| Material category | | Material type | Example E8 | Example E9 | Example E10 | Example E11 | Comparative Example E1 | Comparative Example E2 |
|---|---|---|---|---|---|---|---|---|
| Resin | Rosin | Polymerized rosin | 45 | 45 | 45 | 45 | 45 | 45 |
| | | Hydrogenated rosin | | | | | | |
| | | Acid-modified rosin | | | | | | |
| | Other resins | Acrylic resin | | | | | | |
| | | Acryl-polyethylene copolymer resin | | | | | | |
| Activator | Organic acid | Glutaric acid | | | | | 5 | |
| | | Adipic acid | | | | | | 5 |
| | | Hydrogenated dimer acid | | | | | | |
| | (2-Carboxyalkyl) isocyanurate adduct | Tris(2-carboxyethyl) isocyanurate | 2.5 | 2.5 | 2.5 | | | |
| | | Tris(2-carboxymethyl) isocyanurate | 2.5 | 2.5 | | 2.5 | | |
| | | Tris(2-carboxypropyl) isocyanurate | 2.5 | | 2.5 | 2.5 | | |
| | | Bis(2-carboxyethyl) isocyanurate | | 2.5 | 2.5 | 2.5 | | |

TABLE 9-continued

|  |  |  | | | | | | |
|---|---|---|---|---|---|---|---|---|
| | Amine | Monoethanolamine | 3 | 3 | 3 | 3 | 5 | 5 |
| | | Diphenylguanidine | | | | | | |
| | | 2-Phenylimidazole | | | | | | |
| | | 2-Phenyl-4-methylimidazole | | | | | | |
| | Organic halogen compound | Trans-2,3-dibromo-1,4-butenediol | 1 | 1 | 1 | 1 | 1 | 1 |
| | | Triallyl isocyanurate hexabromide | | | | | | |
| | Amine hydrohalides | Aniline HCl | | | | | | |
| | | Aniline HBr | | | | | | |
| Solvent | Solvent | Hexyl diglycol | 38.5 | 38.5 | 38.5 | 38.5 | 39 | 39 |
| Thixotropic agent | Ester-based thixotropic agent | Hydrogenated castor oil | 5 | 5 | 5 | 5 | 5 | 5 |
| | Amide-based thixotropic agent | Polyamide-based thixotropic agent | | | | | | |
| | | Bisamide-based thixotropic agent | | | | | | |
| | | Amide-based thixotropic agent | | | | | | |
| | Total amount | | 100 | 100 | 100 | 100 | 100 | 100 |
| Evaluation | Wet spreadability | | ○ | ○ | ○ | ○ | ○ | ○ |

Tables 1 and 2 show examples containing tris(2-carboxyethyl) isocyanurate as a tris(carboxyalkyl) isocyanurate adduct and comparative examples containing no tris(2-carboxyethyl) isocyanurate and no other tris(carboxyalkyl) isocyanurate adducts. Tables 3 and 4 show examples containing tris(1-carboxymethyl) isocyanurate as a tris(carboxyalkyl) isocyanurate adduct and comparative examples containing no tris(1-carboxymethyl) isocyanurate and no other tris(carboxyalkyl) isocyanurate adducts. Tables 5 and 6 show examples containing tris(3-carboxypropyl) isocyanurate as a tris(carboxyalkyl) isocyanurate adduct and comparative examples containing no tris(3-carboxypropyl) isocyanurate and no other tris(carboxyalkyl) isocyanurate adducts. Tables 7 and 8 show examples containing bis(2-carboxyethyl) isocyanurate as a bis(carboxyalkyl) isocyanurate adduct and comparative examples containing no bis(2-carboxyethyl) isocyanurate and no other tris(carboxyalkyl) isocyanurate adducts.

In Examples A1 to A3, B1 to B3, C1 to C3, and D1 to D3, the type of rosin is changed. Example A1 contains 5.0 wt % of tris(2-carboxyethyl) isocyanurate within the range specified in the present invention. Example B1 contains 5.0 wt % of tris(1-carboxymethyl) isocyanurate within the range specified in the present invention. Example C1 contains 5.0 wt % of tris(3-carboxypropyl) isocyanurate within the range specified in the present invention. Example D1 contains 5.0 wt % of bis(2-carboxyethyl) isocyanurate within the range specified in the present invention. In addition, Examples A1, B1, C1, and D1 contain 45.0 wt % of polymerized rosin as rosin within the range specified in the present invention. Furthermore, Examples A1, B1, C1, and D1 contain 5.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

In Examples A1, B1, C1, and D1, the wet-spread diameter of solder satisfied the above-described determination criteria, and therefore, a sufficient effect was obtained for the wet spreadability of solder.

Example A2 contains 5.0 wt % of tris(2-carboxyethyl) isocyanurate within the range specified in the present invention. Example B2 contains 5.0 wt % of tris(1-carboxymethyl) isocyanurate within the range specified in the present invention. Example C2 contains 5.0 wt % of tris(3-carboxypropyl) isocyanurate within the range specified in the present invention. Example D2 contains 5.0 wt % of bis(2-carboxyethyl) isocyanurate within the range specified in the present invention. In addition, Examples A2, B2, C2, and D2 contain 45.0 wt % of hydrogenated rosin as rosin within the range specified in the present invention. Furthermore, Examples A2, B2, C2, and D2 contain 5.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

Also in Examples A2, B2, C2, and D2, the wet-spread diameter of solder satisfied the above-described determination criteria, and therefore, a sufficient effect was obtained for the wet spreadability of solder.

Example A3 contains 5.0 wt % of tris(2-carboxyethyl) isocyanurate within the range specified in the present invention. Example B3 contains 5.0 wt % of tris(1-carboxymethyl) isocyanurate within the range specified in the present invention. Example C3 contains 5.0 wt % of tris(3-carboxypropyl) isocyanurate within the range specified in the present invention. Example D3 contains 5.0 wt % of bis(2-carboxyethyl) isocyanurate within the range specified in the present invention. In addition, Examples A3, B3, C3, and D3 contain 45.0 wt % of acid-modified rosin as rosin within the range specified in the present invention. Furthermore, Examples A3, B3, C3, and D3 contain 5.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

Also in Examples A3, B3, C3, and D3, the wet-spread diameter of solder satisfied the above-described determination criteria, and therefore, a sufficient effect was obtained for the wet spreadability of solder.

In Examples A4, B4, C4, and D4, rosins are compositely added. Example A4 contains 5.0 wt % of tris(2-carboxyethyl) isocyanurate within the range specified in the present invention. Example B4 contains 5.0 wt % of tris(I-carboxymethyl) isocyanurate within the range specified in the present invention. Example C4 contains 5.0 wt % of tris(3-carboxypropyl) isocyanurate within the range specified in the present invention. Example D4 contains 5.0 wt % of bis(2-carboxyethyl) isocyanurate within the range specified in the present invention. In addition, Examples A4, B4, C4, and D4 contain, as rosin, 25.0 wt % of polymerized rosin within the range specified in the present invention and 20 wt % of acid-modified rosin within the range specified in the present invention. The total content of rosin is within the range specified in the present invention. Furthermore, Examples A4, B4, C4, and D4 contain 5.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

Also in Examples A4, B4, C4, and D4, the wet-spread diameter of solder satisfied the above-described determination criteria, and therefore, a sufficient effect was obtained for the wet spreadability of solder.

In Examples A5 to A8, B5 to B8, C5 to C8, and D5 to D8, the amount of amine is changed. Example A5 contains 20.0 wt % of tris(2-carboxyethyl) isocyanurate within the range specified in the present invention. Example B5 contains 20.0 wt % of tris(1-carboxymethyl) isocyanurate within the range specified in the present invention. Example C5 contains 20.0 wt % of tris(3-carboxypropyl) isocyanurate within the range specified in the present invention. Example D5 contains 20.0 wt % of bis(2-carboxyethyl) isocyanurate within the range specified in the present invention. In addition, Examples A5, B5, C5, and D5 contain 45.0 wt % of polymerized rosin as rosin within the range specified in the present invention. Furthermore, Examples A5, B5, C5, and D5 do not contain an amine, but contain 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 29.0 wt % of hexyl diglycol as a solvent within the range specified in the present invention.

Although Examples A5, B5, C5, and D5 contained no amine, the wet-spread diameter of solder satisfied the above-described determination criteria due to increased content of (carboxyalkyl) isocyanurate adduct, and therefore, a sufficient effect was obtained for the wet spreadability of solder.

Example A6 contains 20.0 wt % of tris(2-carboxyethyl) isocyanurate within the range specified in the present invention. Example B6 contains 20.0 wt % of tris(1-carboxymethyl) isocyanurate within the range specified in the present invention. Example C6 contains 20.0 wt % of tris(3-carboxypropyl) isocyanurate within the range specified in the present invention. Example D6 contains 20.0 wt % of bis(2-carboxyethyl) isocyanurate within the range specified in the present invention. In addition, Examples A6, B6, C6, and D6 contain 45.0 wt % of polymerized rosin as rosin within the range specified in the present invention. Furthermore, Examples A6, B6, C6, and D6 contain 0.1 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 28.9 wt % of hexyl diglycol as a solvent within the range specified in the present invention.

Also in Examples A6, B6, C6, and D6, the wet-spread diameter of solder satisfied the above-described determination criteria, and therefore, a sufficient effect was obtained for the wet spreadability of solder.

Example A7 contains 20.0 wt % of tris(2-carboxyethyl) isocyanurate within the range specified in the present invention. Example B7 contains 20.0 wt % of tris(1-carboxymethyl) isocyanurate within the range specified in the present invention. Example C7 contains 20.0 wt % of tris(3-carboxypropyl) isocyanurate within the range specified in the present invention. Example D7 contains 20.0 wt % of bis(2-carboxyethyl) isocyanurate within the range specified in the present invention. In addition, Examples A7, B7, C7, and D7 contain 45.0 wt % of polymerized rosin as rosin within the range specified in the present invention. Furthermore, Examples A7, B7, C7, and D7 contain 0.5 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 28.5 wt % of hexyl diglycol as a solvent within the range specified in the present invention.

Also in Examples A7, B7, C7, and D7, the wet-spread diameter of solder satisfied the above-described determination criteria, and therefore, a sufficient effect was obtained for the wet spreadability of solder.

Example A8 contains 5.0 wt % of tris(2-carboxyethyl) isocyanurate within the range specified in the present invention. Example B8 contains 5.0 wt % of tris(1-carboxymethyl) isocyanurate within the range specified in the present invention. Example C8 contains 5.0 wt % of tris(3-carboxypropyl) isocyanurate within the range specified in the present invention. Example D8 contains 5.0 wt % of bis(2-carboxyethyl) isocyanurate within the range specified in the present invention. In addition, Examples A8, B8, C8, and D8 contain 45.0 wt % of polymerized rosin as rosin within the range specified in the present invention. Furthermore, Examples A8, B8, C8, and D8 contain 10.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 34.0 wt % of hexyl diglycol as a solvent within the range specified in the present invention.

Also in Examples A8, B8, C8, and D8, the wet-spread diameter of solder satisfied the above-described determination criteria, and therefore, a sufficient effect was obtained for the wet spreadability of solder.

Examples A9, B9, C9, and D9 contain another organic acid in addition to the (carboxyalkyl) isocyanurate adduct. Example A9 contains 0.5 wt % of tris(2-carboxyethyl) isocyanurate within the range specified in the present invention. Example B9 contains 0.5 wt % of tris(t-carboxymethyl)

isocyanurate within the range specified in the present invention. Example C9 contains 0.5 wt % of tris(3-carboxypropyl) isocyanurate within the range specified in the present invention. Example D9 contains 0.5 wt % of bis(2-carboxyethyl) isocyanurate within the range specified in the present invention. In addition, Examples A9, B9, C9, and D9 contain 45.0 wt % of polymerized rosin as rosin within the range specified in the present invention. Furthermore, Examples A9, B9, C9, and D9 contain 5.0 wt % of glutaric acid as an organic acid within the range specified in the present invention, 10.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 33.5 wt % of hexyl diglycol as a solvent within the range specified in the present invention.

Since Examples A9, B9, C9, and D9 contained another organic acid in addition to the (carboxyalkyl) isocyanurate adduct, even if the content of isocyanurate adduct was reduced within the range specified in the present invention, the wet-spread diameter of solder satisfied the above-described determination criteria, and therefore, a sufficient effect was obtained for the wet spreadability of solder.

Examples A10 to A12, B10 to B12, C10 to C12, and D10 to D12 contain another organic acid in addition to the (carboxyalkyl) isocyanurate adduct, and the type of amine is changed therein. Example A10 contains 5.0 wt % of tris(2-carboxyethyl) isocyanurate within the range specified in the present invention. Example B10 contains 5.0 wt % of tris(1-carboxymethyl) isocyanurate within the range specified in the present invention. Example C10 contains 5.0 wt % of tris(3-carboxypropyl) isocyanurate within the range specified in the present invention. Example D10 contains 5.0 wt % of bis(2-carboxyethyl) isocyanurate within the range specified in the present invention. In addition, Examples A10, B10, C10, and D10 contain 45.0 wt % of polymerized rosin as rosin within the range specified in the present invention. Furthermore, Examples A10, B10, C10, and D10 contain 5.0 wt % of glutaric acid as an organic acid within the range specified in the present invention, 2.0 wt % of diphenylguanidine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 37.0 wt % of hexyl diglycol as a solvent within the range specified in the present invention.

Also in Examples A10, B10, C10, and D10, the wet-spread diameter of solder satisfied the above-described determination criteria, and therefore, a sufficient effect was obtained for the wet spreadability of solder.

Example A11 contains 5.0 wt % of tris(2-carboxyethyl) isocyanurate within the range specified in the present invention. Example B11 contains 5.0 wt % of tris(1-carboxymethyl) isocyanurate within the range specified in the present invention. Example C11 contains 5.0 wt % of tris(3-carboxypropyl) isocyanurate within the range specified in the present invention. Example D11 contains 5.0 wt % of bis(2-carboxyethyl) isocyanurate within the range specified in the present invention. In addition, Examples A11, B11, C11, and D11 contain 45.0 wt % of polymerized rosin as rosin within the range specified in the present invention. Furthermore, Examples A11, B11, C11, and D11 contain 5.0 wt % of glutaric acid as an organic acid within the range specified in the present invention, 2.0 wt % of 2-phenylimidazole as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 37.0 wt % of hexyl diglycol as a solvent within the range specified in the present invention.

Also in Examples A11, B11, C11, and D11, the wet-spread diameter of solder satisfied the above-described determination criteria, and therefore, a sufficient effect was obtained for the wet spreadability of solder.

Example A12 contains 5.0 wt % of tris(2-carboxyethyl) isocyanurate within the range specified in the present invention. Example B12 contains 5.0 wt % of tris(1-carboxymethyl) isocyanurate within the range specified in the present invention. Example C12 contains 5.0 wt % of tris(3-carboxypropyl) isocyanurate within the range specified in the present invention. Example D12 contains 5.0 wt % of bis(2-carboxyethyl) isocyanurate within the range specified in the present invention. In addition, Examples A12, B12, C12, and D12 contain 45.0 wt % of polymerized rosin as rosin within the range specified in the present invention. Furthermore, Examples A12, B12, C12, and D12 contain 5.0 wt % of glutaric acid as an organic acid within the range specified in the present invention, 2.0 wt % of 2-phenyl-4-methylimidazole as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 37.0 wt % of hexyl diglycol as a solvent within the range specified in the present invention.

Also in Examples A12, B12, C12, and D12, the wet-spread diameter of solder satisfied the above-described determination criteria, and therefore, a sufficient effect was obtained for the wet spreadability of solder.

In Examples A13, B13, C13, and D13, the amount of the organic acid other than the (carboxyalkyl) isocyanurate adduct is changed. Example A13 contains 5.0 wt % of tris(2-carboxyethyl) isocyanurate within the range specified in the present invention. Example B13 contains 5.0 wt % of tris(1-carboxymethyl) isocyanurate within the range specified in the present invention. Example C13 contains 5.0 wt % of tris(3-carboxypropyl) isocyanurate within the range specified in the present invention. Example D13 contains 5.0 wt % of bis(2-carboxyethyl) isocyanurate within the range specified in the present invention. In addition, Examples A13, B13, C13, and D13 contain 45.0 wt % of polymerized rosin as rosin within the range specified in the present invention. Furthermore, Examples A13, B13, C13, and D13 do not contain an amine, but contain 10.0 wt % of glutaric acid as an organic acid within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 34.0 wt % of hexyl diglycol as a solvent within the range specified in the present invention.

Although Examples A13, B13, C13, and D13 contained no amine, the wet-spread diameter of solder satisfied the above-described determination criteria due to increased content of organic acid other than (carboxyalkyl) isocyanurate adduct within the range specified in the present invention, and therefore, a sufficient effect was obtained for the wet spreadability of solder.

In Examples A14, B14, C14, and D14, the type of the organic acid other than the (carboxyalkyl) isocyanurate adduct is changed. Example A14 contains 5.0 wt % of tris(2-carboxyethyl) isocyanurate within the range specified in the present invention. Example B14 contains 5.0 wt % of tris(I-carboxymethyl) isocyanurate within the range specified in the present invention. Example C14 contains 5.0 wt % of tris(3-carboxypropyl) isocyanurate within the range specified in the present invention. Example D14 contains 5.0 wt % of bis(2-carboxyethyl) isocyanurate within the range specified in the present invention. In addition, Examples A14, B14, C14, and D14 contain 45.0 wt % of polymerized rosin as rosin within the range specified in the present invention. Furthermore, Examples A14, B14, C14, and D14 do not contain an amine, but contain 5.0 wt % of adipic acid as an organic acid within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

Although Examples A14, B14, C14, and D14 contained no amine, the wet-spread diameter of solder satisfied the above-described determination criteria by changing the type of organic acid other than the (carboxyalkyl) isocyanurate adduct, and therefore, a sufficient effect was obtained for the wet spreadability of solder.

Examples A15 and A16, B15 and B16, C15 and C16, and D15 and D16 contain another organic acid in addition to the (carboxyalkyl) isocyanurate adduct, and the amount of organic halogen compound is changed therein. Example A15 contains 5.0 wt % of tris(2-carboxyethyl) isocyanurate within the range specified in the present invention. Example B15 contains 5.0 wt % of tris(i-carboxymethyl) isocyanurate within the range specified in the present invention. Example C15 contains 5.0 wt % of tris(3-carboxypropyl) isocyanurate within the range specified in the present invention. Example D15 contains 5.0 wt % of bis(2-carboxyethyl) isocyanurate within the range specified in the present invention. In addition, Examples A15, B15, C15, and D15 contain 45.0 wt % of polymerized rosin as rosin within the range specified in the present invention. Furthermore, Examples A15, B15, C15, and D15 do not contain an organic halogen compound, but contain 5.0 wt % of glutaric acid as an organic acid within the range specified in the present invention, 5.0 wt % of monoethanolamine as an amine within the range specified in the present invention, 5 wt % of hydrogenated castor oil as a thixotropic agent within the range specified in the present invention, and the remainder being 35.0 wt % of hexyl diglycol as a solvent within the range specified in the present invention.

Although Examples A15, B15, C15, and D15 contained no organic halogen compound, these examples contained the organic acid other than the (carboxyalkyl) isocyanurate adduct and the amine within the range specified in the present invention, the wet-spread diameter of solder satisfied the above-described determination criteria, and therefore, a sufficient effect was obtained for the wet spreadability of solder.

Example A16 contains 5.0 wt % of tris(2-carboxyethyl) isocyanurate within the range specified in the present invention. Example B16 contains 5.0 wt % of tris(1-carboxymethyl) isocyanurate within the range specified in the present invention. Example C16 contains 5.0 wt % of tris(3-carboxypropyl) isocyanurate within the range specified in the present invention. Example D16 contains 5.0 wt % of bis(2-carboxyethyl) isocyanurate within the range specified in the present invention. In addition, Examples A16, B16, C16, and D16 contain 45.0 wt % of polymerized rosin as rosin within the range specified in the present invention. Furthermore, Examples A16, B16, C16, and D16 contain 5.0 wt % of glutaric acid as an organic acid within the range specified in the present invention, 5.0 wt % of monoethanolamine as an amine within the range specified in the present invention, 5.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 30.0 wt % of hexyl diglycol as a solvent within the range specified in the present invention.

Also in Examples A16, B16, C16, and D16 in which the organic acid other than the (carboxyalkyl) isocyanurate adduct, an amine, and an organic halogen compound were contained within the range specified in the present invention, the wet-spread diameter of solder satisfied the above-described determination criteria, and therefore, a sufficient effect was obtained for the wet spreadability of solder.

Examples A17, B17, C17, and D17 contain another organic acid in addition to the (carboxyalkyl) isocyanurate adduct, and the type of organic halogen compound is changed therein. Example A17 contains 5.0 wt % of tris(2-carboxyethyl) isocyanurate within the range specified in the present invention. Example B17 contains 5.0 wt % of tris(1-carboxymethyl) isocyanurate within the range specified in the present invention. Example C17 contains 5.0 wt % of tris(3-carboxypropyl) isocyanurate within the range specified in the present invention. Example D17 contains 5.0 wt % of bis(2-carboxyethyl) isocyanurate within the range specified in the present invention. In addition, Examples A17, B17, C17, and D17 contain 45.0 wt % of polymerized rosin as rosin within the range specified in the present invention. Furthermore, Examples A17, B17, C17, and D17 contain 5.0 wt % of glutaric acid as an organic acid within the range specified in the present invention, 5.0 wt % of monoethanolamine as an amine within the range specified in the present invention, 1.0 wt % of triallyl isocyanurate hexabromide as an organic halogen compound within the range specified in the present invention, 5 wt % of hydrogenated castor oil as a thixotropic agent within the range specified in the present invention, and the remainder being 34.0 wt % of hexyl diglycol as a solvent within the range specified in the present invention.

Also in Examples A17, B17, C17, and D17, the wet-spread diameter of solder satisfied the above-described determination criteria, and therefore, a sufficient effect was obtained for the wet spreadability of solder.

Examples A18, B18, C18, and D18 contain another organic acid in addition to the (carboxyalkyl) isocyanurate adduct, and contain an amine hydrohalide. Example A18 contains 5.0 wt % of tris(2-carboxyethyl) isocyanurate within the range specified in the present invention. Example B18 contains 5.0 wt % of tris(1-carboxymethyl) isocyanurate within the range specified in the present invention. Example C18 contains 5.0 wt % of tris(3-carboxypropyl) isocyanurate within the range specified in the present invention. Example D18 contains 5.0 wt % of bis(2-carboxyethyl) isocyanurate within the range specified in the present invention. In addition, Examples A18, B18, C18, and D18 contain 45.0 wt % of polymerized rosin as rosin within the range specified in the present invention. Furthermore, Examples A18, B18, C18, and D18 contain 5.0 wt % of glutaric acid as an organic acid within the range specified in the present invention, 5.0 wt % of monoethanolamine as an amine within the range specified in the present invention, 1.0 wt % of aniline HCl as an amine hydrohalide within the range specified in the present invention, 5 wt % of hydrogenated castor oil as a thixotropic agent within the range specified in the present invention, and the remainder being 34.0 wt % of hexyl diglycol as a solvent within the range specified in the present invention.

Also in Examples A18, B18, C18, and D18, the wet-spread diameter of solder satisfied the above-described determination criteria, and therefore, a sufficient effect was obtained for the wet spreadability of solder.

Examples A19, B19, C19, and D19 contain another organic acid in addition to the (carboxyalkyl) isocyanurate adduct, and the type of amine hydrohalide is changed therein. Example A19 contains 5.0 wt % of tris(2-carboxyethyl) isocyanurate within the range specified in the present invention. Example B19 contains 5.0 wt % of tris(1-carboxymethyl) isocyanurate within the range specified in the present invention. Example C19 contains 5.0 wt % of tris(3-carboxypropyl) isocyanurate within the range specified in the present invention. Example D19 contains 5.0 wt % of bis(2-carboxyethyl) isocyanurate within the range specified in the present invention. In addition, Examples A19, B19, C19, and D19 contain 45.0 wt % of polymerized rosin as rosin within the range specified in the present invention. Furthermore, Examples A19, B19, C19, and D19 contain 5.0 wt % of glutaric acid as an organic acid within the range specified in the present invention, 5.0 wt % of monoethanolamine as an amine within the range specified in the present invention, 5.0 wt % of aniline HBr as an amine hydrohalide within the range specified in the present invention, 5 wt % of hydrogenated castor oil as a thixotropic agent within the range specified in the present invention, and the remainder being 30.0 wt % of hexyl diglycol as a solvent within the range specified in the present invention.

Also in Examples A19, B19, C19, and D19, the wet-spread diameter of solder satisfied the above-described determination criteria, and therefore, a sufficient effect was obtained for the wet spreadability of solder.

In Examples A20 to A23, B20 to B23, C20 to C23, and D20 to D23, the amount and type of thixotropic agent are changed. Example A20 contains 5.0 wt % of tris(2-carboxyethyl) isocyanurate within the range specified in the present invention. Example B20 contains 5.0 wt % of tris(I-carboxymethyl) isocyanurate within the range specified in the present invention. Example C20 contains 5.0 wt % of tris(3-carboxypropyl) isocyanurate within the range specified in the present invention. Example D20 contains 5.0 wt % of bis(2-carboxyethyl) isocyanurate within the range specified in the present invention. In addition, Examples A20, B20, C20, and D20 contain, as rosin, 45.0 wt % of polymerized rosin within the range specified in the present invention and 5 wt % of acid-modified rosin within the range specified in the present invention. The total content of rosin is within the range specified in the present invention. Furthermore, Examples A20, B20, C20, and D20 do not contain a thixotropic agent, but contain 5.0 wt % of monoethanolamine as an amine specified in the present invention, 1.0 wt % of trans-2,3-dibromo-1,4-butenediol as an organic halogen compound within the range specified in the present invention, and the remainder being 39.0 wt % of hexyl diglycol as a solvent within the range specified in the present invention.

Also in Examples A20, B20, C20, and D20, the wet-spread diameter of solder satisfied the above-described determination criteria, and therefore, a sufficient effect was obtained for the wet spreadability of solder.

Example A21 contains 5.0 wt % of tris(2-carboxyethyl) isocyanurate within the range specified in the present invention. Example B21 contains 5.0 wt % of tris(I-carboxymethyl) isocyanurate within the range specified in the present invention. Example C21 contains 5.0 wt % of tris(3-carboxypropyl) isocyanurate within the range specified in the present invention. Example D21 contains 5.0 wt % of bis(2-carboxyethyl) isocyanurate within the range specified in the present invention. In addition, Examples A21, B21, C21, and D21 contain 45.0 wt % of polymerized rosin as rosin within the range specified in the present invention. Furthermore, Examples A21, B21, C21, and D21 contain 5.0 wt % of monoethanolamine as an amine within the range specified in the present invention, 1.0 wt % of trans-2,3-dibromo-1,4-butenediol as an organic halogen compound within the range specified in the present invention, 5.0 wt % of polyamide-based thixotropic agent as a thixotropic agent within the range specified in the present invention, and the remainder being 39.0 wt % of hexyl diglycol as a solvent within the range specified in the present invention.

Also in Examples A21, B21, C21, and D21, the wet-spread diameter of solder satisfied the above-described determination criteria, and therefore, a sufficient effect was obtained for the wet spreadability of solder.

Example A22 contains 5.0 wt % of tris(2-carboxyethyl) isocyanurate within the range specified in the present invention. Example B22 contains 5.0 wt % of tris(1-carboxymethyl) isocyanurate within the range specified in the present invention. Example C22 contains 5.0 wt % of tris(3-carboxypropyl) isocyanurate within the range specified in the present invention. Example D22 contains 5.0 wt % of bis(2-carboxyethyl) isocyanurate within the range specified in the present invention. In addition, Examples A22, B22, C22, and D22 contain 45.0 wt % of polymerized rosin as rosin within the range specified in the present invention. Furthermore, Examples A22, B22, C22, and D22 contain 5.0 wt % of monoethanolamine as an amine within the range specified in the present invention, 1.0 wt % of trans-2,3-dibromo-1,4-butenediol as an organic halogen compound within the range specified in the present invention, 5.0 wt % of bisamide-based thixotropic agent as a thixotropic agent within the range specified in the present invention, and the remainder being 39.0 wt % of hexyl diglycol as a solvent within the range specified in the present invention.

Also in Examples A22, B22, C22, and D22, the wet-spread diameter of solder satisfied the above-described determination criteria, and therefore, a sufficient effect was obtained for the wet spreadability of solder.

Example A23 contains 5.0 wt % of tris(2-carboxyethyl) isocyanurate within the range specified in the present invention. Example B23 contains 5.0 wt % of tris(1-carboxymethyl) isocyanurate within the range specified in the present invention. Example C23 contains 5.0 wt % of tris(3-carboxypropyl) isocyanurate within the range specified in the present invention. Example D23 contains 5.0 wt % of bis(2-carboxyethyl) isocyanurate within the range specified in the present invention. In addition, Examples A23, B23, C23, and D23 contain 45.0 wt % of polymerized rosin as rosin within the range specified in the present invention. Furthermore, Examples A23, B23, C23, and D23 contain 5.0 wt % of monoethanolamine as an amine within the range specified in the present invention, 1.0 wt % of trans-2,3-dibromo-1,4-butenediol as an organic halogen compound within the range specified in the present invention, 5.0 wt % of amide-based thixotropic agent as a thixotropic agent within the range specified in the present invention, and the remainder being 39.0 wt % of hexyl diglycol as a solvent within the range specified in the present invention.

Also in Examples A23, B23, C23, and D23, the wet-spread diameter of solder satisfied the above-described determination criteria, and therefore, a sufficient effect was obtained for the wet spreadability of solder.

Examples A24 to A26, B24 to B26, C24 to C26, and D24 to D26 contain other resins. Example A24 contains 5.0 wt % of tris(2-carboxyethyl) isocyanurate within the range specified in the present invention. Example B24 contains 5.0 wt % of tris(1-carboxymethyl) isocyanurate within the range specified in the present invention. Example C24 contains 5.0 wt % of tris(3-carboxypropyl) isocyanurate within the range specified in the present invention. Example D24 contains 5.0 wt % of bis(2-carboxyethyl) isocyanurate within the range specified in the present invention. In addition, Examples A24, B24, C24, and D24 contain 25.0 wt % of polymerized rosin as rosin within the range specified in the present invention, and contain, as other resins, 10.0 wt % of acrylic resin within the range specified in the present invention and 10.0 wt % of acryl-polyethylene copolymer resin within the range specified in the present invention. The total content of the other resins is within the range specified in the present invention, and the (acrylic resins/rosin) ratio of the acrylic resins to the rosin is 0.8 within the range specified in the present invention. Furthermore, Examples A24, B24, C24, and D24 contain 5.0 wt % of monoethanolamine as an amine within the range specified in the present invention, 1.0 wt % of trans-2,3-dibromo-1,4-butenediol as an organic halogen compound within the range specified in the present invention, 5.0 wt % of hydrogenated castor oil as a thixotropic agent within the range specified in the present invention, and the remainder being 39.0 wt % of hexyl diglycol as a solvent within the range specified in the present invention.

Even in the cases of Examples A24, B24, C24, and D24 containing acrylic resins as the other resins, the wet-spread diameter of solder satisfied the above-described determination criteria, and therefore, a sufficient effect was obtained for the wet spreadability of solder.

Example A25 contains 5.0 wt % of tris(2-carboxyethyl) isocyanurate within the range specified in the present invention. Example B25 contains 5.0 wt % of tris(1-carboxymethyl) isocyanurate within the range specified in the present invention. Example C25 contains 5.0 wt % of tris(3-carboxypropyl) isocyanurate within the range specified in the present invention. Example D25 contains 5.0 wt % of bis(2-carboxyethyl) isocyanurate within the range specified in the present invention. In addition, Examples A25, B25, C25, and D25 contain, as rosin, 40.0 wt % of polymerized rosin within the range specified in the present invention and 5.0 wt % of an acrylic resin within the range specified in the present invention. The (acrylic resin/rosin) ratio of the acrylic resin to the rosin is 0.125 within the range specified in the present invention. Furthermore, Examples A25, B25, C25, and D25 contain 5.0 wt % of monoethanolamine as an amine within the range specified in the present invention, 1.0 wt % of trans-2,3-dibromo-1,4-butenediol as an organic halogen compound within the range specified in the present invention, 5.0 wt % of hydrogenated castor oil as a thixotropic agent within the range specified in the present invention, and the remainder being 39.0 wt % of hexyl diglycol as a solvent within the range specified in the present invention.

Also in Examples A25, B25, C25, and D25, the wet-spread diameter of solder satisfied the above-described determination criteria, and therefore, a sufficient effect was obtained for the wet spreadability of solder.

Example A26 contains 5.0 wt % of tris(2-carboxyethyl) isocyanurate within the range specified in the present invention. Example B26 contains 5.0 wt % of tris(1-carboxymethyl) isocyanurate within the range specified in the present invention. Example C26 contains 5.0 wt % of tris(3-carboxypropyl) isocyanurate within the range specified in the present invention. Example D26 contains 5.0 wt % of bis(2-carboxyethyl) isocyanurate within the range specified in the present invention. In addition, Examples A26, B26, C26, and D26 contain 5.0 wt % of polymerized rosin as rosin within the range specified in the present invention, 20.0 wt % of acrylic resin within the range specified in the present invention, and 10.0 wt % of acryl-polyethylene copolymer resin within the range specified in the present invention. The total content of the other resins is within the range specified in the present invention, and the (acrylic resins/rosin) ratio of the acrylic resins to the rosin is 6.0 within the range specified in the present invention. In addition, Examples A26, B26, C26, and D26 contain, as organic acids, 5.0 wt % of adipic acid within the range specified in the present invention and 5.0 wt % of a hydrogenated dimer acid within the range specified in the present invention. The total content of organic acids is within the range specified in the present invention. Furthermore, Examples A26, B26, C26, and D26 contain 5.0 wt % of monoethanolamine as an amine within the range specified in the present invention, 1.0 wt % of trans-2,3-dibromo-1,4-butenediol as an organic halogen compound within the range specified in the present invention, 5.0 wt % of hydrogenated castor oil as a thixotropic agent within the range specified in the present invention, and the remainder being 39.0 wt % of hexyl diglycol as a solvent within the range specified in the present invention.

Since Examples A26, B26, C26, and D26 contained acrylic resins as the other resins, even if the content of rosin was reduced within the range specified in the present invention, the wet-spread diameter of solder satisfied the above-described determination criteria, and therefore, a sufficient effect was obtained for the wet spreadability of solder.

In contrast, Comparative Example A1 contains no (2-carboxyethyl) isocyanurate and no other (carboxyalkyl) isocyanurate adducts. Comparative Example B1 contains no (2-carboxymethyl) isocyanurate and no other isocyanurate adducts. Comparative Example C1 contains no tris(3-carboxypropyl) isocyanurate and no other (carboxyalkyl) isocyanurate adducts. Comparative Example D1 contains no bis(2-carboxyethyl) isocyanurate and no other tris(carboxyalkyl) isocyanurate adducts. In addition, Comparative Examples A1, B1, C1, and D1 contain 45.0 wt % of polymerized rosin as rosin within the range specified in the present invention, 5.0 wt % of glutaric acid as an organic acid within the range specified in the present invention, 5.0 wt % of monoethanolamine as an amine within the range specified in the present invention, 1.0 wt % of trans-2,3-dibromo-1,4-butenediol as an organic halogen compound within the range specified in the present invention, 5.0 wt % of hydrogenated castor oil as a thixotropic agent within the range specified in the present invention, and the remainder being 39.0 wt % of hexyl diglycol as a solvent within the range specified in the present invention.

Since Comparative Examples A1, B1, C1, and D1 did not contain any tris(carboxyalkyl) isocyanurate adduct, even if the examples contained rosin, an organic acid, an amine, an organic halogen compound, a thixotropic agent, and a solvent within the ranges specified in the present invention, the wet-spread diameter of solder did not satisfy the above-described determination criteria, and therefore, no effect was obtained for the wet spreadability of solder.

Comparative Example A2 contains no tris(2-carboxyethyl) isocyanurate and no other (carboxyalkyl) isocyanurate adducts. Comparative Example B2 contains no (2-carboxymethyl) isocyanurate and no other tris(carboxyalkyl) isocyanurate adducts. Comparative Example C2 contains no tris(3-carboxypropyl) isocyanurate and no other isocyanurate adducts. Comparative Example D2 contains no bis(2-carboxyethyl) isocyanurate and no other (carboxyalkyl) isocyanurate adducts. In addition, Comparative Examples A2, B2, C2, and D2 contain 45.0 wt % of polymerized rosin as rosin within the range specified in the present invention, 5.0 wt % of adipic acid as an organic acid within the range specified in the present invention, 5.0 wt % of monoethanolamine as an amine within the range specified in the present invention, 1.0 wt % of trans-2,3-dibromo-1,4-butenediol as an organic halogen compound within the range specified in the present invention, 5.0 wt % of hydrogenated castor oil as a thixotropic agent within the range specified in the present invention, and the remainder being 39.0 wt % of hexyl diglycol as a solvent within the range specified in the present invention.

Since Comparative Examples A2, B2, C2, and D2 did not contain any (carboxyalkyl) isocyanurate adduct, even if the examples contained rosin, an organic acid, an amine, an organic halogen compound, a thixotropic agent, and a solvent within the ranges specified in the present invention and the type of organic acid is changed, the wet-spread diameter of solder did not satisfy the above-described determination criteria, and therefore, no effect was obtained for the wet spreadability of solder.

Table 9 shows examples to which (2-carboxyethyl) isocyanurate, isocyanurate, tris(3-carboxypropyl) isocyanurate, and bis(2-carboxyethyl) isocyanurate are compositely added as (carboxyalkyl) isocyanurate adducts, and comparative examples to which no other isocyanurate adducts are contained.

Example E1 contains 1.25 wt % of tris(2-carboxyethyl) isocyanurate within the range specified in the present invention, 1.25 wt % of tris(I-carboxymethyl) isocyanurate within the range specified in the present invention, 1.25 wt % of tris(3-carboxypropyl) isocyanurate within the range specified in the present invention, and 1.25 wt % of bis(2-carboxyethyl) isocyanurate within the range specified in the present invention. The total content of (carboxyalkyl) isocyanurate adducts is 5.0 wt % within the range specified in the present invention. In addition, Example E1 contains 45.0 wt % of polymerized rosin as rosin within the range specified in the present invention. Furthermore, Example E1 contains 5.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

Also in Example E1 to which (carboxyalkyl) isocyanurate adducts were compositely added, the wet-spread diameter of solder satisfied the above-described determination criteria, and therefore, a sufficient effect was obtained for the wet spreadability of solder.

Example E2 contains 2.5 wt % of tris(2-carboxyethyl) isocyanurate within the range specified in the present invention and 2.5 wt % of tris(1-carboxymethyl) isocyanurate within the range specified in the present invention. The total content of (carboxyalkyl) isocyanurate adducts is 5.0 wt % within the range specified in the present invention. In addition, Example E2 contains 45.0 wt % of polymerized rosin as rosin within the range specified in the present invention. Furthermore, Example E2 contains 5.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

Also in Example E2, the wet-spread diameter of solder satisfied the above-described determination criteria, and therefore, a sufficient effect was obtained for the wet spreadability of solder.

Example E3 contains 2.5 wt % of tris(2-carboxyethyl) isocyanurate within the range specified in the present invention and 2.5 wt % of tris(3-carboxypropyl) isocyanurate within the range specified in the present invention. The total content of (carboxyalkyl) isocyanurate adducts is 5.0 wt % within the range specified in the present invention. In addition, Example E3 contains 45.0 wt % of polymerized rosin as rosin within the range specified in the present invention. Furthermore, Example E3 contains 5.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

Also in Example E3, the wet-spread diameter of solder satisfied the above-described determination criteria, and therefore, a sufficient effect was obtained for the wet spreadability of solder.

Example E4 contains 2.5 wt % of tris(2-carboxyethyl) isocyanurate within the range specified in the present invention and 2.5 wt % of bis(2-carboxyethyl) isocyanurate within the range specified in the present invention. The total content of (carboxyalkyl) isocyanurate adducts is 5.0 wt % within the range specified in the present invention. In addition, Example E4 contains 45.0 wt % of polymerized rosin as rosin within the range specified in the present invention. Furthermore, Example E4 contains 5.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

Also in Example E4, the wet-spread diameter of solder satisfied the above-described determination criteria, and therefore, a sufficient effect was obtained for the wet spreadability of solder.

Example E5 contains 2.5 wt % of tris(1-carboxymethyl) isocyanurate within the range specified in the present invention and 2.5 wt % of tris(3-carboxypropyl) isocyanurate within the range specified in the present invention. The total content of (carboxyalkyl) isocyanurate adducts is 5.0 wt % within the range specified in the present invention. In addition, Example E5 contains 45.0 wt % of polymerized rosin as rosin within the range specified in the present invention. Furthermore, Example E5 contains 5.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

Also in Example E5, the wet-spread diameter of solder satisfied the above-described determination criteria, and therefore, a sufficient effect was obtained for the wet spreadability of solder.

Example E6 contains 2.5 wt % of tris(1-carboxymethyl) isocyanurate within the range specified in the present invention and 2.5 wt % of bis(2-carboxyethyl) isocyanurate within the range specified in the present invention. The total content of (carboxyalkyl) isocyanurate adducts is 5.0 wt % within the range specified in the present invention. In addition, Example E6 contains 45.0 wt % of polymerized rosin as rosin within the range specified in the present invention. Furthermore, Example E6 contains 5.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

Also in Example E6, the wet-spread diameter of solder satisfied the above-described determination criteria, and therefore, a sufficient effect was obtained for the wet spreadability of solder.

Example E7 contains 2.5 wt % of tris(3-carboxypropyl) isocyanurate within the range specified in the present invention and 2.5 wt % of bis(2-carboxyethyl) isocyanurate within the range specified in the present invention. The total content of (carboxyalkyl) isocyanurate adducts is 5.0 wt % within the range specified in the present invention. In addition, Example E7 contains 45.0 wt % of polymerized rosin as rosin within the range specified in the present invention. Furthermore, Example E7 contains 5.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 39.0 wt % of hexyl diglycol as a solvent within the range specified in the present invention.

Also in Example E7, the wet-spread diameter of solder satisfied the above-described determination criteria, and therefore, a sufficient effect was obtained for the wet spreadability of solder.

Example E8 contains 2.5 wt % of tris(2-carboxyethyl) isocyanurate within the range specified in the present invention, 2.5 wt % of tris(I-carboxymethyl) isocyanurate within the range specified in the present invention, and 2.5 wt % of tris(3-carboxypropyl) isocyanurate within the range specified in the present invention. The total content of (carboxyalkyl) isocyanurate adducts is 7.5 wt % within the range specified in the present invention. In addition, Example E8 contains 45.0 wt % of polymerized rosin as rosin within the range specified in the present invention. Furthermore, Example E8 contains 3.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 38.5 wt % of hexyl diglycol as a solvent within the range specified in the present invention.

Also in Example E8, the wet-spread diameter of solder satisfied the above-described determination criteria, and therefore, a sufficient effect was obtained for the wet spreadability of solder.

Example E9 contains 2.5 wt % of tris(2-carboxyethyl) isocyanurate within the range specified in the present invention, 2.5 wt % of tris(1-carboxymethyl) isocyanurate within the range specified in the present invention, and 2.5 wt % of bis(2-carboxyethyl) isocyanurate within the range specified in the present invention. The total content of (carboxyalkyl) isocyanurate adducts is 7.5 wt % within the range specified in the present invention. In addition, Example E9 contains 45.0 wt % of polymerized rosin as rosin within the range specified in the present invention. Furthermore, Example E9 contains 3.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 38.5 wt % of hexyl diglycol as a solvent within the range specified in the present invention.

Also in Example E9, the wet-spread diameter of solder satisfied the above-described determination criteria, and therefore, a sufficient effect was obtained for the wet spreadability of solder.

Example E10 contains 2.5 wt % of tris(2-carboxyethyl) isocyanurate within the range specified in the present invention, 2.5 wt % of tris(3-carboxypropyl) isocyanurate within the range specified in the present invention, and 2.5 wt % of bis(2-carboxyethyl) isocyanurate within the range specified in the present invention. The total content of (carboxyalkyl) isocyanurate adducts is 7.5 wt % within the range specified in the present invention. In addition, Example E10 contains 45.0 wt % of polymerized rosin as rosin within the range specified in the present invention. Furthermore, Example E10 contains 3.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 38.5 wt % of hexyl diglycol as a solvent within the range specified in the present invention.

Also in Example E10, the wet-spread diameter of solder satisfied the above-described determination criteria, and therefore, a sufficient effect was obtained for the wet spreadability of solder.

Example E11 contains 2.5 wt % of tris(t-carboxymethyl) isocyanurate within the range specified in the present invention, 2.5 wt % of tris(3-carboxypropyl) isocyanurate within the range specified in the present invention, and 2.5 wt % of bis(2-carboxyethyl) isocyanurate within the range specified in the present invention. The total content of (carboxyalkyl) isocyanurate adducts is 7.5 wt % within the range specified in the present invention. In addition, Example E11 contains 45.0 wt % of polymerized rosin as rosin within the range specified in the present invention. Furthermore, Example E11 contains 3.0 wt % of monoethanolamine as an amine within the range specified in the present invention, 1.0 wt % of trans-2,3-dibromo-1,4-butenediol as an organic halogen compound within the range specified in the present invention, 5 wt % of hydrogenated castor oil as a thixotropic agent within the range specified in the present invention, and the remainder being 38.5 wt % of hexyl diglycol as a solvent within the range specified in the present invention.

Also in Example E11, the wet-spread diameter of solder satisfied the above-described determination criteria, and therefore, a sufficient effect was obtained for the wet spreadability of solder.

In contrast, Comparative Example E1 does not contain any tris(2-carboxyethyl) isocyanurate, tris(1-carboxymethyl) isocyanurate, tris(3-carboxypropyl) isocyanurate, or bis(2-carboxyethyl) isocyanurate. In addition, Comparative Example E1 contains 45.0 wt % of polymerized rosin as rosin within the range specified in the present invention, 5.0 wt % of glutaric acid as an organic acid within the range specified in the present invention, 5.0 wt % of monoethanolamine as an amine within the range specified in the present invention, 1.0 wt % of trans-2,3-dibromo-1,4-butenediol as an organic halogen compound within the range specified in the present invention, 5.0 wt % of hydrogenated castor oil as a thixotropic agent within the range specified in the present invention, and the remainder being 39.0 wt % of hexyl diglycol as a solvent within the range specified in the present invention.

Since Comparative Example E1 did not contain any (carboxyalkyl) isocyanurate adduct, even if the examples contained rosin, an organic acid, an amine, an organic halogen compound, a thixotropic agent, and a solvent within the ranges specified in the present invention, the wet-spread diameter of solder did not satisfy the above-described determination criteria, and therefore, no effect was obtained for the wet spreadability of solder.

Comparative Example E2 does not contain any tris(2-carboxyethyl) isocyanurate, tris(J-carboxymethyl) isocyanurate, tris(3-carboxypropyl) isocyanurate, or bis(2-carboxyethyl) isocyanurate. In addition, Comparative Example E2 contains 45.0 wt % of polymerized rosin as rosin within the range specified in the present invention, 5.0 wt % of adipic acid as an organic acid within the range specified in the present invention, 5.0 wt % of monoethanolamine as an amine within the range specified in the present invention, 1.0 wt % of trans-2,3-dibromo-1,4-butenediol as an organic halogen compound within the range specified in the present invention, 5.0 wt % of hydrogenated castor oil as a thixotropic agent within the range specified in the present invention, and the remainder being 39.0 wt % of hexyl diglycol as a solvent within the range specified in the present invention.

Since Comparative Example E2 did not contain any (carboxyalkyl) isocyanurate adduct, even if the examples contained rosin, an organic acid, an amine, an organic halogen compound, a thixotropic agent, and a solvent within the ranges specified in the present invention and the type of organic acid is changed, the wet-spread diameter of solder did not satisfy the above-described determination criteria, and therefore, no effect was obtained for the wet spreadability of solder.

From the above, in the flux of the first embodiment which contained 0.5 wt % to 20.0 wt % of a (carboxyalkyl) isocyanurate adduct, 5.0 wt % to 45.0 wt % of rosin, and a solvent, an effect of removing an oxide in a desired temperature range is enhanced.

Accordingly, in this flux and solder paste in which this flux was used, an oxide which causes non-wetting of solder was removed by performing soldering in a reflow furnace, whereby wet spreadability of the solder was improved.

These effects were not inhibited by the flux of the first embodiment in which the wet spreadability of solder was improved and which contained an acrylic resin, an organic acid other than a (carboxyalkyl) isocyanurate adduct, an amine, an organic halogen compound, an amine hydrohalide, and a thixotropic agent as optional additives within the range specified in the present invention.

Fluxes of examples and comparative examples having compositions shown in Tables 10 to 13 as follows were prepared and solder paste substances using these fluxes were prepared to verify solder wettability, temperature cycle reliability, and void reduction properties for the flux of the second embodiment according to the present invention. The composition ratios in Tables 10 to 13 are shown by wt % in a case where the total amount of flux is set to 100.

<Evaluation of Solder Wettability>

(1) Verification Method

Solder wettability to an end surface of a terminal and solder wettability to an upper surface of a terminal were evaluated as solder wettability.

Figure 1B:
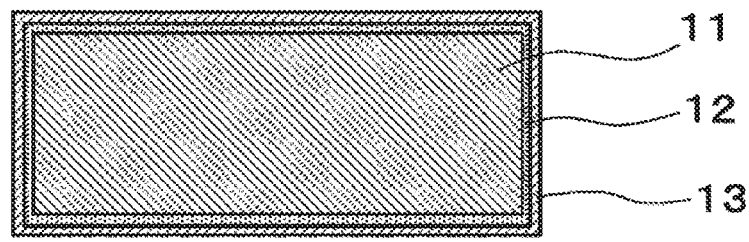
FIG. 1B is a front cross-sectional view of the terminal of the component for verifying solder wettability to the end surface of the terminal.
Figure 1C:
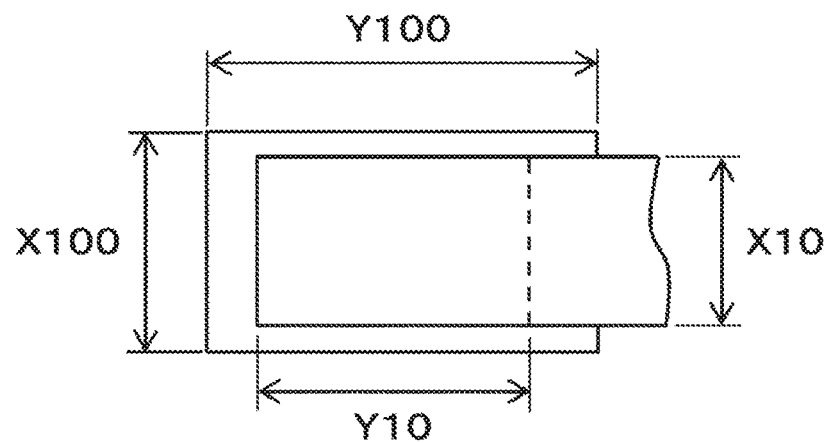
FIG. 1C is a top view of an electrode and the terminal of the component for verifying solder wettability to the end surface of the terminal.
Figure 1D:
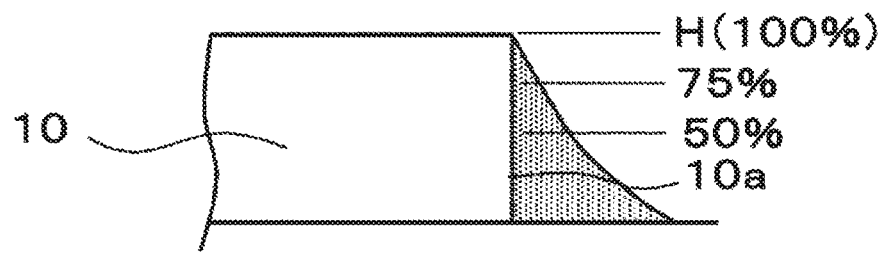
FIG. 1D is an explanatory view illustrating a method for evaluating solder wettability to the end surface of the terminal.

FIG. 1A is a front view of a terminal 10 of a component for verifying solder wettability to an end surface of the terminal, FIG. 1B is a front cross-sectional view of the terminal 10 of the component for verifying solder wettability to the end surface of the terminal, and FIG. 1C is a top view of an electrode 100 and the terminal 10 of the component for verifying solder wettability to the end surface of the terminal. In addition, FIG. 1D is an explanatory view illustrating a method for evaluating solder wettability to the end surface of the terminal.

In the terminal 10 of the component, a width X10 is 0.2 mm and a height Z10 is 0.12 mm as shown in FIG. 1A. In the terminal 10, a Cu plating layer 12 is formed on a Fe core material 11, and an Sn-based alloy plating layer 13 is formed on the plating layer 12. The thickness of the plating layer 12 is 5 μm on one side. In addition, the thickness of the plating layer 13 is 2 μm on one side.

The composition of the core material 11 is 100 wt % of Fe. The core material 11 may contain inevitable impurities in addition to Fe. The composition of the plating layer 12 is 100 wt % of Cu. The plating layer 12 may contain inevitable impurities in addition to Cu. Furthermore, the composition of the plating layer 13 is 3.0 wt % of Ag and 0.5 wt % of Cu, and the remainder being Sn. The plating layer 13 may contain inevitable impurities in addition to Sn, Ag, and Cu.

In the electrode 100, a length Y100 is 1.25 mm and a width X100 is 0.25 mm. In the electrode 100, organic solderability preservative (OSP) treatment is performed on a surface of a Cu layer. A length Y10 of a portion of the terminal 10 which comes into contact with the electrode 100 is 0.5 mm.

Figure 2A:
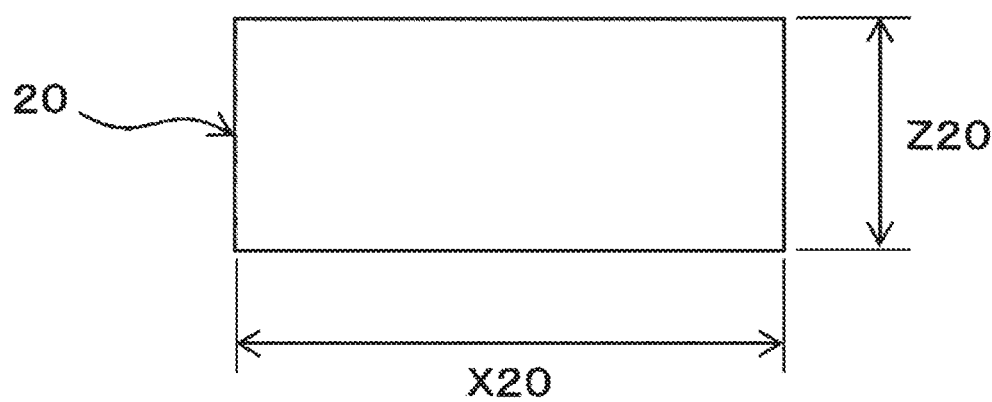
FIG. 2A is a front view of a terminal of a component for verifying solder wettability to an upper surface of the terminal.
Figure 2B:
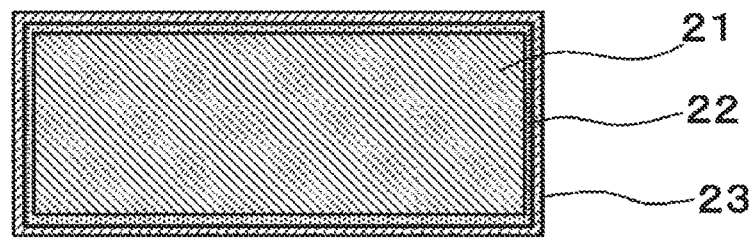
FIG. 2B is a front cross-sectional view of the terminal of the component for verifying solder wettability to the upper surface of the terminal.
Figure 2C:
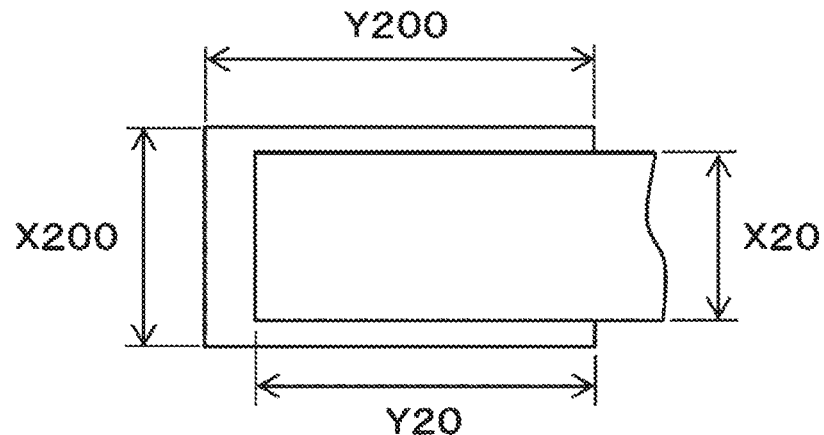
FIG. 2C is a top view of an electrode and the terminal of the component for verifying solder wettability to the upper surface of the terminal.

FIG. 2A is a front view of a terminal 20 of a component for verifying solder wettability to an upper surface of the terminal, FIG. 2B is a front cross-sectional view of the terminal 20 of the component for verifying solder wettability to the upper surface of the terminal, and FIG. 2C is a top view of an electrode 200 and the terminal 20 of the component for verifying solder wettability to the upper surface of the terminal.

In the terminal 20 of the component, a width X20 is 0.3 mm and a height Z20 is 0.13 mm as shown in FIG. 2A. In the terminal 20, a Cu plating layer 22 is formed on a Fe-based alloy core material 21, and an Sn-based alloy plating layer 23 is formed on the plating layer 22. The thickness of the plating layer 22 is 5 μm on one side. In addition, the thickness of the plating layer 23 is 2 μm on one side.

The composition of the core material 21 is Fe and Ni. The core material 21 may contain inevitable impurities in addition to Fe and Ni. The composition of the plating layer 22 is 100 wt % of Cu. The plating layer 22 may contain inevitable impurities in addition to Cu. Furthermore, the composition of the plating layer 23 is 3.0 wt % of Ag and 0.5 wt % of Cu, and the remainder being Sn. The plating layer 23 may contain inevitable impurities in addition to Sn, Ag, and Cu.

In the electrode 200, a length Y200 is 0.8 mm and a width X20 is 0.9 mm. In the electrode 200, OSP treatment is performed on a surface of a Cu layer. A length Y20 of a portion of the terminal 20 which comes into contact with the electrode 200 is 0.5 mm.

For an evaluation of solder wettability to the end surface of the terminal 10, solder paste in which each flux described in the examples and comparative examples is used is printed on the electrode 100. The print thickness is 0.15 mm. After the printing of solder paste, a component is mounted, and reflowing is performed.

For an evaluation of solder wettability to the upper surface of the terminal 20, solder paste in which each flux described in the examples and comparative examples is used is printed on the electrode 200. The print thickness is 0.15 mm. After the printing of solder paste, a component is mounted, and reflowing is performed.

As the reflow conditions, preheating was performed at a temperature rising rate of 30° C./80 sec so that the temperature became 180° C. from 150° C. for 80 seconds in an N2 atmosphere at an oxygen concentration of 1,500 ppm. After the preheating, the temperature was raised from 180° C. to 240° C. at a temperature rising rate of 2° C./sec. After raising the temperature up to 240° C., main heating was performed for 40 seconds while maintaining the temperature.

(2) Determination Criteria

For an evaluation of solder wettability to the end surface of the terminal 10, the solder wettability was determined by a ratio of wetting of solder to the height of the end surface in a case where a state in which solder (fillet) is wet up to an upper end H of an end surface 10a of the terminal 10 is regarded as 100% as shown in FIG. 1D.

⊙: The wetting of solder (fillet) was 75% to 100% of the height of the end surface.

∘: The wetting of solder (fillet) was greater than or equal to 50% and less than 75% of the height of the end surface.

x: The wetting of solder (fillet) was less than 50% of the height of the end surface.

Evaluation of Solder Wettability to Upper Surface of Terminal 20

∘: Solder was wet-spread over the entire upper surface of the terminal.

x: Solder was not wet-spread over the entire upper surface of the terminal.

<Evaluation of Temperature Cycle Reliability>

(1) Verification Method

For an evaluation of the temperature cycle reliability, each flux of the examples and the comparative examples was applied on a Cu plate, and a residue was formed on the Cu plate. The presence or absence of cracks in this residue formed on the Cu plate when 500 cycles of a test of repeating processing of holding the residue for 30 minutes each at −30° C. and +110° C. were performed was visually evaluated.

(2) Determination Criteria

∘: There was no crack found in the residue.

x: There was a crack found in the residue.

<Evaluation of Void Reduction Properties>

(1) Verification Method

For an evaluation of void reduction properties, solder paste in which each flux described in the examples and comparative examples is used is printed on an electrode of a substrate. The print thickness is 0.12 mm. After the printing of solder paste, a quad flat non-lead package (QFN) is mounted thereon, and reflowing is performed. The QFN is square-shaped with a side length of 8 mm, and a lower-surface electrode is square-shaped with a side length of 5 mm. As the reflow conditions, preheating was performed at 150° C. to 200° C. for 118 seconds in an N2 atmosphere, and then, main heating was performed at 220° C. or higher for 42 seconds while setting the peak temperature at 247° C. After the reflowing, a component mounted portion was imaged using an X-ray observation device (XVR-160 manufactured by Uni-Hite System Corporation), and a void area rate was calculated by Equation (1) while setting the number of pixels of the entire lower-surface electrode portion of QFN in the X-ray transmission image as a denominator and the number of pixels of a void portion as a numerator.

$$\text{(Total number of pixels of void portion/number of pixels of entire electrode portion)}\times 100(\%) \quad (1)$$

(2) Determination Criteria

∘: Void area rate ≤15% x: Void area rate >15%

<Comprehensive Evaluation>

∘: The evaluation of solder wettability scored ⊙ or ∘, and both of the evaluation of temperature cycle reliability and the evaluation of void reduction properties scored ∘.

x: Any or all of the evaluation of solder wettability, the evaluation of temperature cycle reliability, and the evaluation of void reduction properties scored x.

TABLE 10

| Material category | Material type | Example F1 | Example F2 | Example F3 | Example F4 | Example F5 | Example F6 | Example F7 | Example F8 | Example F9 | Example F10 | Example F11 | Example F12 | Example F13 | Example F14 | Example F15 |
|---|---|---|---|---|---|---|---|---|---|---|---|---|---|---|---|---|
| Resin — Acrylic resin | Poly-2-ethylhexyl acrylate | 15.0 | | | | | | | | | | 15.0 | 15.0 | 15.0 | 17.0 | 15.0 |
| | Polylauryl methacrylate | | 15.0 | | | | | | | | | | | | | |
| | Poly-2-ethylhexyl acrylate-polyethylene | | | 15.0 | | | | | | | | | | | | |
| Rosin | Acrylic acid-modified hydrogenated rosin | | | | 5.0 | | | | | | | 0.4 | 1.5 | | | |
| | Maleic acid-modified hydrogenated rosin | | | | 5.0 | | | | | | | | | | | |
| | Phenol-modified rosin | | | | 15.0 | | | | | | | | | | | |
| | Disproportionated rosin | | | | | 25.0 | | | | | | | | | | |
| | Hydrogenated rosin | | | | | | 5.0 | | 5.0 | | | | | | | |
| | Polymerized rosin | | | | | | | 25.0 | | 25.0 | | | | 10.0 | | |
| | Rosin ester | | | | | | | | | | 5.0 | | 1.5 | | | |
| Other resins | Polyethylene resin | | | | | | | | | | | | | | | |
| | Polypropylene resin | | | | | | | | | | | | | | | |
| | Acid-modified polyethylene resin | 3.0 | 3.0 | 3.0 | 3.0 | 3.0 | 8.0 | 3.0 | 8.0 | 3.0 | 8.0 | | | | | 3.0 |
| Activator — Organic acid | Trist(2-carboxyethyl)isocyanurate | | | | | | | | | | | 0.4 | | | | |
| | Hydrogenated dimer acid | 6.0 | 6.0 | 6.0 | 6.0 | 6.0 | 6.0 | 6.0 | 6.0 | 6.0 | 6.0 | 6.0 | 6.0 | 6.0 | 6.0 | 15.0 |
| | Dimer acid | 20.0 | 20.0 | 20.0 | 20.0 | 10.0 | 25.0 | 10.0 | 25.0 | 10.0 | 25.0 | 20.0 | 20.0 | 13.0 | 20.0 | 11.0 |
| | Hydrogenated trimer acid | | | | | | | | | | | | | | | |
| | Trimer acid | | | | | | | | | | | | | | | |
| | Succinic acid | | | | | | | | | | | 0.4 | | | | |
| | Glutaric acid | | | | | | | | | | | 0.4 | | | | |
| | Diglycolic acid | | | | | | | | | | | 0.4 | | | | |
| | Adipic acid | | | | | | | | | | | 0.4 | | | | |
| | Suberic acid | | | | | | | | | | | 0.6 | | | | |
| Amine | 2-Phenylimidazole | 1.0 | 1.0 | 1.0 | 1.0 | 1.0 | 1.0 | 1.0 | 1.0 | 1.0 | 1.0 | 1.0 | 1.0 | 1.0 | 2.0 | 1.0 |
| | 2-Undecylimidazole | | | | | | | | | | | | | | | |
| | 2-Phenylimidazoline | | | | | | | | | | | | | | | |
| | Diethanolamine | | | | | | | | | | | | | | | |
| | Diethylethylenediamine | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Organic halogen compound | 2,3-Dibromo-1,4-butanediol | | | | | | | | | | | | | | | |
| | Trans-2,3-dibromo-2-butene-1,4-diol | | | | | | | | | | | | | | | |
| | Triallyl isocyanurate hexabromide | | | | | | | | | | | | | | | |
| Amine hydrohalides | Diphenylguanidine HBr | | | | | | | | | | | | | | | |
| | Ethylamine HBr | | | | | | | | | | | | | | | |
| Thixotropic agent — Ester-based thixotropic agent | Hydrogenated castor oil | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Amide-based thixotropic agent | Bisamide-based thixotropic agent | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| | Polyamide-based thixotropic agent | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |

TABLE 10-continued

| Material category | | Material type | Example F1 | Example F2 | Example F3 | Example F4 | Example F5 | Example F6 | Example F7 | Example F8 | Example F9 | Example F10 | Example F11 | Example F12 | Example F13 | Example F14 | Example F15 |
|---|---|---|---|---|---|---|---|---|---|---|---|---|---|---|---|---|---|
| Metal deactivator | Hindered phenolic metal deactivator | Bis[3-(3-tert-butyl-4-hydroxy-5-methylphenyl)propionic acid] [ethylenebis(oxyethylene)] | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| | | N,N-hexamethylenebis[3-(3,5-di-tert-butyl-4-hydroxyphenyl)propanamide] | | | | | | | | | | | | | | | |
| | Nitrogen compound-based metal deactivator | N-(2H-1,2,4-triazol-5-yl) salicylamide | | | | | | | | | | | | | | | |
| Solvent | Solvent | Hexyl diglycol | 43.5 | 43.5 | 43.5 | 43.5 | 43.5 | 43.5 | 43.5 | 43.5 | 43.5 | 43.5 | 43.5 | 43.5 | 43.5 | 43.5 | 43.5 |
| | | Ethylhexyl diglycol | | | | | | | | | | | | | | | |
| Ratio | | CIC acid/dimer acid | 0.3 | 0.3 | 0.3 | 0.3 | 0.6 | 0.2 | 0.6 | 0.2 | 0.6 | 0.2 | 0.3 | 0.3 | 0.5 | 0.3 | 1.4 |
| | | Acrylic resin/rosin | 5.0 | 5.0 | 5.0 | 5.0 | 8.3 | 0.6 | 8.3 | 0.6 | 8.3 | 0.6 | 5.0 | 5.0 | 1.5 | 5.0 | 5.0 |
| Evaluation | | Evaluation (1) of wettability: wettability to end surface of terminal | ◎ | ◎ | ◎ | ◎ | ○ | ◎ | ○ | ◎ | ◎ | ◎ | ◎ | ◎ | ○ | ◎ | ○ |
| | | Evaluation (2) of wettability: wettability to upper surface of terminal | ○ | ○ | ○ | ○ | ○ | ○ | ○ | ○ | ○ | ○ | ○ | ○ | ○ | ○ | ○ |
| | | Temperature cycle reliability | ○ | ○ | ○ | ○ | ○ | ○ | ○ | ○ | ○ | ○ | ○ | ○ | ○ | ○ | ○ |
| | | Void suppresion | ○ | ○ | ○ | ○ | ○ | ○ | ○ | ○ | ○ | ○ | ○ | ○ | ○ | ○ | ○ |
| | | Comprehensive evaluation | ○ | ○ | ○ | ○ | ○ | ○ | ○ | ○ | ○ | ○ | ○ | ○ | ○ | ○ | ○ |

TABLE 11

| Material category | | Material type | Example F16 | Example F17 | Example F18 | Example F19 | Example F20 | Example F21 | Example F22 | Example F23 | Example F24 | Example F25 | Example F26 | Example F27 | Example F28 | Example F29 | Example F30 |
|---|---|---|---|---|---|---|---|---|---|---|---|---|---|---|---|---|---|
| Resin | Acrylic resin | Poly-2-ethylhexyl acrylate | 15.0 | 15.0 | 15.0 | 15.0 | 15.0 | 10.0 | 25.0 | 15.0 | 15.0 | 15.0 | 15.0 | 15.0 | 15.0 | 11.5 | 15.0 |
| | | Polylauryl methacrylate | | | | | | | | | | | | | | | |
| | | Poly-2-ethylhexyl acrylate-polyethylene | | | | | | | | | | | | | | | |
| | Rosin | Acrylic acid-modified, hydrogenated rosin | | | | | | | | | | | | | | | |
| | | Maleic acid-modified hydrogenated rosin | | | | | | | | | | | | | | | |
| | | Phenol-modified rosin | | | | | | | | | | | | | | | |
| | | Disproportionated hydrogenated rosin | | | | | | | | | | | | | | | |
| | | Polymerized rosin | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| | | Rosin ester | | | | | | | | | | | | | | | |
| | Other resins | Polyethylene resin | | | | | | | | | | | | | | | |
| | | Polypropylene resin | | | | | | | | | | | | | | | |
| | | Acid-modified polyethylene resin | | | | | | | | | | | | | | | |
| Activator | Organic acid | Tris(2-carboxyethyl)isocyanurate | 2.0 | 6.0 | 6.0 | 6.0 | 6.0 | 6.0 | 6.0 | 6.0 | 6.0 | 6.0 | 6.0 | 6.0 | 6.0 | 6.0 | 6.0 |
| | | Hydrogenated dimer acid | 20.0 | | | | 5.0 | 25.0 | 5.0 | 20.0 | 20.0 | 20.0 | 20.0 | 20.0 | 20.0 | 20.0 | 15.0 |
| | | Dimer acid | | 20.0 | | | 5.0 | | | | | | | | | | |
| | | Hydrogenated trimer acid | | | 20.0 | | 5.0 | | | | | | | | | | |
| | | Trimer acid | | | | 20.0 | | | | | | | | | | | |
| | | Succinic acid | 5.0 | 1.0 | 1.0 | 1.0 | 1.0 | 1.0 | 1.0 | | | | 0.5 | | | | 1.0 |
| | | Glutaric acid | | | | | | | 5.0 | | | | 0.5 | | | | |
| | | Diglycolic acid | | | | | | | | 1.0 | | | 0.5 | 0.5 | | | |
| | | Adipic acid | | | | | | | | | 1.0 | | 0.5 | | | | |
| | | Suberic acid | | | | | | | | | | 1.0 | | | | | |
| | Amine | 2-Phenylimidazole | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | | 2-Undecylimidazole | | | | | | | | | | | | | 3.0 | 10.0 | |
| | | 2-Phenylimidazoline | | | | | | | | | | | | | | | 5.0 |
| | | Diethanolamine | | | | | | | | | | | | | | | |
| | | Diethylethylenediamine | | | | | | | | | | | | | | | |
| | Organic halogen compound | 2,3-Dibromo-2-butene-1,4-diol | | | | | | | | | | | | | | | |
| | | Triallyl isocyanurate hexabromide | | | | | | | | | | | | | | | |
| | Amine hydrohalides | Diphenylguanidine HBr | | | | | | | | | | | | 0.5 | | | |
| | | Ethylamine HBr | | | | | | | | | | | | | | | |
| Thixotropic agent | Ester-based thixotropic agent | Hydrogenated castor oil | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| | Amide-based thixotropic agent | Bisamide-based thixotropic agent | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| | | Polyamide-based thixotropic agent | | | | | | | | | | | | | | | |

TABLE 11-continued

| Material category | | Material type | Example F16 | Example F17 | Example F18 | Example F19 | Example F20 | Example F21 | Example F22 | Example F23 | Example F24 | Example F25 | Example F26 | Example F27 | Example F28 | Example F29 | Example F30 |
|---|---|---|---|---|---|---|---|---|---|---|---|---|---|---|---|---|---|
| Metal deactivator | Hindered phenolic metal deactivator | Bis[3-(3-tert-butyl-4-hydroxy-5-methylphenyl)propionic acid] [ethylenebis (oxyethylene)] | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| | Nitrogen compound-based metal deactivator | N,N'-hexamethylenebis[3-(3,5-di-tert-butyl-4-hydroxyphenyl)propanamide] N-(2H-1,2,4-triazol-5-yl) salicylamide | | | | | | | | | | | | | | | |
| Solvent | Solvent | Hexyl diglycol | 43.5 | 43.5 | 43.5 | 43.5 | 43.5 | 43.5 | 43.5 | 43.5 | 43.5 | 43.5 | 42.5 | 44.0 | 41.5 | 38.0 | 43.5 |
| | | Ethylhexyl diglycol | | | | | | | | | | | | | | | |
| Ratio | | CIC acid/dimer acid | 0.1 | 0.3 | 0.3 | 0.3 | 0.3 | 0.2 | 1.2 | 0.3 | 0.3 | 0.3 | 0.3 | 0.3 | 0.3 | 0.3 | 0.4 |
| | | Acrylic resin/rosin | 5.0 | 5.0 | 5.0 | 5.0 | 5.0 | 3.3 | 8.3 | 5.0 | 5.0 | 5.0 | 5.0 | 5.0 | 5.0 | 3.8 | 5.0 |
| Evaluation | | Evaluation (1) of wettability: wettability to end surface of terminal | ◎ | ◎ | ◎ | ◎ | ◎ | ◎ | ○ | ◎ | ◎ | ◎ | ◎ | ◎ | ◎ | ◎ | ◎ |
| | | Evaluation (2) of wettability: wettability to upper surface of terminal | ○ | ○ | ○ | ○ | ○ | ○ | ○ | ○ | ○ | ○ | ○ | ○ | ○ | ○ | ○ |
| | | Temperature cycle reliability | ○ | ○ | ○ | ○ | ○ | ○ | ○ | ○ | ○ | ○ | ○ | ○ | ○ | ○ | ○ |
| | | Void suppresion | ○ | ○ | ○ | ○ | ○ | ○ | ○ | ○ | ○ | ○ | ○ | ○ | ○ | ○ | ○ |
| | | Comprehensive evaluation | ○ | ○ | ○ | ○ | ○ | ○ | ○ | ○ | ○ | ○ | ○ | ○ | ○ | ○ | ○ |

TABLE 12

| Material category | | Material type | Example F31 | Example F32 | Example F33 | Example F34 | Example F35 | Example F36 | Example F37 | Example F38 | Example F39 | Example F40 | Example F41 | Example F42 | Example F43 | Example F44 | Example F45 |
|---|---|---|---|---|---|---|---|---|---|---|---|---|---|---|---|---|---|
| Resin | Acrylic resin | Poly-2-ethylhexyl acrylate | 15.0 | 15.0 | 15.0 | 15.0 | 10.0 | 15.0 | 15.0 | 15.0 | 10.0 | 15.0 | 15.0 | 15.0 | 15.0 | 15.0 | 15.0 |
| | | Polylauryl methacrylate | | | | | | | | | | | | | | | |
| | | Poly-2-ethylhexyl acrylate-polyethylene | | | | | | | | | | | | | | | |
| | Rosin | Acrylic acid-modified, hydrogenated rosin | | | | | | | | | | | | | | | |
| | | Maleic acid-modified hydrogenated rosin | | | | | | | | | | | | | | | |
| | | Phenol-modified rosin | | | | | | | | | | | | | | | |
| | | Disproportionated hydrogenated rosin | | | | | | | | | | | | | | | |
| | | Polymerized rosin | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| | | Rosin ester | | | | | | | | | | | | | | | |
| | Other resins | Polyethylene resin | | | | | | | | | | | | | | | |
| | | Polypropylene resin | | | | | | | | | | | | | | | |
| | | Acid-modified polyethylene resin | | | | | | | | | | | | | | | |
| Activator | Organic acid | Tris(2-carboxyethyl)isocyanurate | 6.0 | 6.0 | 6.0 | 6.0 | 6.0 | 6.0 | 6.0 | 6.0 | 6.0 | 6.0 | 6.0 | 6.0 | 6.0 | 6.0 | 6.0 |
| | | Hydrogenated dimer acid | 20.0 | 20.0 | 20.0 | 20.0 | 20.0 | 20.0 | 20.0 | 20.0 | 20.0 | 20.0 | 20.0 | 15.0 | 15.0 | 25.0 | 25.0 |
| | | Dimer acid | | | | | | | | | | | | | | | |
| | | Hydrogenated trimer acid | | | | | | | | | | | | | | | |
| | | Trimer acid | | | | | | | | | | | | | | | |
| | | Succinic acid | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| | | Glutaric acid | | | | | | | | | | | | | | | |
| | | Diglycolic acid | | | | | | | | | | | | | | | |
| | | Adipic acid | | | | | | | | | | | | | | | |
| | | Suberic acid | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Amine | 2-Phenylimidazole | 2.0 | | | | | | | | | | | | | | |
| | | 2-Undecylimidazole | | 2.0 | | | | | | | | | | | | | |
| | | 2-Phenylimidazoline | | | 2.0 | | | | | | | | | | | | |
| | | Diethanolamine | | | | 2.0 | | | | | | | | | | | |
| | | Diethylethylenediamine | | | | | 5.0 | | | | | | | | | | |
| | Organic halogen compound | 2,3-Dibromo-2-butene-1,4-diol | | | | | | 2.0 | | | | | | | | | |
| | | Trans-2,3-dibromo-2-butene-1,4-diol | | | | | | | 2.0 | | | | | | | | |
| | | Triallyl isocyanurate hexabromide | | | | | | | | 2.0 | | | | | | | |
| | Amine hydrohalides | Diphenylguanidine HBr | | | | | | | | | 5.0 | | 1.0 | | | | |
| | | Ethylamine HBr | | | | | | | | | | 1.0 | 2.0 | | | | |
| Thixotropic agent | Ester-based thixotropic agent | Hydrogenated castor oil | 2.0 | 2.0 | 2.0 | 2.0 | 2.0 | 2.0 | 2.0 | 2.0 | 2.0 | 2.0 | 2.0 | 0 | 10.0 | 2.0 | 2.0 |
| | Amide-based thixotropic agent | Bisamide-based thixotropic agent | 2.0 | 2.0 | 2.0 | 2.0 | 2.0 | 2.0 | 2.0 | 2.0 | 2.0 | 2.0 | 2.0 | 10.0 | 0.0 | 0.0 | 0.0 |
| | | Polyamide-based thixotropic agent | 2.0 | 2.0 | 2.0 | 2.0 | 2.0 | 2.0 | 2.0 | 2.0 | 2.0 | 2.0 | 2.0 | 0.0 | 0.0 | 2.0 | 2.0 |

TABLE 12-continued

| Material category | | Material type | Example F31 | Example F32 | Example F33 | Example F34 | Example F35 | Example F36 | Example F37 | Example F38 | Example F39 | Example F40 | Example F41 | Example F42 | Example F43 | Example F44 | Example F45 |
|---|---|---|---|---|---|---|---|---|---|---|---|---|---|---|---|---|---|
| Metal deactivator | Hindered phenolic metal deactivator | Bis[3-(3-tert-butyl-4-hydroxy-5-methylphenyl)propionic acid] [ethylenebis(oxyethylene)] | 5.0 | 5.0 | 5.0 | 5.0 | 5.0 | 5.0 | 5.0 | 5.0 | 5.0 | 5.0 | 5.0 | | | | |
| | | N,N'-hexamethylenebis[3-(3,5-di-tert-butyl-4-hydroxyphenyl)propanamide] | | | | | | | | | | | | | | | |
| | Nitrogen compound-based metal deactivator | N-(2H-1,2,4-triazol-5-yl) salicylamide | | | | | | | | | | | | | | | 0.0 |
| Solvent | Solvent | Hexyl diglycol | 41.5 | 41.5 | 41.5 | 41.5 | 43.5 | 41.5 | 41.5 | 41.5 | 43.5 | 42.5 | 42.5 | 47.5 | 47.5 | 43.5 | 43.5 |
| | | Ethylhexyl diglycol | | | | | | | | | | | | | | | |
| Ratio | | CIC acid/dimer acid | 0.3 | 0.3 | 0.3 | 0.3 | 0.3 | 0.3 | 0.3 | 0.3 | 0.3 | 0.3 | 0.3 | 0.4 | 0.4 | 0.2 | 0.2 |
| | | Acrylic resin/rosin | 5.0 | 5.0 | 5.0 | 5.0 | 3.3 | 5.0 | 5.0 | 5.0 | 3.3 | 5.0 | 5.0 | 5.0 | 5.0 | 5.0 | 5.0 |
| Evaluation | | Evaluation (1) of wettability: wettability to end surface of terminal | ◎ | ◎ | ◎ | ◎ | ◎ | ◎ | ◎ | ◎ | ◎ | ◎ | ◎ | ◎ | ◎ | ◎ | ◎ |
| | | Evaluation (2) of wettability: wettability to upper surface of terminal | ○ | ○ | ○ | ○ | ○ | ○ | ○ | ○ | ○ | ○ | ○ | ○ | ○ | ○ | ○ |
| | | Temperature cycle reliability | ○ | ○ | ○ | ○ | ○ | ○ | ○ | ○ | ○ | ○ | ○ | ○ | ○ | ○ | ○ |
| | | Void suppresion | ○ | ○ | ○ | ○ | ○ | ○ | ○ | ○ | ○ | ○ | ○ | ○ | ○ | ○ | ○ |
| | | Comprehensive evaluation | ○ | ○ | ○ | ○ | ○ | ○ | ○ | ○ | ○ | ○ | ○ | ○ | ○ | ○ | ○ |

TABLE 13

| Material category | | Material type | Example F46 | Example F47 | Example F48 | Example F49 | Example F50 | Example F51 | Example F52 |
|---|---|---|---|---|---|---|---|---|---|
| Resin | Acrylic resin | Poly-2-ethylhexyl acrylate | 15.0 | 10.0 | 14.0 | 12.0 | 10.0 | 15.0 | 15.0 |
| | | Polylauryl methacrylate | | | | | | | |
| | | Poly-2-ethylhexyl acrylate-polyethylene | | | | | | | |
| | Rosin | Acrylic acid-modified, hydrogenated rosin | | | | | | | |
| | | Maleic acid-modified hydrogenated rosin | | | | | | | |
| | | Phenol-modified rosin | | | | | | | |
| | | Disproportionated rosin | | | | | | | |
| | | Hydrogenated rosin | | | | | | | |
| | | Polymerized rosin | 3.0 | 3.0 | 3.0 | 3.0 | 3.0 | 3.0 | 3.0 |
| | | Rosin ester | | | | | | | |
| | Other resins | Polyethylene resin | | | | | | | 8.0 |
| | | Polypropylene resin | | | | | | | |
| | | Acid-modified polyethylene resin | | | | | | | |
| Activator | Organic acid | Tris(2-carboxyethyl)isocyanurate | 6.0 | 6.0 | 6.0 | 6.0 | 6.0 | 6.0 | 6.0 |
| | | Hydrogenated dimer acid | 15.0 | 20.0 | 20.0 | 20.0 | 20.0 | 20.0 | 12.0 |
| | | Dimer acid | | | | | | | |
| | | Hydrogenated trimer acid | | | | | | | |
| | | Trimer acid | | | | | | | |
| | | Succinic acid | 1.0 | 1.0 | 1.0 | 1.0 | 1.0 | 1.0 | 1.0 |
| | | Glutaric acid | | | | | | | |
| | | Diglycolic acid | | | | | | | |
| | | Adipic acid | | | | | | | |
| | | Suberic acid | 2.5 | 2.5 | 2.5 | 2.5 | 2.5 | 2.5 | 2.5 |
| | Amine | 2-Phenylimidazole | | | | | | | |
| | | 2-Undecylimidazole | | | | | | | |
| | | 2-Phenylimidazoline | | | | | | | |
| | | Diethanolamine | | | | | | | |
| | | Diethylethylenediamine | | | | | | | |
| | Organic halogen compound | 2,3-Dibromo-1,4-butanediol | | | | | | | |
| | | Trans-2,3-dibromo-2-butene-1,4-diol | | | | | | | |
| | | Triallyl isocyanurate hexabromide | | | | | | | |
| | Amine hydrohalides | Diphenylguanidine HBr | | | | | | | |
| | | Ethylamine HBr | | | | | | | |
| Thixotropic agent | Ester-based thixotropic agent | Hydrogenated castor oil | 2.0 | 2.0 | 2.0 | 2.0 | 2.0 | 2.0 | 2.0 |
| | Amide-based thixotropic agent | Bisamide-based thixotropic agent | 2.0 | 2.0 | 2.0 | 2.0 | 2.0 | 2.0 | 2.0 |
| | | Polyamide-based thixotropic agent | | | | | | | |
| Metal deactivator | Hindered phenolic metal deactivator | Bis[3-(3-tert-butyl-4-hydroxy-5-methylphenyl)propionic acid] [ethylenebis (oxyethylene)] | 10.0 | 5.0 | 5.0 | 5.0 | 5.0 | 5.0 | 5.0 |
| | | N,N'-hexamethylenebis[3-(3,5-di-tert-butyl-4-hydroxyphenyl)propanamide] | | 5.0 | | | | | |
| | Nitrogen compound-based metal deactivator | N-(2H-1,2,4-triazol-5-yl) salicylamide | | | 1.0 | 3.0 | 5.0 | | |
| Solvent | Solvent | Hexyl diglycol | 43.5 | 43.5 | 43.5 | 43.5 | 43.5 | | 43.5 |
| | | Ethylhexyl diglycol | | | | | | 43.5 | |
| Ratio | | CIC acid/dimer acid | 0.4 | 0.3 | 0.3 | 0.3 | 0.3 | 0.3 | 0.5 |
| | | Acrylic resin/rosin | 5.0 | 3.3 | 4.7 | 4.0 | 3.3 | 5.0 | 5.0 |
| Evaluation | | Evaluation (1) of wettability: wettability to end surface of terminal | ⊚ | ⊚ | ⊚ | ⊚ | ⊚ | ⊚ | ⊚ |
| | | Evaluation (2) of wettability: wettability to upper surface of terminal | ○ | ○ | ○ | ○ | ○ | ○ | ○ |
| | | Temperature cycle reliability | ○ | ○ | ○ | ○ | ○ | ○ | ○ |
| | | Void suppression | ○ | ○ | ○ | ○ | ○ | ○ | ○ |
| | | Comprehensive evaluation | ○ | ○ | ○ | ○ | ○ | ○ | ○ |

TABLE 13-continued

| Material category | | Material type | Example F53 | Comparative Example F1 | Comparative Example F2 | Comparative Example F3 | Comparative Example F4 | Comparative Example F5 | Comparative Example F6 |
|---|---|---|---|---|---|---|---|---|---|
| Resin | Acrylic resin | Poly-2-ethylhexyl acrylate | | 0.0 | 15.0 | 20.0 | 15.0 | 15.0 | 0.0 |
| | | Polylauryl methacrylate | 15.0 | | | | | | |
| | | Poly-2-ethylhexyl acrylate-polyethylene | | | | | | | |
| | Rosin | Acrylic acid-modified, hydrogenated rosin | | | | | | | |
| | | Maleic acid-modified hydrogenated rosin | | | | | | | |
| | | Phenol-modified rosin | | | | | | | |
| | | Disproportionated rosin | | | | | | | |
| | | Hydrogenated rosin | | | | | | | |
| | | Polymerized rosin | 3.0 | 18.0 | 3.0 | 3.0 | 3.0 | 23.0 | 38.0 |
| | | Rosin ester | | | | | | | |
| | Other resins | Polyethylene resin | 8.0 | | | | | | |
| | | Polypropylene resin | 1.0 | | | | | | |
| | | Acid-modified polyethylene resin | 1.0 | | | | | | |
| Activator | Organic acid | Tris(2-carboxyethyl)isocyanurate | 6.0 | 6.0 | 0.5 | 15.0 | 00 | 6.0 | 6.0 |
| | | Hydrogenated dimer acid | 15.0 | 20.0 | 25.0 | 3.0 | 20.0 | 0.0 | 0.0 |
| | | Dimer acid | | | | | | | |
| | | Hydrogenated trimer acid | | | | | | | |
| | | Trimer acid | | | | | | | |
| | | Succinic acid | 1.0 | 1.0 | 3.5 | 1.0 | 7.0 | 1.0 | 1.0 |
| | | Glutaric acid | | | | | | | |
| | | Diglycolic acid | | | | | | | |
| | | Adipic acid | | | | | | | |
| | | Suberic acid | 2.5 | 2.5 | 2.5 | 2.5 | 2.5 | 2.5 | 2.5 |
| | Amine | 2-Phenylimidazole | | | | | | | |
| | | 2-Undecylimidazole | | | | | | | |
| | | 2-Phenylimidazoline | | | | | | | |
| | | Diethanolamine | | | | | | | |
| | | Diethylethylenediamine | | | | | | | |
| | Organic halogen compound | 2,3-Dibromo-1,4-butanediol | | | | | | | |
| | | Trans-2,3-dibromo-2-butene-1,4-diol | | | | | | | |
| | | Triallyl isocyanurate hexabromide | | | | | | | |
| | Amine hydrohalides | Diphenylguanidine HBr | | | | | | | |
| | | Ethylamine HBr | | | | | | | |
| Thixotropic agent | Ester-based thixotropic agent | Hydrogenated castor oil | 2.0 | 2.0 | 2.0 | 2.0 | 2.0 | 2.0 | 2.0 |
| | Amide-based thixotropic agent | Bisamide-based thixotropic agent | 2.0 | 2.0 | 2.0 | 2.0 | 2.0 | 2.0 | 2.0 |
| | | Polyamide-based thixotropic agent | | | | | | | |
| Metal deactivator | Hindered phenolic metal deactivator | Bis[3-(3-tert-butyl-4-hydroxy-5-methylphenyl)propionic acid] [ethylenebis (oxyethylene)] | 5.0 | 5.0 | 5.0 | 5.0 | 5.0 | 5.0 | 5.0 |
| | | N,N'-hexamethylenebis[3-(3,5-di-tert-butyl-4-hydroxyphenyl)propanamide] | | | | | | | |
| | Nitrogen compound-based metal deactivator | N-(2H-1,2,4-triazol-5-yl) salicylamide | | | | | | | |
| Solvent | Solvent | Hexyl diglycol | 38.5 | 43.5 | 41.5 | 46.5 | 43.5 | 43.5 | 43.5 |
| | | Ethylhexyl diglycol | | | | | | | |
| Ratio | | CIC acid/dimer acid | 0.4 | 0.3 | 0.02 | 5.0 | 0.0 | | |
| | | Acrylic resin/rosin | 5.0 | 0.0 | 5.0 | 6.7 | 5.0 | 0.7 | 0.0 |
| Evaluation | | Evaluation (1) of wettability: wettability to end surface of terminal | ◎ | ◎ | × | ○ | × | × | ○ |
| | | Evaluation (2) of wettability: wettability to upper surface of terminal | ○ | ○ | ○ | × | × | × | ○ |
| | | Temperature cycle reliability | ○ | × | ○ | ○ | ○ | ○ | × |
| | | Void suppression | ○ | × | ○ | ○ | ○ | ○ | × |
| | | Comprehensive evaluation | ○ | × | × | × | × | × | × |

In Examples F1 to F3, the type of acrylic resin is changed. Example F1 contains 15.0 wt % of poly-2-ethylhexyl acrylate (Mw=8,300) as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

Example F1 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris (2-carboxyethyl) isocyanurate to a dimer acid is 0.3 within the range specified in the present invention.

Furthermore, Example F1 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F1 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F1 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F1, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack found in the residue, and therefore, a sufficient effect was obtained for the temperature cycle reliability. In addition, the void area rate was less than or equal to 15%, and therefore, a sufficient effect was obtained for the void reduction properties.

Example F2 contains 15.0 wt % of polylauryl methacrylate (Mw=10,800) as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F2 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F2 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F2 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F2 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F2, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F3 contains 15.0 wt % of poly-2-ethylhexyl acrylate-polyethylene as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F3 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F3 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F3 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F3 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F3, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Example F4, acrylic resins are compositely added at contents within the range specified in the present invention. Example F4 contains, as acrylic resins, 5.0 wt % of poly-2-ethylhexyl acrylate within the range specified in the present invention, 5.0 wt % of polylauryl methacrylate within the range specified in the present invention, and 5.0 wt % of poly-2-ethylhexyl acrylate-polyethylene within the range specified in the present invention, and the total content of acrylic resins is within the range specified in the present invention. Furthermore, Example F4 contains 3.0 wt % of polymerized rosin as rosin within the range specified in the present invention. The (acrylic resins/rosin) ratio of the total amount of acrylic resins to the rosin is 5.0 within the range specified in the present invention.

In addition, Example F4 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F4 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F4 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F4 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F4, even if the acrylic resins were compositely added at contents within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F5 to F10, the content of acrylic resin is set to an upper limit or a lower limit within the range specified in the present invention. Example F5 contains 25.0 wt %, an upper limit, of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 8.3 within the range specified in the present invention.

In addition, Example F5 contains 6.0 wt % of tris(2-carboxyethyl) isocyanurate within the range specified in the present invention and 10.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.6 within the range specified in the present invention.

Furthermore, Example F5 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F5 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F5 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F5, even if the content of acrylic resin was set to an upper limit within the range specified in the present invention, the wetting of solder (fillet) was greater than or equal to 50% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F6 contains 5.0 wt %, a lower limit, of poly-2-ethylhexyl acrylate as an acrylic resin within the range specified in the present invention and 8.0 wt % of polymerized rosin as rosin within the range specified in the present invention. The (acrylic resin/rosin) ratio of the acrylic resin to the rosin is 0.6 within the range specified in the present invention.

In addition, Example F6 contains 6.0 wt % of tris(2-carboxyethyl) isocyanurate within the range specified in the present invention and 25.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.2 within the range specified in the present invention.

Furthermore, Example F6 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F6 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F6 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F6, even if the content of acrylic resin was set to a lower limit within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F7 contains 25.0 wt %, an upper limit, of polylauryl methacrylate as an acrylic resin within the range specified in the present invention and 3.0 wt % of polymerized rosin as rosin within the range specified in the present invention. The (acrylic resin/rosin) ratio of the acrylic resin to the rosin is 8.3 within the range specified in the present invention.

In addition, Example F7 contains 6.0 wt % of tris(2-carboxyethyl) isocyanurate within the range specified in the present invention and 10.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.6 within the range specified in the present invention.

Furthermore, Example F7 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F7 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F7 contains 5.0 wt % of bis[3-(3-tert-butyl-4-hydroxy-5-methylphenyl)propionic acid][ethylenebis (oxyethylene)] as a metal deactivator within the range specified in the present invention and the remainder being 43.5 wt % of hexyl diglycol as a solvent within the range specified in the present invention.

In Example F7, even if the content of acrylic resin was set to an upper limit within the range specified in the present invention, the wetting of solder (fillet) was greater than or equal to 50% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F8 contains 5.0 wt %, a lower limit, of polylauryl methacrylate as an acrylic resin within the range specified in the present invention and 8.0 wt % of polymerized rosin as rosin within the range specified in the present invention. The (acrylic resin/rosin) ratio of the acrylic resin to the rosin is 0.6 within the range specified in the present invention.

In addition, Example F8 contains 6.0 wt % of tris(1-carboxymethyl) isocyanurate within the range specified in the present invention and 25.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.2 within the range specified in the present invention.

Furthermore, Example F8 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F8 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F8 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F8, even if the content of acrylic resin was set to a lower limit within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F9 contains 25.0 wt %, an upper limit, of poly-2-ethylhexyl acrylate-polyethylene as an acrylic resin within the range specified in the present invention and 3.0 wt % of polymerized rosin as rosin within the range specified in the present invention. The (acrylic resin/rosin) ratio of the acrylic resin to the rosin is 8.3 within the range specified in the present invention.

In addition, Example F9 contains 6.0 wt % of tris(2-carboxyethyl) isocyanurate within the range specified in the present invention and 10.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.6 within the range specified in the present invention.

Furthermore, Example F9 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F9 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F8 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F9, even if the content of acrylic resin was set to an upper limit within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F10 contains 5.0 wt %, a lower limit, of poly-2-ethylhexyl acrylate-polyethylene as an acrylic resin within the range specified in the present invention and 8.0 wt % of polymerized rosin as rosin within the range specified in the present invention. The (acrylic resin/rosin) ratio of the acrylic resin to the rosin is 0.6 within the range specified in the present invention.

In addition, Example F10 contains 6.0 wt % of tris(2-carboxyethyl) isocyanurate within the range specified in the present invention and 25.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.2 within the range specified in the present invention.

Furthermore, Example F10 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F10 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F10 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F10, even if the content of acrylic resin was set to a lower limit within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F11 and F12, different types of rosin are compositely added at contents within the range specified in the present invention. Example F11 contains 15.0 wt % of poly-2-ethylhexyl acrylate as an acrylic resin within the range specified in the present invention, and contains, as rosin, 0.4 wt % of acrylic acid-modified, hydrogenated rosin within the range specified in the present invention, 0.4 wt % of maleic acid-modified, hydrogenated rosin within the range specified in the present invention, 0.4 wt % of phenol-modified rosin within the range specified in the present invention, 0.4 wt % of disproportionated rosin within the range specified in the present invention, 0.4 wt % of hydrogenated rosin within the range specified in the present invention, 0.4 wt % of polymerized rosin within the range specified in the present invention, and 0.6 wt % of a rosin ester within the range specified in the present invention, and the total content of rosin is within the range specified in the present invention. The (acrylic resin/rosin) ratio of the acrylic resin to the total amount of rosin is 5.0 within the range specified in the present invention.

In addition, Example F11 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F11 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F11 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F11 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F11, even if different types of rosin were compositely added at contents within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F12 contains 15.0 wt % of poly-2-ethylhexyl acrylate as an acrylic resin within the range specified in the present invention, and contains, as rosin, 1.5 wt % of acrylic acid-modified, hydrogenated rosin within the range specified in the present invention and 1.5 wt % of hydrogenated rosin within the range specified in the present invention, and the total content of rosin is within the range specified in the present invention. The (acrylic resin/rosin) ratio of the acrylic resin to the total amount of rosin is 5.0 within the range specified in the present invention.

In addition, Example F12 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F12 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F12 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F12 contains 5.0 wt % of bis[3-(3-tert-butyl-4-hydroxy-5-methylphenyl)propionic acid][ethylenebis (oxyethylene)] as a metal deactivator within the range specified in the present invention and the remainder being 43.5 wt % of hexyl diglycol as a solvent within the range specified in the present invention.

In Example F12, even if different types of rosin were compositely added at contents within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F13 in which the content of rosin is increased within the range specified in the present invention contains 15.0 wt % of poly-2-ethylhexyl acrylate as an acrylic resin within the range specified in the present invention and 10.0 wt % of polymerized rosin as rosin within the range specified in the present invention. The (acrylic resin/rosin) ratio of the acrylic resin to the rosin is 1.5 within the range specified in the present invention.

In addition, Example F13 contains 6.0 wt % of tris(2-carboxyethyl) isocyanurate within the range specified in the present invention and 13.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.5 within the range specified in the present invention.

Furthermore, Example F13 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F13 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F13 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F13, even if the content of rosin was increased within the range specified in the present invention, the wetting of solder (fillet) was greater than or equal to 50% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F14 which does not contain rosin contains 17.0 wt % of poly-2-ethylhexyl acrylate as an acrylic resin within the range specified in the present invention. In addition, Example F14 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris (2-carboxyethyl) isocyanurate to a dimer acid is 0.3 within the range specified in the present invention.

Furthermore, Example F14 contains, as other organic acids, 2.0 wt % of succinic acid within the range specified in the present invention and 2.5 wt % of suberic acid within the range specified in the present invention, and the total content of the other organic acids is within the range specified in the present invention. In addition, Example F14 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention. Furthermore, Example F14 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

Although Example F14 did not contain rosin which was an optional additive, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F15 in which the contents of tris(2-carboxyethyl) isocyanurate and dimer acid are increased or decreased within the range specified in the present invention contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F15 contains 15.0 wt % of tris(2-carboxyethyl) isocyanurate within the range specified in the present invention and 11.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 1.4 within the range specified in the present invention.

Furthermore, Example F15 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F15 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention. Furthermore, Example F14 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F15, even if the contents of tris(2-carboxyethyl) isocyanurate and dimer acid were increased or decreased within the range specified in the present invention, the wetting of solder (fillet) was greater than or equal to 50% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F16 to F19, the types or combinations of dimer acids are changed. Example F16 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F16 contains 2.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.1 within the range specified in the present invention.

Furthermore, Example F16 contains, as other organic acids, 5.0 wt % of succinic acid within the range specified in the present invention and 2.5 wt % of suberic acid within the range specified in the present invention, and the total content of the other organic acids is within the range specified in the present invention. In addition, Example F16 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F16 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F16, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F17 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F17 contains 6.0 wt % of tris(2-carboxyethyl) isocyanurate within the range specified in the present invention and 20.0 wt % of a dimer acid as dimer acids within the range specified in the present invention. The (tris(2-carboxyethyl) isocyanurate/dimer acid) ratio of tris (2-carboxyethyl) isocyanurate to a dimer acid is 0.3 within the range specified in the present invention.

Furthermore, Example F17 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F17 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F17 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F17, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F18 contains 15 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F18 contains 6.0 wt % of tris(2-carboxyethyl) isocyanurate within the range specified in the present invention and 20.0 wt % of a hydrogenated trimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F18 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F18 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F18 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F18, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F19 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F19 contains 6.0 wt % of tris(2-carboxyethyl) isocyanurate within the range specified in the present invention and 20.0 wt % of a trimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F19 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F19 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F19 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F19, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F20 to which dimer acids are compositely added at contents within the range specified in the present invention contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F20 contains 6.0 wt % of tris(2-carboxyethyl) isocyanurate within the range specified in the present invention. Furthermore, Example F20 contains, as dimer acids, 5.0 wt % of a hydrogenated dimer acid within the range specified in the present invention, 5.0 wt % of a dimer acid within the range specified in the present invention, 5.0 wt % of a hydrogenated trimer acid within the range specified in the present invention, and 5.0 wt % of a trimer acid within the range specified in the present invention, and the total content of dimer acids is within the range specified in the present invention. The (tris(2-carboxyethyl) isocyanurate/dimer acids) ratio of tris(2-carboxyethyl) isocyanurate to the total amount of dimer acids are 0.3 within the range specified in the present invention.

Furthermore, Example F20 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F20 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F20 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F20, even if the dimer acids were compositely added at contents within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F21 and F22, the contents of dimer acids are set to an upper limit or a lower limit within the range specified in the present invention. Example F21 contains 10.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 3.3 within the range specified in the present invention.

In addition, Example F21 contains 6.0 wt % of tris(2-carboxyethyl) isocyanurate within the range specified in the present invention and 25.0 wt %, an upper limit, of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.2 within the range specified in the present invention.

Furthermore, Example F21 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F21 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F21 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F21, even if the contents of dimer acids were set to an upper limit within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F22 contains 25.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 8.3 within the range specified in the present invention.

In addition, Example F22 contains 6.0 wt % of tris(2-carboxyethyl) isocyanurate within the range specified in the present invention and 5.0 wt %, a lower limit, of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 1.2 within the range specified in the present invention.

Furthermore, Example F22 contains, as other organic acids, 1.0 wt % of succinic acid within the range specified in the present invention, 5.0 wt % of glutaric acid within the range specified in the present invention, and 2.5 wt % of suberic acid within the range specified in the present invention, and the total content of the other organic acids is within the range specified in the present invention. In addition, Example F22 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F22 contains 5.0 wt % of bis[3-(3-tert-butyl-4-hydroxy-5-methylphenyl) propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F22, even if the contents of dimer acids were set to a lower limit within the range specified in the present invention, the wetting of solder (fillet) was greater than or equal to 50% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F23 to F25, the type of organic acid is changed. Example F23 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F23 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F23 contains, as other organic acids, 1.0 wt % of glutaric acid within the range specified in the present invention and 2.5 wt % of suberic acid within the range specified in the present invention, and the total content of the other organic acids is within the range specified in the present invention. In addition, Example F23 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F23 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F23, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F24 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F24 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F24 contains, as other organic acids, 1.0 wt % of diglycolic acid within the range specified in the present invention and 2.5 wt % of suberic acid within the range specified in the present invention, and the total content of the other organic acids is within the range specified in the present invention. In addition, Example F24 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F24 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F24, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F25 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F25 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F25 contains, as other organic acids, 1.0 wt % of adipic acid within the range specified in the present invention and 2.5 wt % of suberic acid within the range specified in the present invention, and the total content of the other organic acids is within the range specified in the present invention. In addition, Example F25 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F25 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F25, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F26 to which organic acids are compositely added at contents within the range specified in the present invention contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F26 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F26 contains, as other organic acids, 0.5 wt % of succinic acid within the range specified in the present invention, 0.5 wt % of glutaric acid within the range specified in the present invention, 0.5 wt % of diglycolic acid within the range specified in the present invention, 0.5 wt % of adipic acid within the range specified in the present invention, and 2.5 wt % of suberic acid within the range specified in the present invention, and the total content of the other organic acids is within the range specified in the present invention. In addition, Example F26 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F26 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 42.5 wt % of hexyl diglycol as a solvent within the range specified in the present invention.

In Example F26, even if organic acids were compositely added at contents within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F27 to F29, the contents of organic acids are increased or decreased within the range specified in the present invention. Example 27 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F27 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F27 contains, as other organic acids, 0.5 wt % of diglycolic acid within the range specified in the present invention and 2.5 wt % of suberic acid within the range specified in the present invention, and the total content of the other organic acids is within the range specified in the present invention. In addition, Example F27 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F27 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 44.0 wt % of hexyl diglycol as a solvent within the range specified in the present invention.

In Example F27, even if the content of organic acid was decreased within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F28 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F28 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F28 contains, as other organic acids, 3.0 wt % of glutaric acid within the range specified in the present invention and 2.5 wt % of suberic acid within the range specified in the present invention, and the total content of the other organic acids is within the range specified in the present invention. In addition, Example F28 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F28 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 41.5 wt % of hexyl diglycol as a solvent within the range specified in the present invention.

In Example F28, even if the content of organic acid was increased within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F29 contains 11.5 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 3.8 within the range specified in the present invention.

In addition, Example F29 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F29 contains, as other organic acids, 10.0 wt % of glutaric acid within the range specified in the present invention and 2.5 wt % of suberic acid within the range specified in the present invention, and the total content of the other organic acids is within the range specified in the present invention. In addition, Example F29 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F29 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 38.0 wt % of hexyl diglycol as a solvent within the range specified in the present invention.

In Example F29, even if the content of organic acid was increased within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F30 to which an amine is added contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F30 contains 6.0 wt % of tris(2-carboxyethyl) isocyanurate within the range specified in the present invention and 15.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.4 within the range specified in the present invention.

Furthermore, Example F30 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example E30 contains 5.0 wt % of 2-undecylimidazole as an amine within the range specified in the present invention. In addition, Example F30 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F30 contains 5.0 wt % of bis[3-(3-tert-butyl-4-hydroxy-5-methylphenyl) propionic acid][ethylenebis (oxyethylene)] as a hindered phenolic metal deactivator within the range specified in the present invention and the remainder being 43.5 wt % of hexyl diglycol as a solvent within the range specified in the present invention.

Even if an amine which is an optional additive is added to Example F30, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F31 to F34, the type of amine is changed. Example F31 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F31 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F31 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example E31 contains 2.0 wt % of 2-phenylimidazole as an amine within the range specified in the present invention. In addition, Example F31 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F31 contains 5.0 wt % of bis[3-(3-tert-butyl-4-hydroxy-5-methylphenyl) propionic acid][ethylenebis (oxyethylene)] as a hindered phenolic metal deactivator within the range specified in the present invention and the remainder being 41.5 wt % of hexyl diglycol as a solvent within the range specified in the present invention.

In Example F31, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F32 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F32 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F32 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example E32 contains 2.0 wt % of 2-phenylimidazoline as an amine within the range specified in the present invention. In addition, Example F32 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F32 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 41.5 wt % of hexyl diglycol as a solvent within the range specified in the present invention.

In Example F32, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F33 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F33 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F33 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example E33 contains 2.0 wt % of diethanolamine as an amine within the range specified in the present invention. In addition, Example F33 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F33 contains 5.0 wt % of bis[3-(3-tert-butyl-4-hydroxy-5-methylphenyl) propionic acid][ethylenebis (oxyethylene)] as a hindered phenolic metal deactivator within the range specified in the present invention and the remainder being 41.5 wt % of hexyl diglycol as a solvent within the range specified in the present invention.

In Example F33, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F34 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F34 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F34 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example E34 contains 2.0 wt % of diethylethylenediamine as an amine within the range specified in the present invention. In addition, Example F34 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F34 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 41.5 wt % of hexyl diglycol as a solvent within the range specified in the present invention.

In Example F34, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F35 to which an organic halogen compound is added contains 10.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 3.3 within the range specified in the present invention.

In addition, Example F35 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F35 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F35 contains 5.0 wt % of triallyl isocyanurate hexabromide as an organic halogen compound within the range specified in the present invention. In addition, Example F35 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F35 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

Even if an organic halogen compound which is an optional additive is added to Example F35, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F36 to F38, the type of organic halogen compound is changed. Example F36 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F36 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F36 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F36 contains 2.0 wt % of 2,3-dibromo-1,4-butanediol as an organic halogen compound within the range specified in the present invention. In addition, Example F36 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F36 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 41.5 wt % of hexyl diglycol as a solvent within the range specified in the present invention.

Even if the type of organic halogen compound is changed in Example F36, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F37 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F37 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F37 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F37 contains 2.0 wt % of trans-2,3-dibromo-2-butene-1,4-diol as an organic halogen compound within the range specified in the present invention. In addition, Example F37 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F37 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 41.5 wt % of hexyl diglycol as a solvent within the range specified in the present invention.

Even if the type of organic halogen compound is changed in Example F37, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F38 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F38 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F38 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F38 contains 2.0 wt % of triallyl isocyanurate hexabromide as an organic halogen compound within the range specified in the present invention. In addition, Example F38 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F38 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 41.5 wt % of hexyl diglycol as a solvent within the range specified in the present invention.

Even if the type organic halogen compound is changed in Example F38, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F39 to which an amine hydrohalide is added contains 10.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 3.3 within the range specified in the present invention.

In addition, Example F39 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F39 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example E39 contains 5.0 wt % of ethylamine HBr as an amine hydrohalide within the range specified in the present invention. In addition, Example F39 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F39 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

Even if an amine hydrohalide which is an optional additive is added to Example F39, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F40 and F41, the type of amine hydrohalide is changed. Example F40 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F40 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F40 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F40 contains 1.0 wt % of diphenylguanidine HBr as an amine hydrohalide within the range specified in the present invention. In addition, Example F40 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F40 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 42.5 wt % of hexyl diglycol as a solvent within the range specified in the present invention.

Even if the type of amine hydrohalide is changed in Example F40, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F41 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F41 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F41 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F41 contains 1.0 wt % of ethylamine HBr as an amine hydrohalide within the range specified in the present invention. In addition, Example F41 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F41 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 42.5 wt % of hexyl diglycol as a solvent within the range specified in the present invention.

Even if the type amine hydrohalide is changed in Example F41, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F42 to F44, the types and contents of thixotropic agents are changed. Example F42 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F42 contains 6.0 wt % of tris(2-carboxyethyl) isocyanurate within the range specified in the present invention and 15.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.4 within the range specified in the present invention.

Furthermore, Example F42 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F42 does not contain an ester-based thixotropic agent, but contains 10.0 wt % of a bisamide-based thixotropic agent as an amide-based thixotropic agent within the range specified in the present invention. Example F42 does not contain a metal deactivator, but contains 47.5 wt % of hexyl diglycol as a solvent as the remainder within the range specified in the present invention.

Even if the types and contents of thixotropic agents are changed in Example F42, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F43 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F43 contains 6.0 wt % of tris(2-carboxyethyl) isocyanurate within the range specified in the present invention and 15.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.4 within the range specified in the present invention.

Furthermore, Example F43 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F43 contains 10.0 wt % of hydrogenated castor oil as an ester-based thixotropic agent within the range specified in the present invention, but does not contain an amide-based thixotropic agent. Example F43 does not contain a metal deactivator, but contains 47.5 wt % of hexyl diglycol as a solvent as the remainder within the range specified in the present invention.

Even if the types and contents of thixotropic agents are changed in Example F43, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F44 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F44 contains 6.0 wt % of tris(2-carboxyethyl) isocyanurate within the range specified in the present invention and 25.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.2 within the range specified in the present invention.

Furthermore, Example F44 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F44 contains 2.0 wt % of hydrogenated castor oil as an ester-based thixotropic agent within the range specified in the present invention and 2.0 wt % of a polyamide-based thixotropic agent as an amide-based thixotropic agent within the range specified in the present invention, and the total content of thixotropic agents is within the range specified in the present invention. Example F44 does not contain a metal deactivator, but contains 43.5 wt % of hexyl diglycol as a solvent as the remainder within the range specified in the present invention.

Even if the types and contents of thixotropic agents are changed in Example F44, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F45 to F46, the type of metal deactivator is changed. Example F45 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F45 contains 6.0 wt % of tris(2-carboxyethyl) isocyanurate within the range specified in the present invention and 25.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.2 within the range specified in the present invention.

Furthermore, Example F45 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F45 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Example F45 does not contain a metal deactivator, but contains 43.5 wt % of hexyl diglycol as a solvent as the remainder within the range specified in the present invention.

Although Example F45 did not contain a metal deactivator which was an optional additive, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F46 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F46 contains 6.0 wt % of tris(2-carboxyethyl) isocyanurate within the range specified in the present invention and 15.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.4 within the range specified in the present invention.

Furthermore, Example F46 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F46 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F46 contains 10.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

In Example F46, even if the content of metal deactivator was increased within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In Examples F47 to F50, metal deactivators are compositely added at contents within the range specified in the present invention. Example F47 contains 10.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 3.3 within the range specified in the present invention.

In addition, Example F47 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F47 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F47 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F47 contains, as hindered phenolic metal deactivators, 5.0 wt % of bis[3-(3-tert-butyl-4-hydroxy-5-methylphenyl)propionic acid][ethylenebis (oxyethylene)] within the range specified in the present invention and 5.0 wt % of N,N'-hexamethylenebis [3-(3,5-di-tert-butyl-4-hydroxyphenyl) propanamide] within the range specified in the present invention. Example F47 contains 43.5 wt % of hexyl diglycol as a solvent as the remainder within the range specified in the present invention.

In Example F47, even if the metal deactivators were compositely added at contents within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F48 contains 14.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 4.7 within the range specified in the present invention.

In addition, Example F48 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F48 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F48 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F48 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and 1.0 wt % of N-(2H-1,2,4-triazol-5-yl) salicylamide as a nitrogen compound-based metal deactivator within the range specified in the present invention. Example F48 contains 43.5 wt % of hexyl diglycol as a solvent as the remainder within the range specified in the present invention.

In Example F48, even if the metal deactivators were compositely added at contents within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F49 contains 12.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 4.0 within the range specified in the present invention.

In addition, Example F49 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F49 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F49 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F49 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and 3.0 wt % of N-(2H-1,2,4-triazol-5-yl) salicylamide as a nitrogen compound-based metal deactivator within the range specified in the present invention. Example F49 contains 43.5 wt % of hexyl diglycol as a solvent as the remainder within the range specified in the present invention.

In Example F49, even if the metal deactivators were compositely added at contents within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F50 contains 10.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 3.3 within the range specified in the present invention.

In addition, Example F50 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F50 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F50 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F50 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and 5.0 wt % of N-(2H-1,2,4-triazol-5-yl) salicylamide as a nitrogen compound-based metal deactivator within the range specified in the present invention. Example F50 contains 43.5 wt % of hexyl diglycol as a solvent as the remainder within the range specified in the present invention.

In Example F50, even if the metal deactivators were compositely added at contents within the range specified in the present invention, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F51 in which the type of solvent is changed contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Example F51 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Example F51 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F51 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F51 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of ethylhexyl diglycol as a solvent within the range specified in the present invention.

Even if the type of solvent is changed in Example F51, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F52 to which another resin is added contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention. In addition, Example E52 contains 8.0 wt % of polyethylene resin as the other resin within the range specified in the present invention.

In addition, Example F52 contains 6.0 wt % of tris(2-carboxyethyl) isocyanurate within the range specified in the present invention and 12.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.5 within the range specified in the present invention.

Furthermore, Example F52 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F52 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F52 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 43.5 wt % of hexyl diglycol as a solvent within the range specified in the present invention.

Even if the other resin which is an optional additive is added to Example F52, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

Example F53 to which other resins are compositely added contains 15.0 wt % of polylauryl methacrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention. In addition, Example F53 contains, as other resins, 8.0 wt % of polyethylene resin within the range specified in the present invention, 1.0 wt % of polypropylene resin within the range specified in the present invention, and 1.0 wt % of acid-modified polyethylene resin within the range specified in the present invention. The total content of other resins is within the range specified in the present invention.

In addition, Example F53 contains 6.0 wt % of tris(2-carboxyethyl) isocyanurate within the range specified in the present invention and 15.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.4 within the range specified in the present invention.

Furthermore, Example F53 contains, as other organic acids, 1.0 wt % of succinic acid within the range specified in the present invention and 2.5 wt % of suberic acid within the range specified in the present invention, and the total content of the other organic acids is within the range specified in the present invention. In addition, Example F53 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention, and the total content of thixotropic agents is within the range specified in the present invention. Furthermore, Example F53 contains 5.0 wt % of bis[3-(3-tert-butyl-4-hydroxy-5-methylphenyl)propionic acid][ethylenebis (oxyethylene)] as a hindered phenolic metal deactivator within the range specified in the present invention and the remainder being 38.5 wt % of hexyl diglycol as a solvent within the range specified in the present invention.

Even if the other resins are compositely added to Example F53, the wetting of solder (fillet) was greater than or equal to 75% of the height of the end surface, and therefore, a sufficient effect was obtained for the evaluation of the solder wettability to the end surface of the terminal. In addition, solder was wet-spread over the entire upper surface of the terminal, and therefore a sufficient effect was obtained for the evaluation of solder wettability to the upper surface of the terminal. Furthermore, there was no crack in the residue found, and therefore, a sufficient effect was obtained for the temperature cycle reliability. In addition, the void area rate was less than or equal to 15%, and therefore, a sufficient effect was obtained for the void reduction properties.

In contrast to each of the above-described examples, Comparative Example F1 does not contain an acrylic resin, but contains 18.0 wt % of polymerized rosin as rosin within the range specified in the present invention. Since Comparative Example F1 does not contain an acrylic resin, the (acrylic resin/rosin) ratio of the acrylic resin to the rosin is out of the range specified in the present invention.

In addition, Comparative Example F1 contains 6.0 wt % of tris(2-carboxyethyl) isocyanurate within the range specified in the present invention and 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.3 within the range specified in the present invention.

Furthermore, Comparative Example F1 contains, as other organic acids, 1.0 wt % of succinic acid within the range specified in the present invention and 2.5 wt % of suberic acid within the range specified in the present invention. In addition, Comparative Example F1 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention. Furthermore, Comparative Example F1 contains 5.0 wt % of bis[3-(3-tert-butyl-4-hydroxy-5-methylphenyl) propionic acid][ethylenebis (oxyethylene)] as a hindered phenolic metal deactivator within the range specified in the present invention and the remainder being 43.5 wt % of hexyl diglycol as a solvent within the range specified in the present invention.

In Comparative Example F1, an effect was obtained for the evaluation of the solder wettability to the end surface of the terminal. In addition, an effect was obtained for the evaluation of the solder wettability to the upper surface of the terminal. However, there was a crack in the residue found, and therefore, an effect not was obtained for the temperature cycle reliability. In addition, the void area rate was greater than 15%, and therefore, no effect was obtained for the void reduction properties.

Comparative Example F2 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Comparative Example F2 contains 0.5 wt % of tris(2-carboxyethyl) isocyanurate which is below the range specified in the present invention and 25.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is 0.02 which is out of the range specified in the present invention.

Furthermore, Comparative Example F2 contains, as other organic acids, 3.5 wt % of succinic acid within the range specified in the present invention and 2.5 wt % of suberic acid within the range specified in the present invention. In addition, Comparative Example F2 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention. Furthermore, Comparative Example F2 contains 5.0 wt % of bis[3-(3-tert-butyl-4-hydroxy-5-methylphenyl) propionic acid][ethylenebis (oxyethylene)] as a hindered phenolic metal deactivator within the range specified in the present invention and the remainder being 41.5 wt % of hexyl diglycol as a solvent within the range specified in the present invention.

In Comparative Example F2, the wetting of solder (fillet) was less than 50% of the height of the end surface, and therefore, no effect was obtained for the evaluation of the solder wettability to the end surface of the terminal. An effect was obtained for the solder wettability to the upper surface of the terminal. In addition, an effect was obtained for the temperature cycle reliability. In addition, an effect was obtained for the void reduction properties.

Comparative Example F3 contains 20.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 6.7 within the range specified in the present invention.

In addition, Comparative Example F3 contains 15.0 wt % of tris(2-carboxyethyl) isocyanurate within the range specified in the present invention and 3.0 wt % of a hydrogenated dimer acid as dimer acids which is below the range specified in the present invention. The (tris(2-carboxyethyl) isocyanurate/dimer acid) ratio of tris(2-carboxyethyl) isocyanurate to a dimer acid is 5.0 which is out of the range specified in the present invention.

Furthermore, Comparative Example F3 contains, as other organic acids, 1.0 wt % of succinic acid within the range specified in the present invention and 2.5 wt % of suberic acid within the range specified in the present invention. In addition, Comparative Example F3 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention. Furthermore, Comparative Example F3 contains 5.0 wt % of bis[3-(3-tert-butyl-4-hydroxy-5-methylphenyl) propionic acid][ethylenebis (oxyethylene)] as a hindered phenolic metal deactivator within the range specified in the present invention and the remainder being 46.5 wt % of hexyl diglycol as a solvent within the range specified in the present invention.

In Comparative Example F3, an effect was obtained for the evaluation of the solder wettability to the end surface of the terminal. However, no effect was obtained for the evaluation of the solder wettability to the upper surface of the terminal. In addition, an effect was obtained for the temperature cycle reliability. In addition, an effect was obtained for the void reduction properties.

Comparative Example F4 contains 15.0 wt % of poly-2-ethylhexyl acrylate as an acrylic resin within the range specified in the present invention and 3.0 wt % of polymerized rosin as rosin within the range specified in the present invention. The (acrylic resin/rosin) ratio of the acrylic resin to the rosin is 5.0 within the range specified in the present invention.

In addition, Comparative Example F4 does not contain tris(2-carboxyethyl) isocyanurate, but contains 20.0 wt % of a hydrogenated dimer acid as dimer acids within the range specified in the present invention. The (tris(2-carboxyethyl) isocyanurate/dimer acid) ratio of tris(2-carboxyethyl) isocyanurate to a dimer acid is out of the range specified in the present invention since Comparative Example F4 does not contain tris(1-carboxymethyl) isocyanurate.

Furthermore, Comparative Example F4 contains, as other organic acids, 7.0 wt % of succinic acid within the range specified in the present invention and 2.5 wt % of suberic acid within the range specified in the present invention. In addition, Comparative Example F4 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention. Furthermore, Comparative Example F4 contains 5.0 wt % of bis[3-(3-tert-butyl-4-hydroxy-5-methylphenyl) propionic acid][ethylenebis (oxyethylene)] as a hindered phenolic metal deactivator within the range specified in the present invention and the remainder being 43.5 wt % of hexyl diglycol as a solvent within the range specified in the present invention.

In Comparative Example F4, no effect was obtained for the evaluation of the solder wettability to the end surface of the terminal. In addition, no effect was obtained for the evaluation of the solder wettability to the upper surface of the terminal. An effect was obtained for the temperature cycle reliability. In addition, an effect was obtained for the void reduction properties.

Comparative Example F5 contains 15.0 wt % of poly-2-ethylhexyl acrylate as an acrylic resin within the range specified in the present invention and 23.0 wt % of polymerized rosin as rosin within the range specified in the present invention. The (acrylic resin/rosin) ratio of the acrylic resin to the rosin is 0.7 which is out of the range specified in the present invention.

In addition, Comparative Example F5 contains 6.0 wt % of tris(2-carboxyethyl) isocyanurate within the range specified in the present invention, but does not contain dimer acids. The (tris(2-carboxyethyl) isocyanurate/dimer acid) ratio of tris(2-carboxyethyl) isocyanurate to a dimer acid is out of the range specified in the present invention since Comparative Example F5 does not contain dimer acids.

Furthermore, Comparative Example F5 contains, as other organic acids, 1.0 wt % of succinic acid within the range specified in the present invention and 2.5 wt % of suberic acid within the range specified in the present invention. In addition, Comparative Example F5 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention. Furthermore, Comparative Example F5 contains 5.0 wt % of bis[3-(3-tert-butyl-4-hydroxy-5-methylphenyl) propionic acid][ethylenebis (oxyethylene)] as a hindered phenolic metal deactivator within the range specified in the present invention and the remainder being 43.5 wt % of hexyl diglycol as a solvent within the range specified in the present invention.

In Comparative Example F5, no effect was obtained for the evaluation of the solder wettability to the end surface of the terminal. In addition, no effect was obtained for the evaluation of the solder wettability to the upper surface of the terminal. An effect was obtained for the temperature cycle reliability. In addition, an effect was obtained for the void reduction properties.

Comparative Example F6 does not contain an acrylic resin, but contains 38.0 wt % of polymerized rosin as rosin which is beyond the range specified in the present invention. Since Comparative Example F6 does not contain an acrylic resin, the (acrylic resin/rosin) ratio of the acrylic resin to the rosin is out of the range specified in the present invention.

In addition, Comparative Example F6 contains 6.0 wt % of tris(2-carboxyethyl) isocyanurate within the range specified in the present invention, but does not contain dimer acids. The (tris(2-carboxyethyl) isocyanurate/dimer acid) ratio of tris(2-carboxyethyl) isocyanurate to a dimer acid is out of the range specified in the present invention since Comparative Example F6 does not contain dimer acids.

Furthermore, Comparative Example F6 contains, as other organic acids, 1.0 wt % of succinic acid within the range specified in the present invention and 2.5 wt % of suberic acid within the range specified in the present invention. In addition, Comparative Example F6 contains 2.0 wt % of hydrogenated castor oil as an ester-based thixotropic agent within the range specified in the present invention and 2.0 wt % of a bisamide-based thixotropic agent as an amide-based thixotropic agent within the range specified in the present invention. Furthermore, Comparative Example F6 contains 5.0 wt % of bis[3-(3-tert-butyl-4-hydroxy-5-methylphenyl) propionic acid][ethylenebis (oxyethylene)] as a hindered phenolic metal deactivator within the range specified in the present invention and the remainder being 43.5 wt % of hexyl diglycol as a solvent within the range specified in the present invention.

In Comparative Example F6, an effect was obtained for the evaluation of the solder wettability to the end surface of the terminal. In addition, an effect was obtained for the evaluation of the solder wettability to the upper surface of the terminal. However, no effect was obtained for the temperature cycle reliability. In addition, no effect was obtained for the void reduction properties.

From the above, in the flux including: 5.0 wt % to 25.0 wt % of an acrylic resin; 2.0 wt % to 15.0 wt % of tris(2-carboxyethyl) isocyanurate; 5.0 wt % to 25.0 wt % of any one of a dimer acid, a trimer acid, a hydrogenated dimer acid obtained by adding hydrogen to a dimer acid, and a hydrogenated trimer acid obtained by adding hydrogen to a trimer acid or two or more kinds of a dimer acid, a trimer acid, a hydrogenated dimer acid obtained by adding hydrogen to a dimer acid, and a hydrogenated trimer acid obtained by adding hydrogen to a trimer acid; and a solvent as a remainder, an effect of removing an oxide in a desired temperature range was enhanced.

Accordingly, in solder paste in which this flux was used, an oxide which causes non-wetting of solder was removed, whereby wettability of the solder was improved. In addition, the oxide which also causes voids was removed, whereby generation of voids could be reduced. Furthermore, a flux residue had softness due to the addition of an acrylic resin, and therefore, generation of a crack in the residue due to a temperature cycle could be reduced.

These effects were not inhibited by the incorporation of optional additives such as rosin, resins other than an acrylic resin and rosin, organic acids other than tris(2-carboxyethyl) isocyanurate and dimer acids, an amine, an organic halogen compound, an amine hydrohalide, a thixotropic agent, and a metal deactivator within the range specified in the present invention.

Fluxes of examples and comparative examples having compositions shown in Table 14 as follows were prepared and solder paste substances using these fluxes were prepared to verify void reduction performance and solder wettability for the flux of the third embodiment according to the present invention. The composition ratios in Table 14 are shown by wt (mass) % in a case where the total amount of flux is set to 100.

Solder paste contains 11 wt % of a flux and 89 wt % of metal powder. In addition, metal powder in solder paste is an Sn—Ag—Cu-based solder alloy in which Ag is 3.0 wt %, Cu is 0.5 wt %, and the remainder being Sn, and the particle diameter of the metal powder is 20 μm to 38 μm. The present invention is not limited to the examples.

<Evaluation of Void Reduction Performance>
(1) Verification Method

For an evaluation of void reduction performance, solder paste in which each flux described in the examples and comparative examples is used is printed on an electrode of a substrate. The print thickness is 0.12 mm. After the printing of solder paste, a quad flat non-lead package (QFN) is mounted thereon, and reflowing is performed. The QFN is square-shaped with a side length of 8 mm, and a lower-surface electrode is square-shaped with a side length of 5 mm. As the reflow conditions, preheating was performed at 150° C. to 200° C. for 118 seconds in an N2 atmosphere, and then, main heating was performed at 220° C. or higher for 42 seconds while setting the peak temperature at 247° C. After the reflowing, a component mounted portion was imaged using an X-ray observation device (XVR-160 manufactured by Uni-Hite System Corporation), and a void area rate was calculated by Equation (1) while setting the number of pixels of the entire lower-surface electrode portion of QFN in the X-ray transmission image as a denominator and the number of pixels of a void portion as a numerator.

(Total number of pixels of void portion/number of pixels of entire electrode portion)×100(%)·(1)

(2) Determination Criteria
  Pass: Void area rate ≤15%
  Fail: Void area rate >15%

<Evaluation of Wettability of Solder>
(1) Verification Method

Figure 3A:
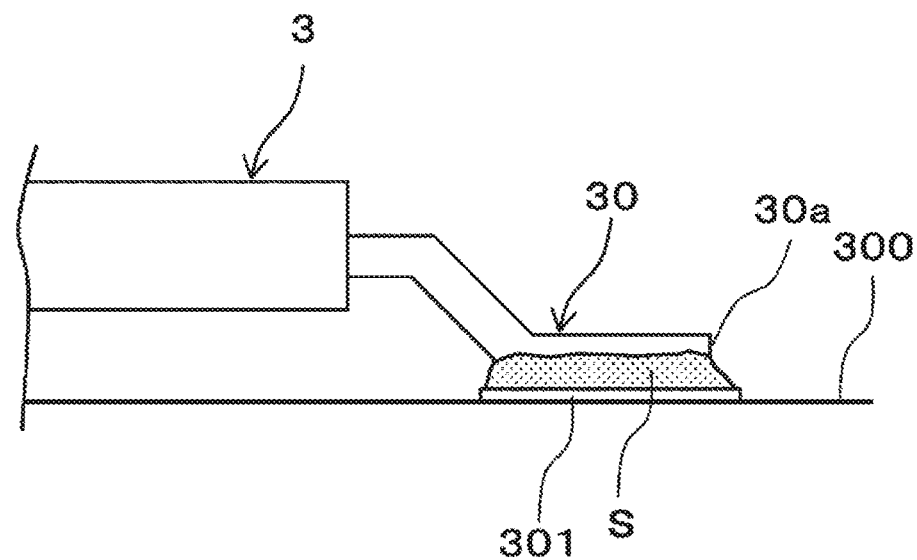
FIG. 3A is an explanatory view illustrating an example of an evaluation of wettability of solder.
Figure 3B:
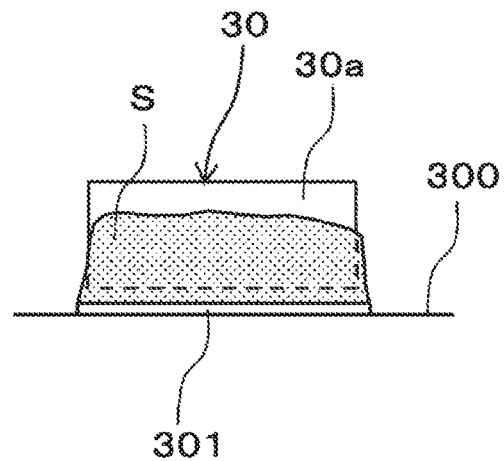
FIG. 3B is an explanatory view illustrating an example of an evaluation of wettability of solder.

FIGS. 3A and 3B show an example of an evaluation of wettability of solder. FIG. 3A is a side view of a terminal 30 of a quad flat package (QFP) 3, and FIG. 3B is a front view of the terminal 30 of the QFP 3. For an evaluation of wettability of solder, solder paste in which each flux described in the examples and comparative examples is used is printed on an electrode 301 of a substrate 300. The print thickness is 0.12 mm. After the printing of solder paste, the QFP 3 is mounted, and reflowing is performed.

As the reflow conditions, preheating was performed at 150° C. to 200° C. for 118 seconds, and then, main heating was performed at 220° C. or higher for 42 seconds while setting the peak temperature at 247° C. After the reflowing, the wetting amount of solder S on an end surface 30a of the terminal 30 of the QFP 3 was observed with a microscope. A digital microscope VHX-2000 manufactured by KEYENCE CORPORATION was used as the microscope. When the area of the end surface 30a of the terminal 30 of the QFP 3 is set to 300, the wetting amount of the solder is a proportion of the area of the wet solder S.

As a method for calculating the proportion of the area, the QFP 3 was pasted to a substrate with double-sided tape, the end surface was imaged at a magnification of 200 times, and an excessive portion other than the end surface was deleted using image software AT-Image to obtain a pixel number A1. This number of pixels corresponds to the area of the end surface. A substrate on which soldering of the QFP3 was performed was placed at the same position, and an image was photographed without changing the area of the end surface. An excessive portion other than a portion of which the end surface is visible with image software is deleted to obtain a pixel number A2. An expression ((A1−A2)/A1)×100% is a proportion of the area of wet solder.

(2) Determination Criteria
  4: 75% to 100%
  3: Greater than or equal to 50% and less than 75%
  2: Greater than or equal to 25% and less than 50%
  1: Greater than or equal to 0% and less than 25%

A score 3 or higher was set as a pass in the above-described 4-level evaluation.

<Comprehensive Evaluation>
  ○: Solder passed both the evaluation of void reduction performance and the evaluation of wettability of the solder.
  x: Solder failed any or both the evaluation of void reduction performance and the evaluation of wettability of the solder.

TABLE 14

| | Example G1 | Example G2 | Example G3 | Example G4 | Example G5 | Example G6 | Example G7 | Example G8 | Example G9 | Example G10 | Example G11 | Comparative Example G1 | Comparative Example G2 |
|---|---|---|---|---|---|---|---|---|---|---|---|---|---|
| Rosin | 50 | 48 | 45 | 44 | 44 | 44 | 44 | 44 | 44 | 45 | 35 | 50 | 35 |
| Thixotropic agent | 6 | 6 | 6 | 4 | 2 | 6 | 4 | 6 | 6 | 6 | 8 | 6 | 6 |
| Diethylene glycol monohexyl ether | 43.7 | 43 | 42 | 40 | 39 | 42 | 40 | 42 | 40 | 42 | 41 | 43 | 39 |
| Tris (2-carboxyethyl) isocyanurate | 0.3 | 3 | 7 | 12 | 15 | 7 | 7 | 7 | 7 | 7 | 7 | | 20 |

TABLE 14-continued

| | Example G1 | Example G2 | Example G3 | Example G4 | Example G5 | Example G6 | Example G7 | Example G8 | Example G9 | Example G10 | Example G11 | Comparative Example G1 | Comparative Example G2 |
|---|---|---|---|---|---|---|---|---|---|---|---|---|---|
| Adipic acid | | | | | | 1 | 5 | | | | 2 | 1 | |
| 2-Ethyl imidazole | | | | | | | | 1 | 3 | | 3 | | |
| Antioxidant | | | | | | | | | | 4 | 4 | | |
| Total | 100 | 100 | 100 | 100 | 100 | 100 | 100 | 100 | 100 | 100 | 100 | 100 | 100 |
| Void area rate (%) | 4.9 | 5 | 5.1 | 9.2 | 11.3 | 8.2 | 8.3 | 8.1 | 8.0 | 8.3 | 8.5 | 38 | 16.2 |
| Wettability | 4 | 4 | 4 | 4 | 4 | 4 | 4 | 4 | 4 | 4 | 4 | 2 | 4 |
| Comprehensive Evaluation | ○ | ○ | ○ | ○ | ○ | ○ | ○ | ○ | ○ | ○ | ○ | × | × |

Regarding the flux of the third embodiment according to the present invention, a sufficient effect was obtained for the void reduction performance and the wettability of solder in fluxes containing 0.3 wt % to 15 wt % of tris(2-carboxyethyl) isocyanurate within the range specified in the present invention as shown in Examples G1 to G5, and an effect due to incorporation of tris(2-carboxyethyl) isocyanurate was not inhibited by incorporation of rosin, a solvent, and a thixotropic agent within the range specified in the present invention. Even in a flux containing 0.1 wt % of tris(2-carboxyethyl) isocyanurate, a sufficient effect was obtained for the void reduction performance and the wettability of solder.

In addition, even in fluxes containing adipic acid as an organic acid as shown in Examples G6 and 7, fluxes containing 2-ethyl imidazole as an imidazole compound as shown in Examples G8 and G9, and a flux containing an antioxidant as shown in Example G10, a sufficient effect was obtained for the void reduction performance and the wettability of solder due to incorporation of tris(2-carboxyethyl) isocyanurate within the range specified in the present invention.

Furthermore, even in a flux containing adipic acid as an organic acid, 2-ethyl imidazole as an imidazole compound, and an antioxidant as shown in Example G11, a sufficient effect was obtained for the void reduction performance and the wettability of solder due to incorporation of tris(2-carboxyethyl) isocyanurate within the range specified in the present invention.

In contrast, in a flux containing no tris(2-carboxyethyl) isocyanurate as shown in Comparative Example G1, the reduction of voids and the wettability of solder could not be improved.

In addition, in a flux containing tris(2-carboxyethyl) isocyanurate beyond the range specified in the present invention as shown in Comparative Example G2, an effect of improving the wettability of solder was obtained, but desired void reduction performance was not obtained.

From the above, in the flux of the third embodiment which contained rosin, tris(2-carboxyethyl) isocyanurate, and a solvent and in which the content of tris(2-carboxyethyl) isocyanurate was 0.1 wt % to 15 wt %, an effect of removing an oxide in a desired temperature range was enhanced.

Accordingly, in solder paste in which this flux of the third embodiment was used, an oxide which caused voids was removed, whereby generation of voids could be reduced. In addition, the wettability of solder to a joining component was improved.

In addition, even if the flux of the third embodiment according to the present invention contains 10 wt % to 50 wt % of rosin, 30 wt % to 60 wt % of a solvent, 0 wt % to 15 wt % of other activators, 0 wt % to 10 wt % of a thixotropic agent, 0 wt % to 5 wt % of a defoamer, and 0 wt % to 5 wt % of an antioxidant, the void reduction performance and the wettability of solder was not inhibited due to incorporation of tris(2-carboxyethyl) isocyanurate, whereby a sufficient effect was obtained for the void reduction performance and the wettability of solder.

The invention claimed is:

1. A flux, comprising:
   5.0 wt % to 25.0 wt % of an acrylic resin;
   2.0 wt % to 15.0 wt % of tris(2-carboxyethyl) isocyanurate;
   2.0 wt % to 30.0 wt % of rosin;
   5.0 wt % to 25.0 wt % of at least one acid component selected from a group consisting of a dimer acid derived from oleic acid and linoleic acid, a trimer acid derived from oleic acid and linoleic acid, a hydrogenated dimer acid obtained by adding hydrogen to a dimer acid derived from oleic acid and linoleic acid, and a hydrogenated trimer acid obtained by adding hydrogen to a trimer acid derived from oleic acid and linoleic acid; and
   a solvent,
   wherein a ratio of tris(2-carboxyethyl) isocyanurate to the at least one acid component is 0.1 to 0.4.
2. The flux according to claim 1,
   wherein a ratio of the acrylic resin to the rosin is 0.5 to 9.0.
3. The flux according to claim 1, further comprising:
   0 wt % to 10.0 wt % of another organic acid; and
   0 wt % to 10.0 wt % of a thixotropic agent.
4. The flux according to claim 1, further comprising:
   0 wt % to 10.0 wt % of a hindered phenolic metal deactivator; and
   0 wt % to 5.0 wt % of a nitrogen compound-based metal deactivator.
5. The flux according to claim 1, further comprising:
   0 wt % to 5.0 wt % of an amine;
   0 wt % to 5.0 wt % of a content of organic halogen compound; and
   0 wt % to 5.0 wt % of an amine hydrohalide.
6. The flux according to claim 1, further comprising:
   0 wt % to 10 wt % of another resin.

* * * * *